(12) United States Patent
Gudivada et al.

(10) Patent No.: US 12,019,473 B2
(45) Date of Patent: Jun. 25, 2024

(54) SYSTEMS, TECHNIQUES, AND OTHER IMPLEMENTATIONS FOR EXPANDABLE DISPLAY MANAGEMENT

(71) Applicant: QUALCOMM Incorporated, San Diego, CA (US)

(72) Inventors: Naga Chandan Babu Gudivada, Hyderabad (IN); Rakesh Pallerla, Hyderabad (IN); Prakash Tiwari, Hyderabad (IN); Balamukund Sripada, Hyderabad (IN); Kritpal Singh Dhindhsa, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 17/305,804

(22) Filed: Jul. 14, 2021

(65) Prior Publication Data

US 2023/0016622 A1 Jan. 19, 2023

(51) Int. Cl.
*G06F 1/16* (2006.01)
*G06F 21/44* (2013.01)
(Continued)

(52) U.S. Cl.
CPC .......... *G06F 1/1624* (2013.01); *G06F 1/1652* (2013.01); *G06F 21/44* (2013.01);
(Continued)

(58) Field of Classification Search
CPC ...... G06F 1/1624; G06F 1/1652; G06F 21/44; G06F 21/629; G06F 1/3218; G06F 1/1677; H04M 1/0268; H04M 1/72454
See application file for complete search history.

(56) References Cited

U.S. PATENT DOCUMENTS

| 2010/0299540 A1 | 11/2010 | Brenneman et al. |
| 2012/0050075 A1 | 3/2012 | Salmon |

(Continued)

FOREIGN PATENT DOCUMENTS

| CN | 103458099 A | 12/2013 |
| EP | 3483715 A1 | 5/2019 |

(Continued)

OTHER PUBLICATIONS

International Search Report and Written Opinion—PCT/US2022/072662—ISA/EPO—dated Dec. 22, 2022.
(Continued)

*Primary Examiner* — Angelica Perez
(74) *Attorney, Agent, or Firm* — QUALCOMM Incorporated

(57) ABSTRACT

Apparatuses, systems, and methods are provided for use with expandable displays. In some implementations management techniques and/or systems are provided that allow for access to expandable display functionality to be managed to as to potentially prolong device battery life. In other or additional implementations, techniques and/or systems are provided for potentially safeguarding devices with expandable displays from damage in the event of a fall or drop event. In yet other or additional implementations, techniques and/or systems are provided for determining the expansion state of an expandable display, thereby allowing corrective measures to be taken if the actual expansion state of the expandable display does not align with the expected expansion state of the expandable display.

18 Claims, 17 Drawing Sheets

(51) Int. Cl.
*G06F 21/62* (2013.01)
*H04M 1/02* (2006.01)
*H04M 1/72454* (2021.01)

(52) U.S. Cl.
CPC ........ *G06F 21/629* (2013.01); *H04M 1/0268* (2013.01); *H04M 1/72454* (2021.01); *H04M 2250/12* (2013.01)

(56) References Cited

U.S. PATENT DOCUMENTS

| | | | | |
|---|---|---|---|---|
| 2012/0221878 | A1* | 8/2012 | Pocklington | G06F 1/3206 |
| | | | | 713/340 |
| 2020/0209924 | A1* | 7/2020 | Zuo | G06F 3/04883 |
| 2020/0310492 | A1* | 10/2020 | Kim | G06F 1/1641 |
| 2021/0263564 | A1* | 8/2021 | Chen | H04N 21/4316 |
| 2022/0148476 | A1* | 5/2022 | Min | G06F 3/147 |
| 2023/0206808 | A1* | 6/2023 | Kim | G06F 1/16 |
| | | | | 345/212 |

FOREIGN PATENT DOCUMENTS

| | | |
|---|---|---|
| EP | 3675470 A2 | 7/2020 |
| EP | 3787298 A1 | 3/2021 |
| EP | 3825811 A1 | 5/2021 |
| EP | 3985955 A1 | 4/2022 |
| WO | WO2017135749 A1 | 8/2017 |
| WO | WO2020258949 A1 | 12/2020 |
| WO | WO2022098169 A1 | 5/2022 |
| WO | WO2022102993 A1 | 5/2022 |

OTHER PUBLICATIONS

Partial International Search Report—PCT/US2022/072662—ISA/EPO—dated Sep. 19, 2022.

* cited by examiner

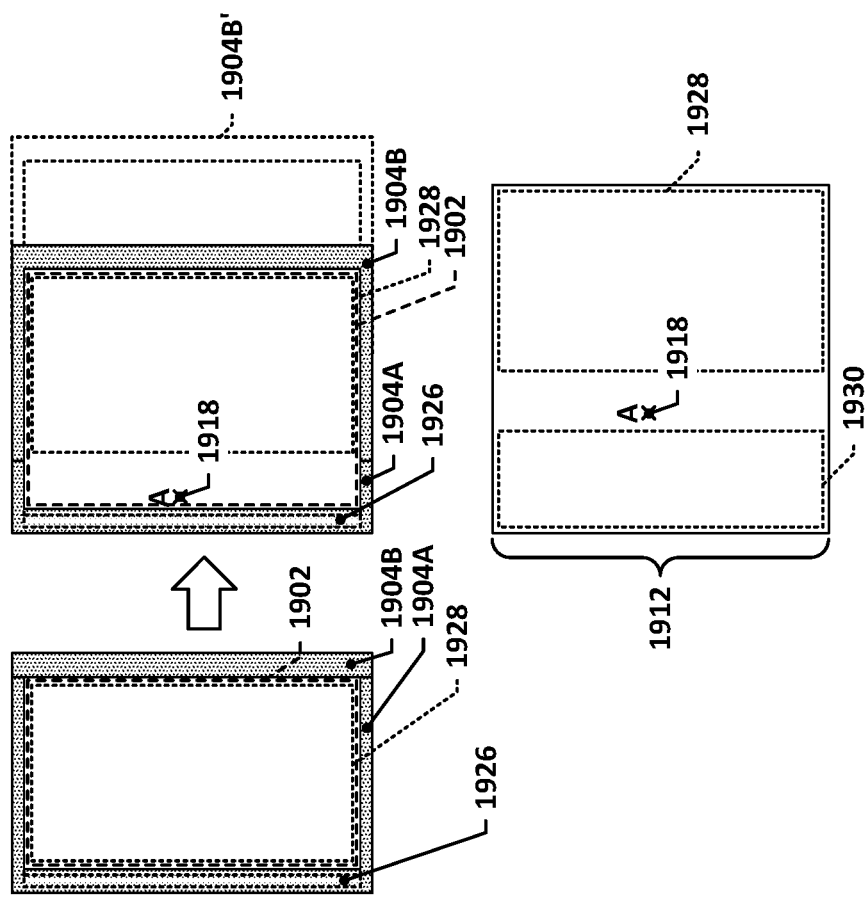

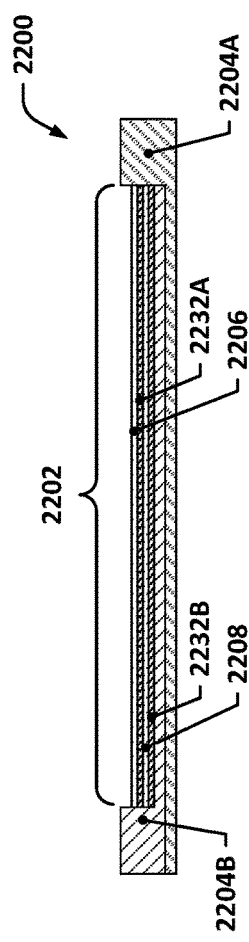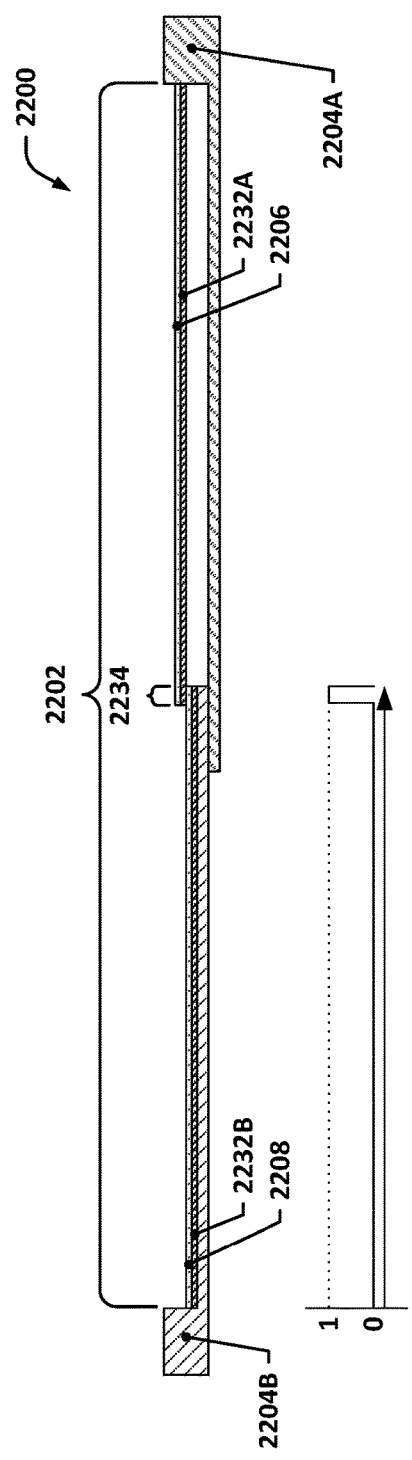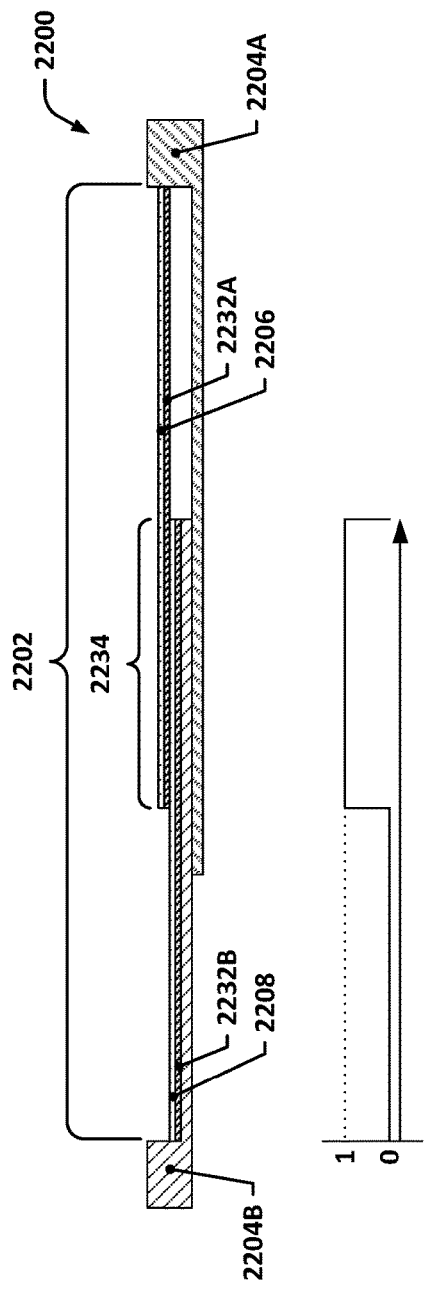

SYSTEMS, TECHNIQUES, AND OTHER IMPLEMENTATIONS FOR EXPANDABLE DISPLAY MANAGEMENT

FIELD OF DISCLOSURE

This disclosure relates generally to expandable display systems, e.g., displays that are able to be dynamically reconfigured to physically increase or decrease the amount of visible active display area that is available for viewing by a user.

BACKGROUND

Recent advances in display technologies, such as ultra-thin and/or flexible display panels have allowed for new types of displays to be developed that allow users to cause such displays to expand or contract their viewable active display areas. For example, in January 2021, LG Electronics revealed the LG Rollable, a smart phone that incorporated a flexible display that was attached to a roller mechanism to allow the flexible display to be extended or retracted by unrolling it from or rolling it onto the roller (see, for example, U.S. Pat. No. 8,666,455). In roughly the same timeframe, Oppo announced the Oppo X, which incorporated a similar extendable/retractable display functionality (see, for example, PCT application publication WO2021129625). The Oppo X has a two-part housing in which one part of the housing is able to slide transversely relative to the other, driven by two small linear screw actuators. A flexible display panel that is guided by a U-shaped track is extended or retracted by such transverse sliding motion, thereby expanding or shrinking the visible active display area in the transverse direction.

Other recent display technologies that have been announced include, for example, the use of two discrete displays that are movable relative to one another between two configurations—one in which one display covers the other, and one in which both displays are visible. For example, the LG Wing phone features an upper display that is able to be rotated relative to a lower display such that the upper display entirely covers the lower display in one rotational position and such that the lower display is positioned adjacent to the upper display when in a second rotational position, e.g., forming a T-shaped display area. Another format being explored for such expandable displays involves one display that is positioned beneath another display but can be linearly translated so as to slide out from behind the upper display (see, for example, Chinese utility model CN208445588U).

Mobile devices that incorporate expandable displays are likely to become increasingly available in the coming years, as such devices are able to be transitioned between a state in which they have a compact size, e.g., sized similar to a normal smartphone, and a state in which they offer a larger viewing area but are not able to, for example, be conveniently placed in a user's pocket.

Disclosed herein are various systems, techniques, and other implementations for managing such expandable displays.

SUMMARY

The systems, methods and devices of the disclosure each have several innovative aspects, no single one of which is solely responsible for the desirable attributes disclosed herein. For example, various innovative aspects of the subject matter in this disclosure may be implemented as set forth in any of the following implementations, although it will be recognized that the following examples are not limiting.

In some implementations, an apparatus may be provided that includes an expandable display, an actuation mechanism, and a controller. The expandable display may be transitionable at least between an expanded state and a non-expanded state, the actuation mechanism may be configured to cause the expandable display to transition between the expanded state and the non-expanded state responsive to receipt of one or more signals, and the controller may be configured to: a) receive a display expansion request signal, b) determine, responsive to (a), whether one or more expansion conditions are met, c) cause the actuation mechanism, when the expandable display is in the non-expanded state, to transition the expandable display from the non-expanded state to the expanded state responsive to receipt of the display expansion request signal and a determination that the one or more expansion conditions are met, and d) cause the actuation mechanism, when the expandable display is in the non-expanded state, to cause the expandable display to remain in the non-expanded state responsive to receipt of the display expansion request signal and a determination that the one or more expansion conditions are not met.

In some implementations of the apparatus, the controller may be configured to obtain information indicative of a battery charge level of one or more batteries used to power the actuation mechanism. In such implementations, the one or more expansion conditions may be met, at least in part, by the battery charge level being above a first threshold amount.

In some implementations of the apparatus, the one or more expansion conditions may be met, at least in part, or further met, at least in part, when a first software application that is in the foreground is associated with information that indicates that the first software application is compatible with the expandable display.

In some implementations of the apparatus, the apparatus may further include one or more memory devices that store a) information indicative of a global permission level for the expandable display and b) information indicative of an application-specific permission level for each software application of a plurality of software applications executable by the apparatus; the plurality of software applications may include the first software application. In such implementations, the global permission level may be selected from a group of global permission levels including at least a first global permission level and a second global permission level, each application-specific permission level may be selected from a group of application-specific permission levels including at least a first application-specific permission level and a second application-specific permission level, and the one or more expansion conditions may be further met, at least in part, when either i) the information indicative of a global permission level for the expandable display indicates the first global permission level or ii) the information indicative of a global permission level for the expandable display indicates the second global permission level and the information indicative of the application-specific permission level for the first software application indicates the first application-specific permission level.

In some implementations of the apparatus, the apparatus may further include one or more memory devices that store a) information indicative of a global permission level for the expandable display and b) information indicative of an application-specific permission level for each software application of a plurality of software applications executable by the apparatus; the plurality of software applications may include the first software application. In such implementations, the global permission level may be selected from a group of global permission levels including at least a first global permission level, a second global permission level, and a third global permission level, each application-specific permission level may be selected from a group of application-specific permission levels including at least a first application-specific permission level and a second application-specific permission level, and the one or more expansion conditions may be further met, at least in part, when i) the information indicative of a global permission level for the expandable display indicates the first global permission level, ii) the information indicative of a global permission level for the expandable display indicates the second global permission level and the information indicative of the application-specific permission level for the first software application indicates the first application-specific permission level, iii) the information indicative of a global permission level for the expandable display indicates the third global permission level, the information indicative of the application-specific permission level for the first software application indicates the first application-specific permission level, or iv) the information indicative of a global permission level for the expandable display indicates the third global permission level, the information indicative of the application-specific permission level for the first software application indicates the second application-specific permission level, and the controller receives a confirmation signal indicative of a user authorization to permit actuation of the expandable display from the non-expanded state to the expanded state.

In some implementations of the apparatus, the controller may be further configured to, upon determining that the information indicative of a global permission level for the expandable display indicates the third global permission level and the information indicative of the application-specific permission level for the first software application indicates the second application-specific permission level, cause a user prompt to be presented by the apparatus and receive the confirmation signal responsive to input received after presentation of the user prompt.

In some implementations of the apparatus, the apparatus may include one or more accelerometers mounted therein, and the controller may be further configured to: obtain acceleration data from the one or more accelerometers, determine when the acceleration data indicates an acceleration consistent with a free-fall state, and cause the expandable display, when in the expanded state, to transition to the non-expanded state responsive to determining that the acceleration data indicates acceleration consistent with the free-fall state.

In some implementations, an apparatus may be provided that includes a housing, an expandable display, an actuation mechanism, and a controller. The expandable display may be transitionable at least between an expanded state and a non-expanded state, the actuation mechanism may be configured to cause the expandable display to transition between the expanded state and the non-expanded state responsive to receipt of one or more signals, the controller may be configured to cause the actuation mechanism to transition to a selected expansion state selected from a group including at least the expanded state and the non-expanded state responsive to receipt of an expansion state change signal, the controller may be configured to obtain sensor data from one or more sensors of the apparatus, and the controller may be configured to determine whether the sensor data indicates a potential fault condition in the expandable display.

In some implementations of the apparatus, the controller may be further configured to: determine an actual expansion state of the expandable display based on the sensor data, and cause graphical content presented by the expandable display to be formatted based on the actual expansion state of the expandable display.

In some implementations of the apparatus, the apparatus may further include one or more ultrasonic fingerprint sensors that are part of the expandable display and the controller may be further configured to cause a first portion of the ultrasonic fingerprint sensor to enter an inactive state when the selected expansion state is the expanded state and responsive to determining that the actual expansion state is not the expanded state.

In some implementations of the apparatus, the one or more sensors of the apparatus may include one or more touch-sensing systems configured to receive touch-inputs to the expandable display and the sensor data used to determine whether the sensor data indicates a potential fault condition in the expandable display may include touch sensor data from the one or more touch-sensing systems.

In some implementations of the apparatus, the expandable display may be a flexible rollable display and the controller may be further configured to cause the apparatus to present a prompt with instructions for a user to provide a particular touch input to the expandable display, determine characteristics of a touch input detected by the one or more touch-sensing systems after causing the prompt to be presented and relative to a coordinate system of the one or more touch-sensing systems, and determine an actual expansion state of the expandable display by comparing the touch input characteristics against expected touch input characteristics associated with the particular touch input.

In some implementations of the apparatus, the instructions for the user to provide the particular touch input to the expandable display may include instructions that, when followed, cause the user to touch an exposed portion of the flexible rollable display that is proximate an edge of the expandable display. In such implementations, the edge may be proximate to a roller onto which the flexible rollable display is mounted.

In some implementations of the apparatus, the expandable display may include a first display panel and a second display panel, the first display panel and the second display panel may be configured to translate relative to one another along a first axis so as to transition between the expanded state and the non-expanded state, and the first display panel may at least partially overlay the second display panel when in the non-expanded state and viewed along a direction normal to the first display panel. The first display panel may have a first touch-sensing system of the one or more touch-sensing systems and the first touch-sensing system may be configured to receive touch-inputs to the first display panel, and the second display panel may have a second touch-sensing system of the one or more touch-sensing systems and the second touch-sensing system may be configured to receive touch-inputs to the second display panel. In such implementations, the controller may be further configured to cause the apparatus to present a prompt with instructions for a user to provide a particular touch input to the expandable display, determine characteristics of a touch input detected by the one or more touch-sensing systems after causing the prompt to be presented and relative to a coordinate system of the one or more touch-sensing systems, and determine an actual expansion state of the expandable display by comparing the touch input characteristics against expected touch input characteristics associated with the particular touch input.

In some implementations of the apparatus, the instructions for the user to provide the particular touch input to the expandable display may include instructions that, when followed, cause the user to touch an exposed portion of the expandable display that is proximate a first edge of an exposed portion of the expandable display and to move the touch input across at least part of the expandable display toward a second edge of the exposed portion of the expandable display opposite the first edge. In such implementations, the first edge and second edge of the expandable display may define, at least in part, a viewable area of the expandable display, and the first edge and second edge may be transverse to the first axis.

In some implementations of the apparatus, the apparatus may further include one or more ultrasonic fingerprint sensors (or already include one or more ultrasonic fingerprint sensors), and the sensor data may include ultrasonic scan data from the one or more ultrasonic fingerprint sensors and the controller may be configured to determine whether the potential fault condition exists in the expandable display based on the ultrasonic scan data.

In some such implementations of the apparatus, the determination of whether the potential fault condition exists may be based on an identification of an artifact in the ultrasonic scan data indicative of an edge of the housing of the apparatus, a determination of a location of the artifact relative to a coordinate system, and a comparison of the location of the artifact to an expected location of the edge of the housing of the apparatus in the selected expansion state relative to the coordinate system.

In some implementations of the apparatus, the controller may be further configured to determine an actual expansion state of the expandable display based on the comparison of the location of the artifact to the expected location of the edge of the housing of the apparatus in the selected expansion state relative to the coordinate system and cause graphical content presented by the expandable display to be formatted based on the actual expansion state of the expandable display.

In some implementations of the apparatus, the housing may include a first portion and a second portion that are configured to translate relative to one another when the expandable display transitions between the expanded and non-expanded states, the one or more sensors of the apparatus may include one or more optical distance measurement sensors, the one or more optical distance measurement sensors may be configured to measure a distance between a first point that is fixed with respect to the first portion and a second point that is fixed with respect to the second portion, and the controller may be configured to determine whether the potential fault condition exists in the expandable display based on optical distance measurement data from the one or more optical distance measurement sensors.

In some implementations of the apparatus, the one or more sensors of the apparatus may include one or more rotational or linear encoders, the one or more rotational or linear encoders may be configured to monitor an actuation state of the actuation mechanism, and the controller may be configured to determine whether the potential fault condition exists in the expandable display includes rotational or linear encoder data from the one or more rotational or linear encoders.

In some implementations of the apparatus, the one or more sensors of the apparatus may include one or more sensors configured to monitor one or more of voltage, current, and power provided to the actuation mechanism, and the controller may be configured to determine whether the potential fault condition exists in the expandable display based on data on one or more of voltage, current, and power provided to the actuation mechanism. The data on one or more of voltage, current, and power may be provided by the one or more sensors configured to monitor one or more of voltage, current, and power provided to the actuation mechanism.

In some implementations, a method of managing operation of an expandable display in an apparatus may be provided. The expandable display may be transitionable at least between an expanded state and a non-expanded state using an actuation mechanism, and the method may include: a) receiving a display expansion request signal, b) determining, responsive to (a), that one or more expansion conditions are met, and c) causing the actuation mechanism, when the expandable display is in the non-expanded state, to transition the expandable display from the non-expanded state to the expanded state responsive to receipt of the display expansion request signal and to the determination that the one or more expansion conditions are met.

In some implementations of the method, the method may further include obtaining information indicative of a battery charge level of one or more batteries used to power the actuation mechanism, and the one or more expansion conditions may be met, at least in part, by the battery charge level being above a first threshold amount.

In some implementations of the method, the one or more expansion conditions may be met, at least in part, or further met, at least in part, when a first software application that is in the foreground is associated with information that indicates that the first software application is compatible with the expandable display.

In some implementations of the method, the method may further include obtaining information on a global permission level for the expandable display, the global permission level selected from a group of global permission levels including at least a first global permission level and a second global permission level, and obtaining information on an application-specific permission level for the first software application, the application-specific permission level selected from a group of application-specific permission levels including at least a first application-specific permission level and a second application-specific permission level. The one or more expansion conditions may be further met, at least in part, when either i) the information indicative of a global permission level for the expandable display indicates the first global permission level or ii) the information indicative of a global permission level for the expandable display indicates the second global permission level and the information indicative of the application-specific permission level for the first software application indicates the first application-specific permission level.

In some alternative implementations of the method, the method may further include obtaining information on a global permission level for the expandable display, the global permission level selected from a group of global permission levels including at least a first global permission level, a second global permission level, and a third global permission level, and obtaining information on an application-specific permission level for the first software application, the application-specific permission level selected from a group of application-specific permission levels including at least a first application-specific permission level and a second application-specific permission level. In such implementations, the one or more expansion conditions may be further met, at least in part, when i) the information indicative of a global permission level for the expandable display indicates the first global permission level, ii) the information indicative of a global permission level for the expandable display indicates the second global permission level and the information indicative of the application-specific permission level for the first software application indicates the first application-specific permission level, iii) the information indicative of a global permission level for the expandable display indicates the third global permission level, the information indicative of the application-specific permission level for the first software application indicates the first application-specific permission level, or iv) the information indicative of a global permission level for the expandable display indicates the third global permission level, the information indicative of the application-specific permission level for the first software application indicates the second application-specific permission level, and the controller receives a confirmation signal indicative of a user authorization to permit actuation of the expandable display from the non-expanded state to the expanded state.

In some further implementations of the method, the method may further include determining that the information indicative of the global permission level for the expandable display indicates the third global permission level and that the information indicative of the application-specific permission level for the first software application indicates the second application-specific permission level, causing, responsive to determining that the information indicative of the global permission level for the expandable display indicates the third global permission level and that the information indicative of the application-specific permission level for the first software application indicates the second application-specific permission level, a user prompt to be presented by the apparatus, and receiving the confirmation signal responsive to input received after presentation of the user prompt.

In some implementations of the method, the method may further include obtaining acceleration data from one or more accelerometers mounted within the apparatus, determining that the acceleration data indicates an acceleration consistent with a free-fall state, and causing the expandable display, when in the expanded state, to transition to the non-expanded state responsive to determining that the acceleration data indicates acceleration consistent with the free-fall state.

In some implementations, a method may be provided that includes receiving an expansion state change signal indicative of a selected expansion state for an expandable display that is transitionable at least between an expanded state and a non-expanded state, causing an actuation mechanism of an apparatus having the expandable display to attempt to transition the expandable display to the selected expansion state, obtaining sensor data from one or more sensors of the apparatus, and determining whether the sensor data indicates a potential fault condition in the expandable display.

In some implementations of the method, the method may further include determining an actual expansion state of the expandable display based on the sensor data, and causing graphical content presented by the expandable display to be formatted based on the actual expansion state of the expandable display.

In some implementations of the method, the method may further include causing a first portion of an ultrasonic fingerprint sensor that is part of the expandable display to enter an inactive state when the selected expansion state is the expanded state and responsive to determining that the actual expansion state is not the expanded state.

In some implementations of the method, the one or more sensors of the apparatus may include one or more touch-sensing systems configured to receive touch-inputs to the expandable display and the sensor data used to determine whether the sensor data indicates a potential fault condition in the expandable display may include touch sensor data from the one or more touch-sensing systems.

In some implementations of the method, the expandable display may be a flexible rollable display and the method may further include causing the apparatus to present a prompt with instructions for a user to provide a particular touch input to the expandable display, determining characteristics of a touch input detected by the one or more touch-sensing systems after causing the prompt to be presented and relative to a coordinate system of the one or more touch-sensing systems, and determining an actual expansion state of the expandable display by comparing the touch input characteristics against expected touch input characteristics associated with the particular touch input.

In some implementations of the method, the instructions for the user to provide the particular touch input to the expandable display may include instructions that, when followed, cause the user to touch an exposed portion of the flexible rollable display that is proximate an edge of the expandable display. In such implementations, the edge may be proximate to a roller onto which the flexible rollable display is mounted.

In some implementations of the method, the expandable display may include a first display panel and a second display panel, the first display panel and the second display panel may be configured to translate relative to one another along a first axis so as to transition between the expanded state and the non-expanded state, and the first display panel may at least partially overlay the second display panel when in the non-expanded state and viewed along a direction normal to the first display panel. The first display panel may have a first touch-sensing system of the one or more touch-sensing systems and the first touch-sensing system may be configured to receive touch-inputs to the first display panel. The second display panel may similarly have a second touch-sensing system of the one or more touch-sensing systems, and the second touch-sensing system may be configured to receive touch-inputs to the second display panel. In such implementations, the method may further include causing the apparatus to present a prompt with instructions for a user to provide a particular touch input to the expandable display, determining characteristics of a touch input detected by the one or more touch-sensing systems after causing the prompt to be presented and relative to a coordinate system of the one or more touch-sensing systems, and determining an actual expansion state of the expandable display by comparing the touch input characteristics against expected touch input characteristics associated with the particular touch input.

In some implementations of the method, the instructions for the user to provide the particular touch input to the expandable display may include instructions that, when followed, cause the user to touch an exposed portion of the expandable display that is proximate a first edge of an exposed portion of the expandable display and to move the touch input across at least part of the expandable display toward a second edge of the exposed portion of the expandable display opposite the first edge. In such implementations, the first edge and second edge of the expandable display may define, at least in part, a viewable area of the expandable display, and the first edge and second edge may be transverse to the first axis.

In some implementations of the method, the sensor data may include ultrasonic scan data from one or more ultrasonic fingerprint sensors associated with the expandable display, and the determination of whether the potential fault condition exists in the expandable display may be based on the ultrasonic scan data.

In some implementations of the method, the determination of whether the potential fault condition exists is may be based on an identification of an artifact in the ultrasonic scan data indicative of an edge of a housing of the apparatus, a determination of a location of the artifact relative to a coordinate system, and a comparison of the location of the artifact to an expected location of the edge of the housing of the apparatus in the selected expansion state relative to the coordinate system.

In some implementations of the method, the method may further include determining an actual expansion state of the expandable display based on the comparison of the location of the artifact to the expected location of the edge of the housing of the apparatus in the selected expansion state relative to the coordinate system, and causing graphical content presented by the expandable display to be formatted based on the actual expansion state of the expandable display.

In some implementations of the method, the method may further include obtaining optical distance measurement data from one or more optical measurement systems that are configured to measure a distance between a first point that is fixed with respect to a first portion of a housing of the apparatus and a second point that is fixed with respect to a second portion of the housing that is movable relative to the first portion, and determining whether the potential fault condition exists in the expandable display based on optical distance measurement data from the one or more optical measurement systems.

In some implementations of the method, determining whether the potential fault condition exists in the expandable display may be based, at least in part, on rotational or linear encoder data from one or more rotational or linear encoders that are configured to monitor the actuation state of the actuation mechanism.

In some implementations of the method, determining whether the potential fault condition exists in the expandable display may be based on data on one or more of voltage, current, and power provided to the actuation mechanism. In such implementations, the data on one or more of voltage, current, and power may be provided by one or more sensors configured to monitor one or more of voltage, current, and power provided to the actuation mechanism.

In some implementations, a non-transitory computer-readable medium storing computer-executable instructions may be provided. The computer-executable instructions, when executed by one or more processors of an apparatus having an expandable display that is transitionable at least between an expanded state and a non-expanded state using an actuation mechanism, may cause the one or more processors to: a) receive a display expansion request signal, b) determine, responsive to (a), whether one or more expansion conditions are met, c) cause the actuation mechanism, when the expandable display is in the non-expanded state, to transition the expandable display from the non-expanded state to the expanded state responsive to receipt of the display expansion request signal and a determination that the one or more expansion conditions are met, and d) cause the actuation mechanism, when the expandable display is in the non-expanded state, to cause the expandable display to remain in the non-expanded state responsive to receipt of the display expansion request signal and a determination that the one or more expansion conditions are not met.

In some implementations of the non-transitory computer-readable medium, the computer-readable medium may further store computer-executable instructions which, when executed by the one or more processors, cause the one or more processors to obtain information indicative of a battery charge level of one or more batteries used to power the actuation mechanism. In such implementations, the one or more expansion conditions may be met, at least in part, by the battery charge level being above a first threshold amount.

In some implementations of the non-transitory computer-readable medium, the one or more expansion conditions may be met, at least in part, or further met, at least in part, when a first software application that is in the foreground is associated with information that indicates that the first software application is compatible with the expandable display.

In some implementations of the non-transitory computer-readable medium, the computer-readable medium may further store computer-executable instructions which, when executed by the one or more processors, cause the one or more processors to obtain information on a global permission level for the expandable display, the global permission level selected from a group of global permission levels including at least a first global permission level and a second global permission level, and obtain information on an application-specific permission level for the first software application, the application-specific permission level selected from a group of application-specific permission levels including at least a first application-specific permission level and a second application-specific permission level. In such implementations, the one or more expansion conditions may be further met, at least in part, when either i) the information indicative of a global permission level for the expandable display indicates the first global permission level or ii) the information indicative of a global permission level for the expandable display indicates the second global permission level and the information indicative of the application-specific permission level for the first software application indicates the first application-specific permission level.

In some other implementations of the non-transitory computer-readable medium, the computer-readable medium may further store computer-executable instructions which, when executed by the one or more processors, cause the one or more processors to obtain information on a global permission level for the expandable display, the global permission level selected from a group of global permission levels including at least a first global permission level, a second global permission level, and a third global permission level, and obtain information on an application-specific permission level for the first software application, the application-specific permission level selected from a group of application-specific permission levels including at least a first application-specific permission level and a second application-specific permission level. In such implementations, the one or more expansion conditions may be further met, at least in part, when i) the information indicative of a global permission level for the expandable display indicates the first global permission level, ii) the information indicative of a global permission level for the expandable display indicates the second global permission level and the information indicative of the application-specific permission level for the first software application indicates the first application-specific permission level, iii) the information indicative of a global permission level for the expandable display indicates the third global permission level, the information indicative of the application-specific permission level for the first software application indicates the first application-specific permission level, or iv) the information indicative of a global permission level for the expandable display indicates the third global permission level, the information indicative of the application-specific permission level for the first software application indicates the second application-specific permission level, and the controller receives a confirmation signal indicative of a user authorization to permit actuation of the expandable display from the non-expanded state to the expanded state.

In some implementations of the non-transitory computer-readable medium, the computer-readable medium may further store computer-executable instructions which, when executed by the one or more processors, cause the one or more processors to determine that the information indicative of the global permission level for the expandable display indicates the third global permission level and that the information indicative of the application-specific permission level for the first software application indicates the second application-specific permission level, cause, responsive to determining that the information indicative of the global permission level for the expandable display indicates the third global permission level and that the information indicative of the application-specific permission level for the first software application indicates the second application-specific permission level, a user prompt to be presented by the apparatus, and receive the confirmation signal responsive to input received after presentation of the user prompt.

In some implementations of the non-transitory computer-readable medium, the computer-readable medium may further store computer-executable instructions which, when executed by the one or more processors, cause the one or more processors to obtain acceleration data from one or more accelerometers mounted within the apparatus, determine that the acceleration data indicates an acceleration consistent with a free-fall state, and cause the expandable display, when in the expanded state, to transition to the non-expanded state responsive to determining that the acceleration data indicates acceleration consistent with the free-fall state.

In some implementations of the non-transitory computer-readable medium, the computer-readable medium may further store computer-executable instructions which, when executed by the one or more processors, cause the one or more processors to receive an expansion state change signal indicative of a selected expansion state for an expandable display that is transitionable at least between an expanded state and a non-expanded state, cause an actuation mechanism of an apparatus having the expandable display to attempt to transition the expandable display to the selected expansion state, obtain sensor data from one or more sensors of the apparatus, and determine whether the sensor data indicates a potential fault condition in the expandable display.

In some implementations of the non-transitory computer-readable medium, the computer-readable medium may further store computer-executable instructions which, when executed by the one or more processors, cause the one or more processors to determine an actual expansion state of the expandable display based on the sensor data and cause graphical content presented by the expandable display to be formatted based on the actual expansion state of the expandable display.

In some implementations of the non-transitory computer-readable medium, the computer-readable medium may further store computer-executable instructions which, when executed by the one or more processors, cause the one or more processors to cause a first portion of an ultrasonic fingerprint sensor that is part of the expandable display to enter an inactive state when the selected expansion state is the expanded state and responsive to determining that the actual expansion state is not the expanded state.

In some implementations of the non-transitory computer-readable medium, the one or more sensors of the apparatus may include one or more touch-sensing systems configured to receive touch-inputs to the expandable display and the sensor data used to determine whether the sensor data indicates a potential fault condition in the expandable display may include touch sensor data from the one or more touch-sensing systems.

In some implementations of the non-transitory computer-readable medium, the expandable display may be a flexible rollable display and the non-transitory computer-readable medium may further store computer-executable instructions which, when executed by the one or more processors, cause the one or more processors to cause the apparatus to present a prompt with instructions for a user to provide a particular touch input to the expandable display, determine characteristics of a touch input detected by the one or more touch-sensing systems after causing the prompt to be presented and relative to a coordinate system of the one or more touch-sensing systems, and determine an actual expansion state of the expandable display by comparing the touch input characteristics against expected touch input characteristics associated with the particular touch input.

In some implementations of the non-transitory computer-readable medium, the instructions for the user to provide the particular touch input to the expandable display may include instructions that, when followed, cause the user to touch an exposed portion of the flexible rollable display that is proximate an edge of the expandable display. In such implementations, the edge may be proximate to a roller onto which the flexible rollable display is mounted.

In some implementations of the non-transitory computer-readable medium, the expandable display may include a first display panel and a second display panel and the first display panel and the second display panel are configured to translate relative to one another along a first axis so as to transition between the expanded state and the non-expanded state. In such implementations, the first display panel may at least partially overlay the second display panel when in the non-expanded state and viewed along a direction normal to the first display panel and may have a first touch-sensing system of the one or more touch-sensing systems and that is configured to receive touch-inputs to the first display panel. In such implementations, the second display panel may similarly have a second touch-sensing system of the one or more touch-sensing systems and that is configured to receive touch-inputs to the second display panel. In such implementations, the computer-readable medium may further store computer-executable instructions which, when executed by the one or more processors, cause the one or more processors to cause the apparatus to present a prompt with instructions for a user to provide a particular touch input to the expandable display, determine characteristics of a touch input detected by the one or more touch-sensing systems after causing the prompt to be presented and relative to a coordinate system of the one or more touch-sensing systems, and determine an actual expansion state of the expandable display by comparing the touch input characteristics against expected touch input characteristics associated with the particular touch input.

In some implementations of the non-transitory computer-readable medium, the instructions for the user to provide the particular touch input to the expandable display may include instructions that, when followed, cause the user to touch an exposed portion of the expandable display that is proximate a first edge of an exposed portion of the expandable display and to move the touch input across at least part of the expandable display toward a second edge of the exposed portion of the expandable display opposite the first edge. In such implementations, the first edge and second edge of the expandable display may define, at least in part, a viewable area of the expandable display, and the first edge and second edge may be transverse to the first axis.

In some implementations of the non-transitory computer-readable medium, the sensor data may include ultrasonic scan data from one or more ultrasonic fingerprint sensors associated with the expandable display, and the determination of whether the potential fault condition exists in the expandable display may be based on the ultrasonic scan data.

In some implementations of the non-transitory computer-readable medium, the determination of whether the potential fault condition exists may be based on an identification of an artifact in the ultrasonic scan data indicative of an edge of a housing of the apparatus, a determination of a location of the artifact relative to a coordinate system, and a comparison of the location of the artifact to an expected location of the edge of the housing of the apparatus in the selected expansion state relative to the coordinate system.

In some implementations of the non-transitory computer-readable medium, the computer-readable medium may further store computer-executable instructions which, when executed by the one or more processors, cause the one or more processors to determine an actual expansion state of the expandable display based on the comparison of the location of the artifact to the expected location of the edge of the housing of the apparatus in the selected expansion state relative to the coordinate system, and cause graphical content presented by the expandable display to be formatted based on the actual expansion state of the expandable display.

In some implementations of the non-transitory computer-readable medium, the computer-readable medium may further store computer-executable instructions which, when executed by the one or more processors, cause the one or more processors to obtain optical distance measurement data from one or more optical measurement systems that are configured to measure a distance between a first point that is fixed with respect to a first portion of a housing of the apparatus and a second point that is fixed with respect to a second portion of the housing that is movable relative to the first portion, and determine whether the potential fault condition exists in the expandable display based on optical distance measurement data from the one or more optical measurement systems.

In some implementations of the non-transitory computer-readable medium, the computer-readable medium may further store computer-executable instructions which, when executed by the one or more processors, cause the one or more processors to determine whether the potential fault condition exists in the expandable display based, at least in part, on rotational or linear encoder data from one or more rotational or linear encoders that are configured to monitor the actuation state of the actuation mechanism.

In some implementations of the non-transitory computer-readable medium, the computer-readable medium may further store computer-executable instructions which, when executed by the one or more processors, cause the one or more processors to determine whether the potential fault condition exists in the expandable display based on data on one or more of voltage, current, and power provided to the actuation mechanism. The data on one or more of voltage, current, and power may be provided by one or more sensors configured to monitor one or more of voltage, current, and power provided to the actuation mechanism.

In some implementations, an apparatus may be provided that includes expandable display means, actuation means, and control means. The expandable display means may be transitionable at least between an expanded state and a non-expanded state, the actuation means may be configured to cause the expandable display means to transition between the expanded state and the non-expanded state responsive to receipt of one or more signals, and the control means may be configured to a) receive a display expansion request signal, b) determine, responsive to (a), whether one or more expansion conditions are met, c) cause the actuation means, when the expandable display means is in the non-expanded state, to transition the expandable display means from the non-expanded state to the expanded state responsive to receipt of the display expansion request signal and a determination that the one or more expansion conditions are met, and d) cause the actuation means, when the expandable display means is in the non-expanded state, to cause the expandable display means to remain in the non-expanded state responsive to receipt of the display expansion request signal and a determination that the one or more expansion conditions are not met.

In some implementations of the apparatus, the control means may be configured to obtain information indicative of a battery charge level of one or more batteries used to power the actuation means, and the one or more expansion conditions may be met, at least in part, by the battery charge level being above a first threshold amount.

In some implementations of the apparatus, the one or more expansion conditions may be met, at least in part, or further met, at least in part, when a first software application that is in the foreground is associated with information that indicates that the first software application is compatible with the expandable display means.

In some implementations of the apparatus, the apparatus may further include one or more memory means that store a) information indicative of a global permission level for the expandable display means and b) information indicative of an application-specific permission level for each software application of a plurality of software applications executable by the apparatus. The plurality of software applications may include the first software application, the global permission level may be selected from a group of global permission levels including at least a first global permission level and a second global permission level, each application-specific permission level may be selected from a group of application-specific permission levels including at least a first application-specific permission level and a second application-specific permission level, and the one or more expansion conditions may be further met, at least in part, when either i) the information indicative of a global permission level for the expandable display means indicates the first global permission level or ii) the information indicative of a global permission level for the expandable display means indicates the second global permission level and the information indicative of the application-specific permission level for the first software application indicates the first application-specific permission level.

In some implementations of the apparatus, the apparatus further include one or more memory means that store a) information indicative of a global permission level for the expandable display means and b) information indicative of an application-specific permission level for each software application of a plurality of software applications executable by the apparatus. The plurality of software applications may include the first software application, the global permission level may be selected from a group of global permission levels including at least a first global permission level, a second global permission level, and a third global permission level, and each application-specific permission level may be selected from a group of application-specific permission levels including at least a first application-specific permission level and a second application-specific permission level. The one or more expansion conditions may further be met, at least in part, when i) the information indicative of a global permission level for the expandable display means indicates the first global permission level, ii) the information indicative of a global permission level for the expandable display means indicates the second global permission level and the information indicative of the application-specific permission level for the first software application indicates the first application-specific permission level, iii) the information indicative of a global permission level for the expandable display means indicates the third global permission level, the information indicative of the application-specific permission level for the first software application indicates the first application-specific permission level, or iv) the information indicative of a global permission level for the expandable display means indicates the third global permission level, the information indicative of the application-specific permission level for the first software application indicates the second application-specific permission level, and the control means receives a confirmation signal indicative of a user authorization to permit actuation of the expandable display means from the non-expanded state to the expanded state.

In some implementations of the apparatus, the control means may further be configured to, upon determining that the information indicative of a global permission level for the expandable display means indicates the third global permission level and the information indicative of the application-specific permission level for the first software application indicates the second application-specific permission level, cause a user prompt to be presented by the apparatus, and receive the confirmation signal responsive to input received after presentation of the user prompt.

In some implementations of the apparatus, the apparatus may further include one or more accelerometers mounted in the apparatus, and the control means may further be configured to obtain acceleration data from the one or more accelerometers, determine when the acceleration data indicates an acceleration consistent with a free-fall state, and cause the expandable display means, when in the expanded state, to transition to the non-expanded state responsive to determining that the acceleration data indicates acceleration consistent with the free-fall state.

In some implementations of the apparatus, the apparatus may further include a housing, expandable display means, actuation means, and a control means. The expandable display means may be transitionable at least between an expanded state and a non-expanded state, the actuation means may be configured to cause the expandable display means to transition between the expanded state and the non-expanded state responsive to receipt of one or more signals, the control means may be configured to cause the actuation means to transition to a selected expansion state selected from a group including at least the expanded state and the non-expanded state responsive to receipt of an expansion state change signal, the control means may be configured to obtain sensor data from one or more sensors of the apparatus, and the control means may be configured to determine whether the sensor data indicates a potential fault condition in the expandable display means.

In some implementations of the apparatus, the control means may be further configured to determine an actual expansion state of the expandable display means based on the sensor data, and cause graphical content presented by the expandable display means to be formatted based on the actual expansion state of the expandable display means.

In some implementations of the apparatus, the apparatus may further include one or more ultrasonic fingerprint sensors that are part of the expandable display means and the control means may be further configured to cause a first portion of the ultrasonic fingerprint sensor to enter an inactive state when the selected expansion state is the expanded state and responsive to determining that the actual expansion state is not the expanded state.

In some implementations of the apparatus, the one or more sensors of the apparatus may include one or more touch-sensing systems configured to receive touch-inputs to the expandable display means and the sensor data used to determine whether the sensor data indicates a potential fault condition in the expandable display means may include touch sensor data from the one or more touch-sensing systems.

In some implementations of the apparatus, the expandable display means may be a flexible rollable display and the control means may be further configured to cause the apparatus to present a prompt with instructions for a user to provide a particular touch input to the expandable display means, determine characteristics of a touch input detected by the one or more touch-sensing systems after causing the prompt to be presented and relative to a coordinate system of the one or more touch-sensing systems, and determine an actual expansion state of the expandable display means by comparing the touch input characteristics against expected touch input characteristics associated with the particular touch input.

In some implementations of the apparatus, the instructions for the user to provide the particular touch input to the expandable display means may include instructions that, when followed, cause the user to touch an exposed portion of the flexible rollable display that is proximate an edge of the expandable display means. The edge may be proximate to a roller onto which the flexible rollable display is mounted.

In some implementations of the apparatus, the expandable display means may include a first display panel and a second display panel, the first display panel and the second display panel may be configured to translate relative to one another along a first axis so as to transition between the expanded state and the non-expanded state, and the first display panel may at least partially overlay the second display panel when in the non-expanded state and viewed along a direction normal to the first display panel. The first display panel may have a first touch-sensing system of the one or more touch-sensing systems and the first touch-sensing system may be configured to receive touch-inputs to the first display panel, while the second display panel may have a second touch-sensing system of the one or more touch-sensing systems, and the second touch-sensing system may be configured to receive touch-inputs to the second display panel. The control means may be further configured to cause the apparatus to present a prompt with instructions for a user to provide a particular touch input to the expandable display means, determine characteristics of a touch input detected by the one or more touch-sensing systems after causing the prompt to be presented and relative to a coordinate system of the one or more touch-sensing systems, and determine an actual expansion state of the expandable display means by comparing the touch input characteristics against expected touch input characteristics associated with the particular touch input.

In some implementations of the apparatus, the instructions for the user to provide the particular touch input to the expandable display means may include instructions that, when followed, cause the user to touch an exposed portion of the expandable display means that is proximate a first edge of an exposed portion of the expandable display means and to move the touch input across at least part of the expandable display means toward a second edge of the exposed portion of the expandable display means opposite the first edge. In such implementations, the first edge and second edge of the expandable display means may define, at least in part, a viewable area of the expandable display means, and the first edge and second edge may be transverse to the first axis.

In some implementations of the apparatus, the apparatus may further include one or more ultrasonic fingerprint sensors (if not already present) and the sensor data may include ultrasonic scan data from the one or more ultrasonic fingerprint sensors, and the control means may be configured to determine whether the potential fault condition exists in the expandable display means based on the ultrasonic scan data.

In some implementations of the apparatus, the determination of whether the potential fault condition exists may be based on an identification of an artifact in the ultrasonic scan data indicative of an edge of the housing of the apparatus, a determination of a location of the artifact relative to a coordinate system, and a comparison of the location of the artifact to an expected location of the edge of the housing of the apparatus in the selected expansion state relative to the coordinate system.

In some implementations of the apparatus, the control means may be further configured to determine an actual expansion state of the expandable display means based on the comparison of the location of the artifact to the expected location of the edge of the housing of the apparatus in the selected expansion state relative to the coordinate system, and cause graphical content presented by the expandable display means to be formatted based on the actual expansion state of the expandable display means.

In some implementations of the apparatus, the housing may include a first portion and a second portion that are configured to translate relative to one another when the expandable display means transitions between the expanded and non-expanded states, the one or more sensors of the apparatus may include one or more optical distance measurement sensors, the one or more optical distance measurement sensors may be configured to measure a distance between a first point that is fixed with respect to the first portion and a second point that is fixed with respect to the second portion, and the control means may be configured to determine whether the potential fault condition exists in the expandable display means based on optical distance measurement data from the one or more optical distance measurement sensors.

In some implementations of the apparatus, the one or more sensors of the apparatus may include one or more rotational or linear encoders, the one or more rotational or linear encoders may be configured to monitor an actuation state of the actuation means, and the control means may be configured to determine whether the potential fault condition exists in the expandable display means includes rotational or linear encoder data from the one or more rotational or linear encoders.

In some implementations of the apparatus, the one or more sensors of the apparatus may include one or more sensors configured to monitor one or more of voltage, current, and power provided to the actuation means, and the control means may be configured to determine whether the potential fault condition exists in the expandable display means based on data on one or more of voltage, current, and power provided to the actuation means. The data on one or more of voltage, current, and power may be provided by the one or more sensors configured to monitor one or more of voltage, current, and power provided to the actuation means.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

FIG. 20 depicts the same apparatus 1900 as in FIG. 19, but with the apparatus having experienced a fault that leaves the expandable display only partially extended when in the expanded state.

FIGS. 22 through 24 show a diagram of an apparatus with an expandable display that includes a first display panel and a second display panel in various expansion states.

The Figures are provided to facilitate understanding of the concepts discussed in this disclosure, and are intended to be illustrative of some implementations that fall within the scope of this disclosure but are not intended to be limiting—implementations consistent with this disclosure and which are not depicted in the Figures are still considered to be within the scope of this disclosure.

DETAILED DESCRIPTION

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, electronic photographs, stereo systems, DVD players, CD players, VCRs, radios, portable memory chips, aesthetic structures (such as display of images on a piece of jewelry or clothing) and a variety of EMS devices. The teachings herein also may be used in applications such as, but not limited to, parts of consumer electronics products, liquid crystal devices, and electrophoretic devices. Thus, the teachings are not intended to be limited to the implementations depicted solely in the Figures, but instead have wide applicability as will be readily apparent to one having ordinary skill in the art.

Figure 1A:
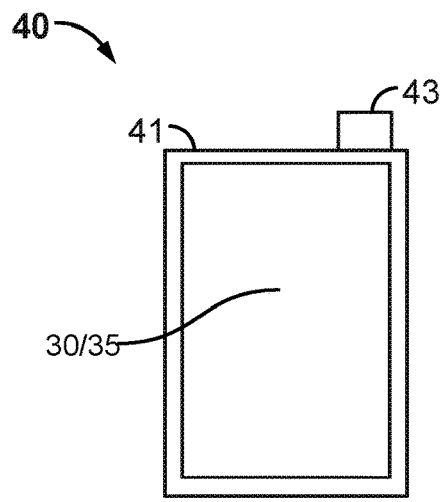
FIGS. 1A and 1B show examples of system block diagrams that illustrate an example device that may be configured to perform at least some methods described herein.
Figure 1B:
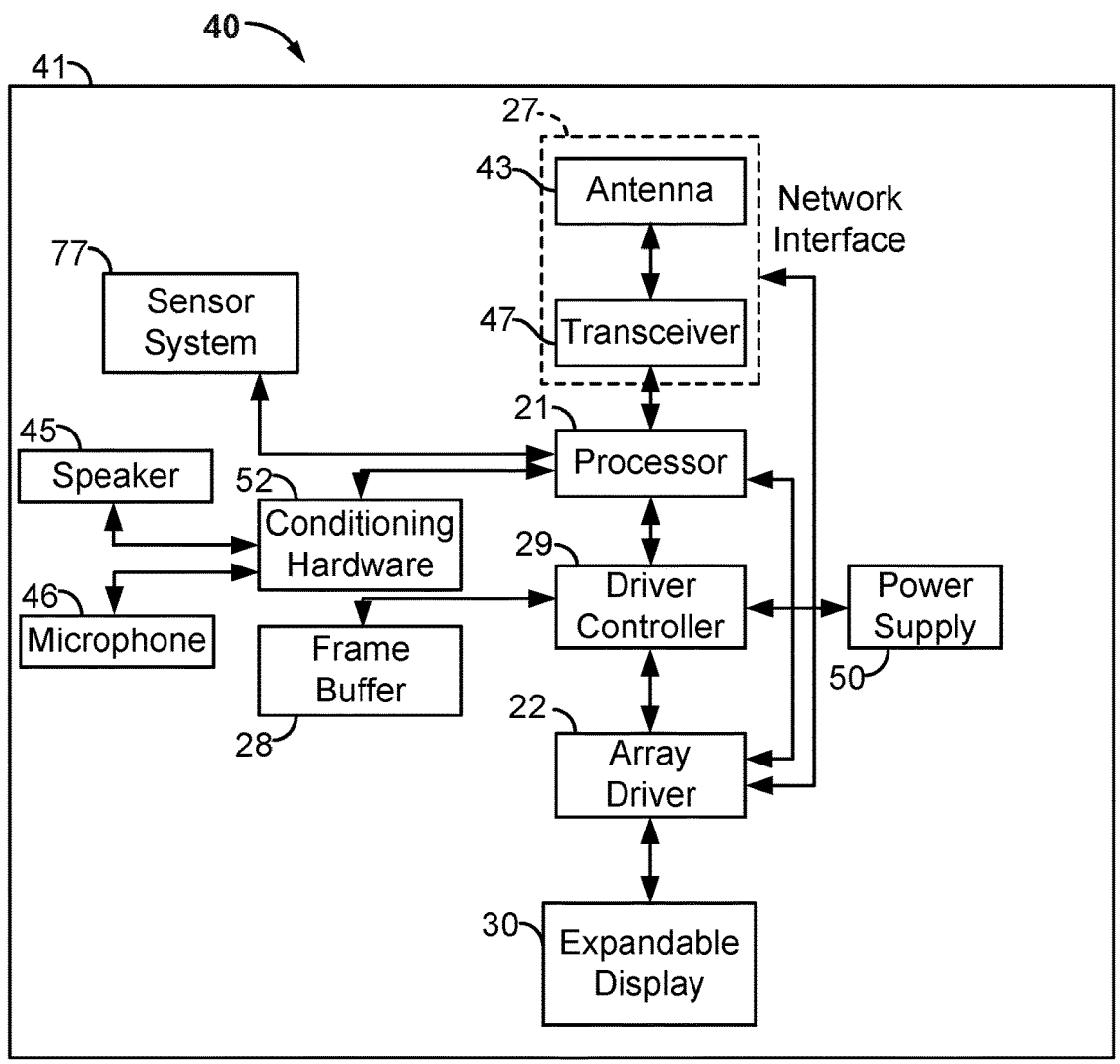

FIGS. 1A and 1B show examples of system block diagrams that illustrate an example device that may be configured to perform at least some methods described herein. The device 40 can be, for example, a cellular or mobile telephone. However, the same components of the device 40 or slight variations thereof are also illustrative of various types of devices such as tablets, e-readers, and portable media players.

The example device 40 includes a housing 41, an expandable display 30, a touch-sensing system 35, and an antenna 43. The housing 41 may be formed from any of a variety of manufacturing processes, including injection molding, and vacuum forming. In addition, the housing 41 may be made from, or include components made from, any of a variety of materials, including, but not limited to: plastic, metal, glass, rubber, and ceramic, or a combination thereof. The housing 41 may generally have at least two portions that, as discussed elsewhere herein, may be movable relative to one another to accommodate (or drive) the expansion functionality of the expandable display 30.

The expandable display 30 may be any of a variety of expandable displays, as noted herein, including expandable displays featuring multiple, separate display panels, flexible display panels, etc. The technologies used for the display panels may be any suitable technology, including, but not limited to, rigid- or flexible-substrate display panels, such as flexible or rigid active-matrix organic light emitting diode (AMOLED) display panels, plastic organic light emitting diode (POLED) display panels, flexible passive-matrix organic light emitting diode (PMOLED) display panels, OLED display panels, or other suitable display technology.

Various additional components of the device 40 are schematically illustrated in FIG. 1B. The device can, for example, include additional components at least partially enclosed within the housing 41. For example, the device 40 may include a network interface 27 that includes an antenna 43 which is coupled to a transceiver 47. The transceiver 47 may be connected to a processor 21, which may be connected to conditioning hardware 52. The conditioning hardware 52 may be configured to condition a signal (e.g., filter a signal) and may optionally also be connected with a speaker 45 and a microphone 46. The processor 21 may also be connected to a driver controller 29. The driver controller 29 may be coupled to a frame buffer 28, and to an array driver 22, which in turn is coupled to the expandable display 30, e.g., to one or more arrays of pixels within the expandable display 30. A power supply 50 may provide power to all components as required by the particular device 40 design.

In this example, the device 40 also includes a sensor system 77. In this example, the sensor system 77 includes the touch-sensing system 35. The sensor system 77 also may include other types of sensors, such as one or more cameras, optical distance sensors, linear or rotational encoder sensors, pressure sensors, infrared (IR) sensors, accelerometers, gyroscopes, orientation sensors, etc. In some implementations, the sensor system 77 may include part of the logic system of the device 40. For example, the sensor system 77 may include a touch controller that is configured to control, at least in part, the operations of the touch-sensing system 35. In alternative implementations, however, the processor 21 (or another such device) may be configured to provide some or all of this functionality. In some implementations, the processor 21 and the touch controller, if present, as well as other elements of the device 40 may be viewed as a controller for the device.

The network interface 27 may include the antenna 43 and the transceiver 47 so that the device 40 can communicate with one or more devices over a network. The network interface 27 also may have some processing capabilities to relieve, e.g., data processing requirements of the processor 21. The antenna 43 may transmit and receive signals. In some implementations, the antenna 43 may transmit and receive RF signals according to the IEEE 16.11 standard, including IEEE 16.11(a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 may be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G, or 5G technology. The transceiver 47 may pre-process the signals received from the antenna 43 so that they may be received by and further manipulated by the processor 21. The transceiver 47 may also process signals received from the processor 21 so that they may be transmitted from the device 40 via the antenna 43. The processor 21 may be configured to receive time data, e.g., from a time server, via the network interface 27.

In some implementations, the transceiver 47 may be replaced by a receiver. The processor 21 may control the overall operation of the device 40. The processor 21 may include a microcontroller, CPU, or logic unit to control operation of the device 40. The conditioning hardware 52 may include amplifiers and filters for transmitting signals to the speaker 45, and for receiving signals from the microphone 46. The conditioning hardware 52 may be discrete components within the device 40 or may be incorporated within the processor 21 or other components.

The driver controller 29 may take raw image data generated by the processor 21 either directly from the processor 21 or from the frame buffer 28 and may re-format the raw image data appropriately for high speed transmission to the array driver 22. In some implementations, the driver controller 29 may re-format the raw image data into a data flow having a raster-like format, such that it has a time order suitable for scanning across a pixel array of the expandable display 30. The driver controller 29 may then send the formatted information to the array driver 22. Although a driver controller 29, such as an LCD or OLED controller, is often associated with the system processor 21 as a stand-alone integrated circuit (IC), such controllers may be implemented in many ways. For example, controllers may be embedded in the processor 21 as hardware, embedded in the processor 21 as software, or fully integrated in hardware with the array driver 22.

The array driver 22 may receive the formatted information from the driver controller 29 and can re-format the image or video data into a parallel set of waveforms that are applied many times per second to the hundreds, and sometimes thousands (or more), of leads coming from the expandable display's X/Y matrix of pixels.

The power supply 50 may include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

As noted earlier, devices with expandable displays have started being developed and, in some instances, have been commercially released. For the purposes of this disclosure, it will be understood that an "expandable display" refers to an integrated display system in which the amount of visible active display area may be changed through physical movement of components of the display system; the components of such a display system may be physically connected such that such movement is constrained to a particular type of movement, e.g., in-plane rotational movement or translational movement.

There are generally two main types of expandable display, although the techniques and systems discussed herein are to be understood to be applicable to other types of expandable displays as well.

In the first type, two or more discrete display panels are arranged such that one or more of the display panels is able to move in one or more directions parallel to the display panel display area, thereby allowing the translatable display panel to move from a location underneath another one of the display panels, where the upper display panel masks the lower display panel (or at least a portion thereof) from view, to a location where the upper display panel no longer masks the lower display panel (or a previously masked portion thereof). Such movement may be linear, e.g., one display panel translating linearly relative to the other(s), rotational, e.g., one display panel rotating about an axis relative to the other(s), or a combination of linear and rotational movement. An example of such an expandable display is, for example, shown in FIGS. 22 through 24.

In the second type of expandable display, a single, flexible display panel is arranged such that a portion of the display panel is able to be flexed so as to allow part of the display panel to be stowed behind another part of the display panel (similar to a tambour door) and/or on a roller mechanism when in a non-expanded state and then moved or unrolled to an expanded state (similar to a roll-up shade, projector screen, or tape measure). For example, in some such expandable displays, the flexible display panel may be arranged so as to have its edges constrained within U- or J-shaped tracks, or supported by one or more rollers, such that when the flexible display panel is slid towards and into the 180° bend in the track (or towards the rollers), the flexible display panel is caused, by the track (or rollers), to itself bend in the same manner, thus causing a portion of the flexible display panel to slide in the opposite direction underneath a different portion of the flexible display panel. In other such expandable displays, the flexible display panel may have one edge that is attached to a roller such that when the roller rotates, the flexible display panel is either rolled onto or off of the roller, thus changing the amount of the flexible display panel that is able to be seen.

FIGS. 2 through 5 depict high-level diagrams two examples of apparatuses with expandable displays having flexible display panels.

Figure 2:
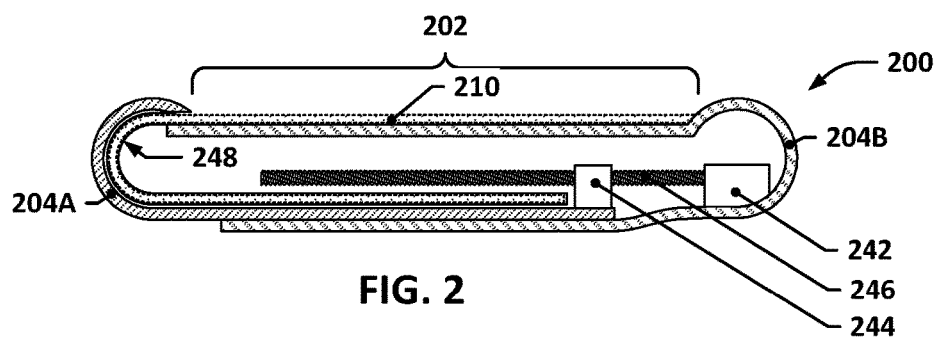
FIGS. 2 and 3 depict schematic views of an example apparatus with an expandable display in a non-expanded and expanded state, respectively.
Figure 3:
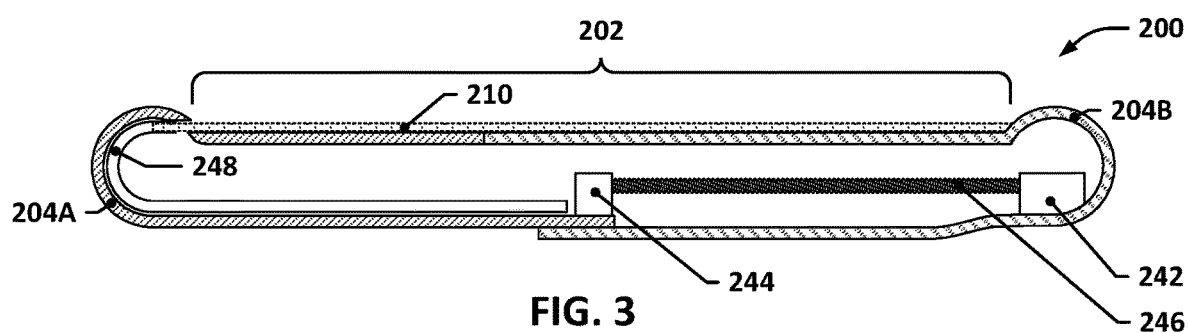

FIGS. 2 and 3 depict schematic views of an example apparatus with an expandable display in a non-expanded and expanded state, respectively. The apparatus 200 includes an expandable display 202 that includes a flexible display panel 210 that may be constrained within a U- or J-shaped track or guide 248. When in the non-expanded state, e.g., as shown in FIG. 2, the flexible display panel 210 may be caused by the track or guide 248 so as to make a 180° turn such that a portion of the flexible display panel is located (and hidden) behind another portion of the flexible display panel 210 that is visible in both the non-expanded state and the expanded state. The apparatus 200 may also include one or more motors 242, one or more nuts 244, and one or more screws 246. The nut(s) 244 may be fixed with respect to a first portion 204A of the housing of the apparatus 200, and the motor(s) 242 may be fixed with respect to a second portion 204B of the housing. The motor(s) 242 may also be configured to rotationally drive the screw(s) 246 so that the nut(s) 244 (and thus the first portion 204A of the housing) translate along the screw axis relative to the motor(s) 242 (and thus the second portion 204B of the housing). Such translation capabilities allow the expandable display to be transitioned between the non-expanded state shown in FIG. 2 and an expanded state as shown in FIG. 3. As can be seen, in the expanded state, the portion of the flexible display panel 210 that was hidden within the housing in the non-expanded state is slid out of the end of the guide or track 248 and now provides, in concert with the portion of the flexible display panel 210 that normally visible in the non-expanded state, a larger visible display area for the expandable display 202.

Figure 4:
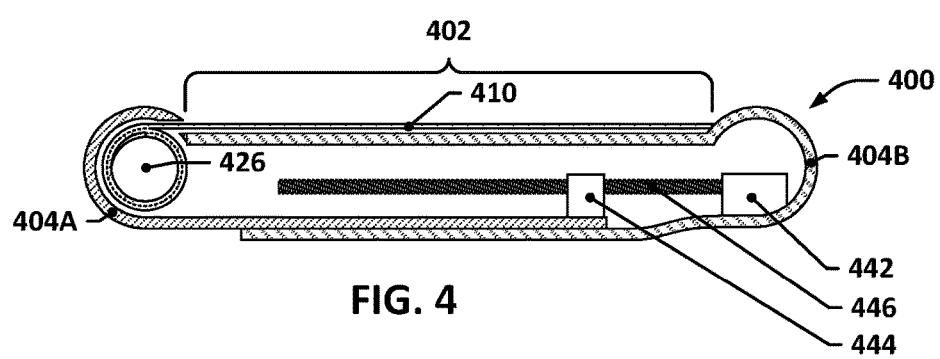
FIGS. 4 and 5 depict schematic views of another example apparatus with an expandable display in a non-expanded and expanded state, respectively.
Figure 5:
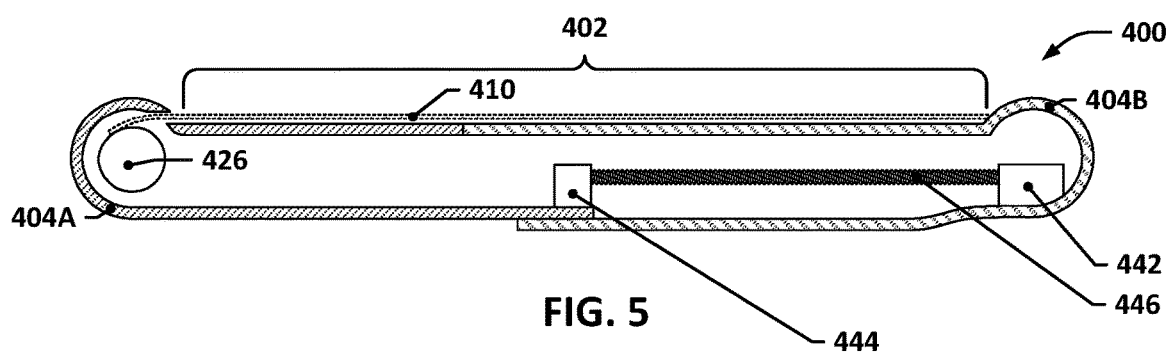

FIGS. 4 and 5 depict schematic views of another example apparatus with an expandable display in a non-expanded and expanded state, respectively. The apparatus 400 includes an expandable display 402 that includes a flexible display panel 410 that may be rolled onto or off of a roller 426 when transitioning to a non-expanded or expanded state, respectively. When in the non-expanded state, e.g., as shown in FIG. 4, a portion of the flexible display panel 410 may be rolled onto the roller 426 within a housing having a first portion 404A and a second portion 404B and thus hidden from view. Another portion of the flexible display panel 410 may be visible in both the non-expanded state and the expanded state. The apparatus 400 may also include one or more motors 442, one or more nuts 444, and one or more screws 446. As with the apparatus 200 of FIGS. 2 and 3, the nut(s) 444 may be fixed with respect to a first portion 404A of the housing of the apparatus 400, and the motor(s) 442 may be fixed with respect to a second portion 404B of the housing. The motor(s) 442 may also be configured to rotationally drive the screw(s) 446 so that the nut(s) 444 (and thus the first portion 404A of the housing) translate along the screw axis relative to the motor(s) 442 (and thus the second portion 404B of the housing). Such translation capabilities allow the expandable display to be transitioned between the non-expanded state shown in FIG. 4 and an expanded state as shown in FIG. 3. As can be seen, in the expanded state, the portion of the flexible display panel 410 that was hidden within the housing and rolled onto the roller 426 in the non-expanded state is unrolled and now provides, in concert with the portion of the flexible display panel 410 that normally visible in the non-expanded state, a larger visible display area for the expandable display 402.

Both types of expandable displays discussed above, e.g., expandable displays with separate, generally non-flexible display panels and expandable displays with flexible display panels, may be actively powered with regard to their expansion capability, e.g., by an actuation mechanism, such as one or more linear or rotational actuators, motors, solenoids, etc., that may be provided and configured so as to cause the expandable display to transition between at least an expanded state and a non-expanded state responsive to receipt of one or more signals, e.g., control signals, the application of power sufficient to cause the actuators, motors, etc. to move, etc. In some instances, the actuation mechanism may be controllable so as to permit the expandable display to be transitioned between multiple expanded states, e.g., full expansion and 50% expansion.

In some instances, expandable displays may be manually actuatable, e.g., there may not be an electromechanical actuation system, and users may be required to supply a motive force or torque required to cause the expandable display to change states, e.g., from an expanded state to a non-expanded state or vice-versa, by hand. While the systems and techniques discussed herein are presented with respect to actively powered expandable displays, it is contemplated that at least some of the techniques and systems discussed herein may also be implemented in manually actuatable expandable displays. In particular, it is contemplated that the systems and techniques for managing when to permit an expandable display to transition from a non-expanded state to an expanded state may not only be implementable in the context of actively powered expandable displays, but may also be implementable in the context of manually actuatable expandable displays. In the latter, the manually actuatable expandable display may include a locking mechanism that may be controllable by a controller and able to be transitioned between a locked and unlocked state. In the unlocked state, the expandable display may be able to be freely transitioned between the non-expanded state to the expanded state responsive to the user applying a motive force to one or more portions of the expandable display, whereas in the locked state, the expandable display may be prevented from moving responsive to the user applying a motive force to one or more portions of the expandable display.

While expandable displays offer great enhancements in terms of device packaging and usability, e.g., being able to make devices that are able to be transitioned from a more compact size for storage or particular use modes to a larger size for other use modes, expandable displays are also more expensive due to the need for additional electrical and mechanical hardware used to facilitate the expansion capability, more prone to failure due to the increased number of components (many of which are movable), consume more power (due to increased power consumption that may arise from an actuation mechanism being used to cause the expandable display to expand or contract as well as increased power usage that arises when the display is in its expanded state versus its unexpanded state), and are easily damaged (for example, if a device with an expandable display is dropped while the expandable display is in an expanded state, the expanded portion may become bent and be unable to be retracted back into the device).

The techniques and systems discussed herein may be used to more intelligently manage expandable display usage in devices having such displays in order to reduce power consumption and enhance the user experience. Additional or alternative techniques and systems also discussed herein may be used to potentially prevent damage to expandable displays in some circumstances and/or mitigate potential damage or performance degradation that may occur in expandable displays.

One of the expandable display management techniques discussed herein uses a permissions-based approach to managing user or program access to expandable display functionality. In such a technique, whenever a display expansion request signal is received by a controller that may be configured to cause an expandable display to change from a non-expanded state to an expanded state responsive to receipt of such a display expansion request signal, a determination may first be made as to whether or not the controller will actually cause the expandable display to change states responsive to that display expansion request signal. The controller may then, based on that determination, cause—or not cause—the expandable display to change states.

Figure 6:
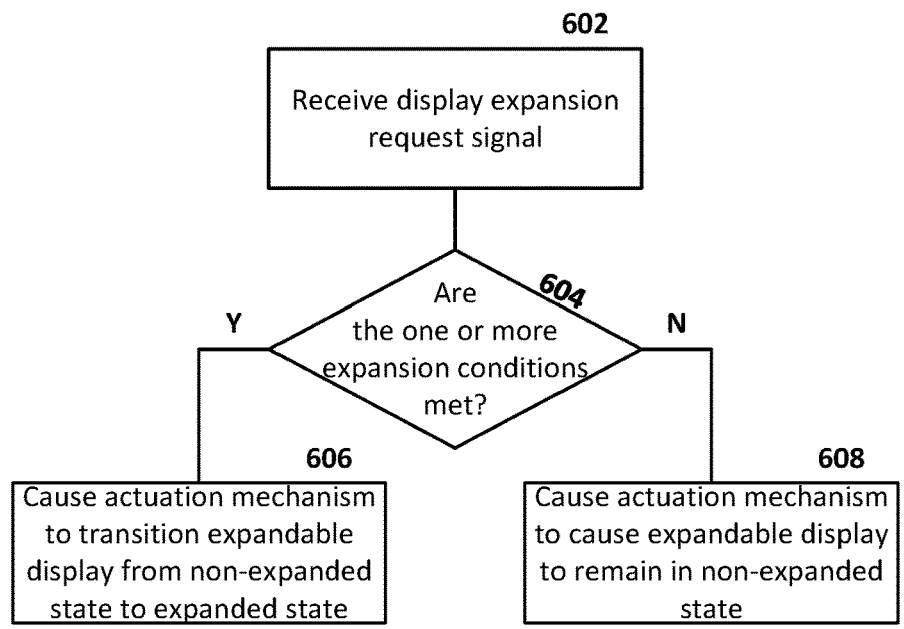
FIG. 6 depicts a flow diagram of a technique for expandable display management.

FIG. 6 depicts a flow diagram of a technique for expandable display management. In FIG. 6, the technique begins in block 602, in which a display expansion request signal is received by a controller of a device having an expandable display. The display expansion request signal may, for example, be a signal generated internally within the controller responsive to, for example, a software application that requests that the expandable display be actuated so as to cause the expandable display to transition from a non-expanded state to an expanded state. Alternatively, the display expansion request signal may be a signal that is generated responsive to a user interaction with the device in question, e.g., responsive to a user pressing a button or touch input area of the device in order to cause the expandable display to transition from the non-expanded state to the expanded state.

The expandable display in such a technique may be any type of expandable display, e.g., as discussed above, in which the expansion or contraction of the expandable display is actively powered.

In block 604, a determination may be made as to whether or not one or more expansion conditions are met. Such expansion conditions may, for example, include conditions relating to battery charge level, compatibility of a software application in the foreground with the expandable display, permission levels that are set for the expandable display and/or the software application in the foreground, etc.

If it is determined in block 604 that the one or more expansion conditions are met, the technique may proceed to block 606, in which the controller may cause an actuation mechanism for the expandable display to be actuated so as to cause the expandable display to transition from the non-expanded state to the expanded state.

If it is determined in block 604 that the one or more expansion conditions are not met, however, the technique may proceed to block 608, in which the controller may cause the actuation mechanism for the expandable display to not be actuated, thereby causing the expandable display to remain in the non-expanded state.

Various variations on this general technique are discussed in more detail with respect to the next several Figures.

Figure 7:
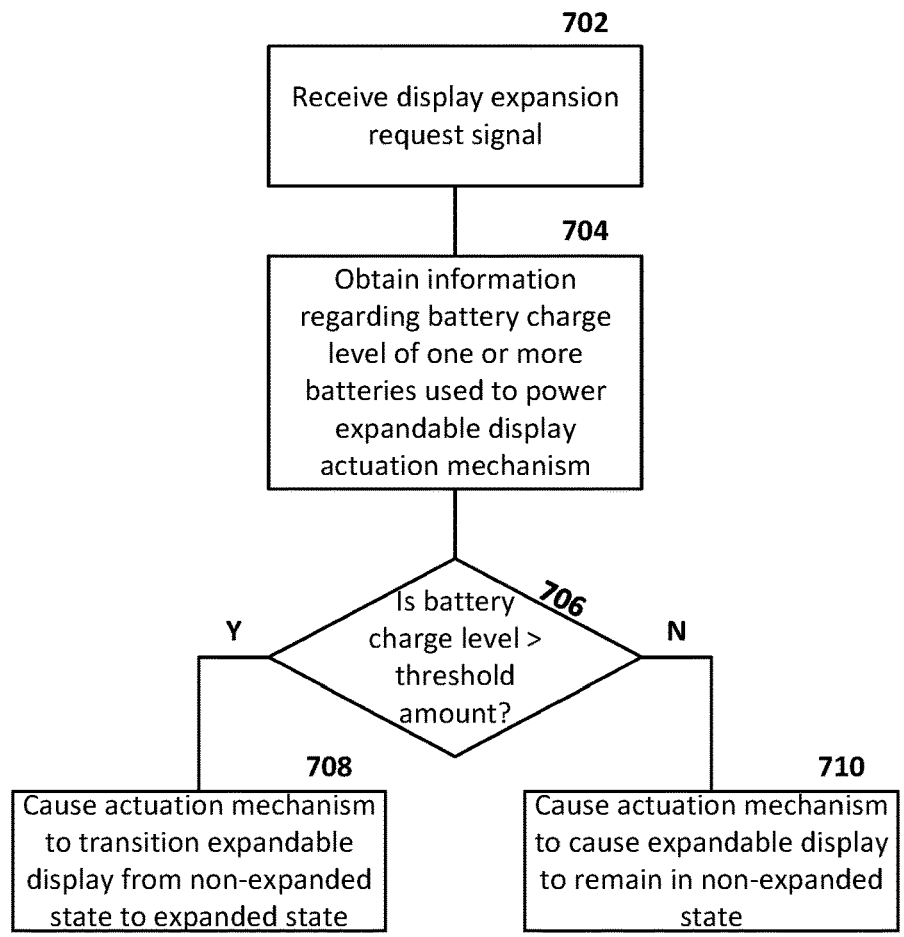
FIG. 7 depicts a flow diagram of another technique for expandable display management.

FIG. 7 depicts a flow diagram of another technique for expandable display management. As with the technique of FIG. 6 the technique of FIG. 7 begins in block 702, in which a display expansion request signal is received by a controller of a device having an expandable display. The display expansion request signal may, for example, be a display expansion request signal similar to that described above with respect to FIG. 6. Similarly, the expandable display in such a technique may be any type of expandable display, e.g., as discussed above, in which the expansion or contraction of the expandable display is actively powered.

In block 704, information may be obtained by the controller regarding a battery charge level of one or more batteries that are used to power at least the actuation mechanism for the expandable display.

In block 706, a determination may be made as to whether or not the one or more batteries that are used to power the actuation mechanism for the expandable display have a battery charge level that meets or exceeds a first threshold. In some implementations, the first threshold may, for example, be set to a level that is selected such that there will be enough remaining power in the one or more batteries once display expansion is completed sufficient to be able to again power the actuation mechanism in order to transition the expandable display back to the non-expanded state. In other implementations, the first threshold may be selected so as to allow for enough power to remain after the expandable display has been expanded so as to both allow the expandable display to then later be transitioned back to its non-expanded state and also allow for a predetermined additional amount of power to remain to allow for other operational capabilities—besides transitioning of the expandable display between the expanded and non-expanded states—of the device housing the expandable display to be active for a predetermined period of time.

If it is determined in block 706 that the one or more batteries that are used to power the actuation mechanism for the expandable display have a battery charge level that meets or exceeds the first threshold, the technique may proceed to block 708, in which the controller may cause an actuation mechanism for the expandable display to be actuated so as to cause the expandable display to transition from the non-expanded state to the expanded state.

If it is determined in block 706 that the one or more batteries that are used to power the actuation mechanism for the expandable display have a battery charge level that does not meet the first threshold, however, the technique may proceed to block 710, in which the controller may cause the actuation mechanism for the expandable display to not be actuated, thereby causing the expandable display to remain in the non-expanded state.

Such a technique may be used to prevent the expansion of the expandable display when the power drain associated with doing so is likely, or certain, to result in there being insufficient power remaining to later transition the expandable display back to the non-expanded state (assuming no recharging occurs in the interim). Such a technique may be viewed as involving a hardware-level permission that may, in some cases, not be subject to user modification.

Figure 8:
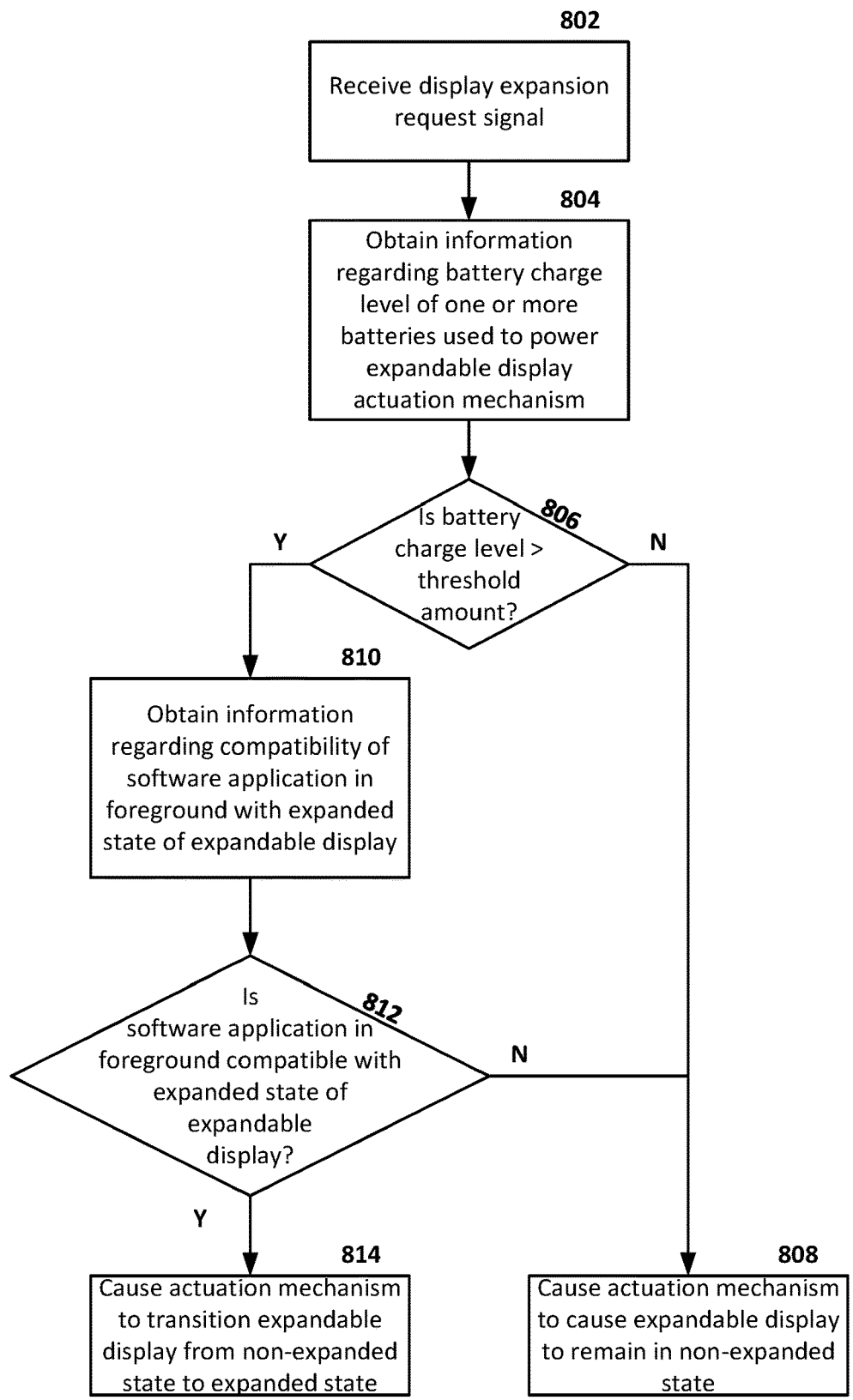
FIG. 8 depicts an expandable display management technique in which multiple expansion conditions are evaluated.

FIG. 8 depicts an expandable display management technique in which multiple expansion conditions are evaluated.

In block 802 of the technique of FIG. 8, a display expansion request signal is received by a controller of a device having an expandable display. The display expansion request signal may, for example, be a display expansion request signal similar to that described above with respect to FIGS. 6 and 7. Similarly, the expandable display in such a technique may be any type of expandable display, e.g., as discussed above, in which the expansion or contraction of the expandable display is actively powered.

In block 804, information may be obtained by the controller regarding a battery charge level of one or more batteries that are used to power at least the actuation mechanism for the expandable display.

In block 806, a determination may be made as to whether or not the one or more batteries that are used to power the actuation mechanism for the expandable display have a battery charge level that meets or exceeds a first threshold. The first threshold may, for example, be selected in a manner similar to that discussed above with respect to the first threshold of the technique of FIG. 7.

If it is determined in block 806 that the one or more batteries that are used to power the actuation mechanism for the expandable display have a battery charge level that does not meet the first threshold, the technique may proceed to block 808, in which the controller may cause the actuation mechanism for the expandable display to not be actuated, thereby causing the expandable display to remain in the non-expanded state.

If it is instead determined in block 806 that the one or more batteries that are used to power the actuation mechanism for the expandable display have a battery charge level that meets or exceeds the first threshold, however, the technique may proceed to block 810, in which information regarding compatibility of a software application that is executing in the foreground of the device having the expandable display with the expanded state of the expandable display may be obtained. For example, not all software applications may be able to effectively make use of the capabilities of an expandable display when in its expanded state. By way of further example, some software applications may have graphical user interfaces that are unable to make full use of the available graphical display area that an expandable display may provide in its expanded state. The information regarding compatibility of a software application with an expandable display capability may, depending on the implementation, be obtained in a variety of ways. For example, the apparatus having the expandable display may have a data repository, e.g., such as a registry, that may store information regarding various software applications that are installed on the apparatus, including information regarding the compatibility (or lack thereof) of each software application with an expandable display. Alternatively, a remote device, e.g., a server, may store information on which software applications are compatible with an expandable display, and the apparatus may request information on the application in question from the server to confirm whether or not that application is compatible with an expandable display.

A software application that is "executing in the foreground" of a device is to be understood to be a software application that currently has the focus within the graphical user interface provided by a device, e.g., is currently in use or which, when touch or other inputs are provided by a user, is the application to which such inputs are generally provided (excluding, however, inputs that are instead routed to the operating system of the apparatus in order to access operating system-level functionality).

In block 812, a determination may be made, e.g., by the controller, as to whether or not the software application that is executing in the foreground on the apparatus is compatible with the expanded state of the expandable display. Such a determination may be made based on the information obtained in block 810, for example. If a determination is made in block 812 that the software application that is executing in the foreground is not compatible with an expanded state of the expandable display, then the technique may proceed to block 808, in which, as discussed above, the controller may cause the actuation mechanism for the expandable display to not be actuated, thereby causing the expandable display to remain in the non-expanded state.

If it is instead determined in block 812 that the software application that is executing in the foreground is compatible with the expanded state of the expandable display, then the technique may proceed to block 814, in which the controller may cause the actuation mechanism for the expandable display to be actuated, thereby causing the expandable display to transition from the non-expanded state to the expanded state.

Such a technique may be used to reduce, or eliminate, the chance that the expandable display of an apparatus is transitioned from the non-expanded state and an expanded state while a software application is in the foreground that is unable to make use of the enhanced display area provided by the expandable display in the expanded state. For example, in some apparatuses that feature an expandable display, the display expansion feature may be actuated responsive to receipt of a user input, e.g., a button press or other input or command, that may be inadvertently provided or mistakenly provided by the user when such a software application is being used. Implementing such a technique may prevent such user errors from causing the expandable display to transition the expanded state when doing so would offer no benefit in the context of the software application currently in use.

Figure 9A:
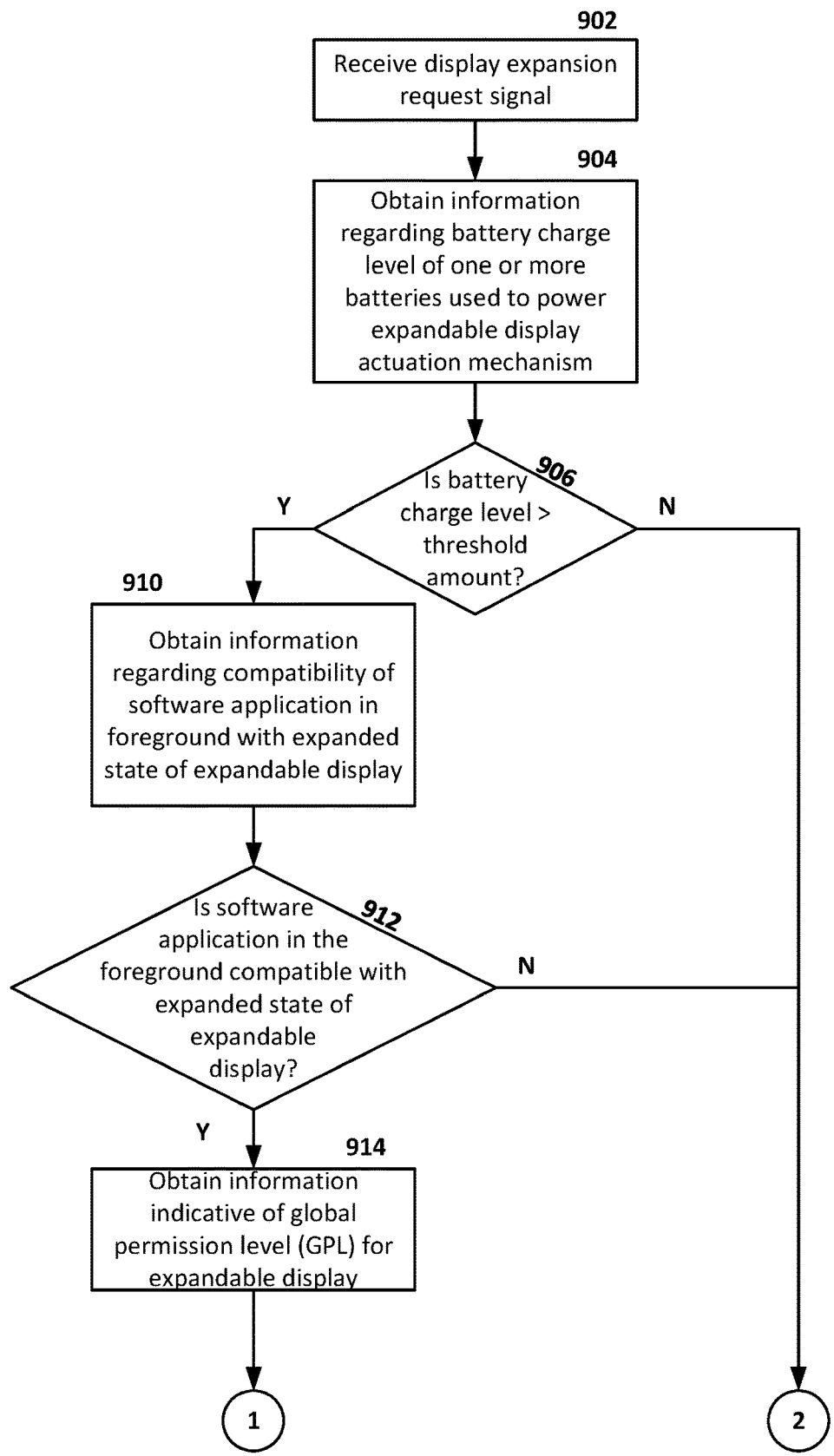
FIG. 9 (spanning FIGS. 9A and 9B) depicts a flow diagram for a technique for expandable display management in which user-selectable global and application-specific permission levels may be used to determine whether or not to cause an expandable display to transition from the non-expanded state to an expanded state.
Figure 9B:
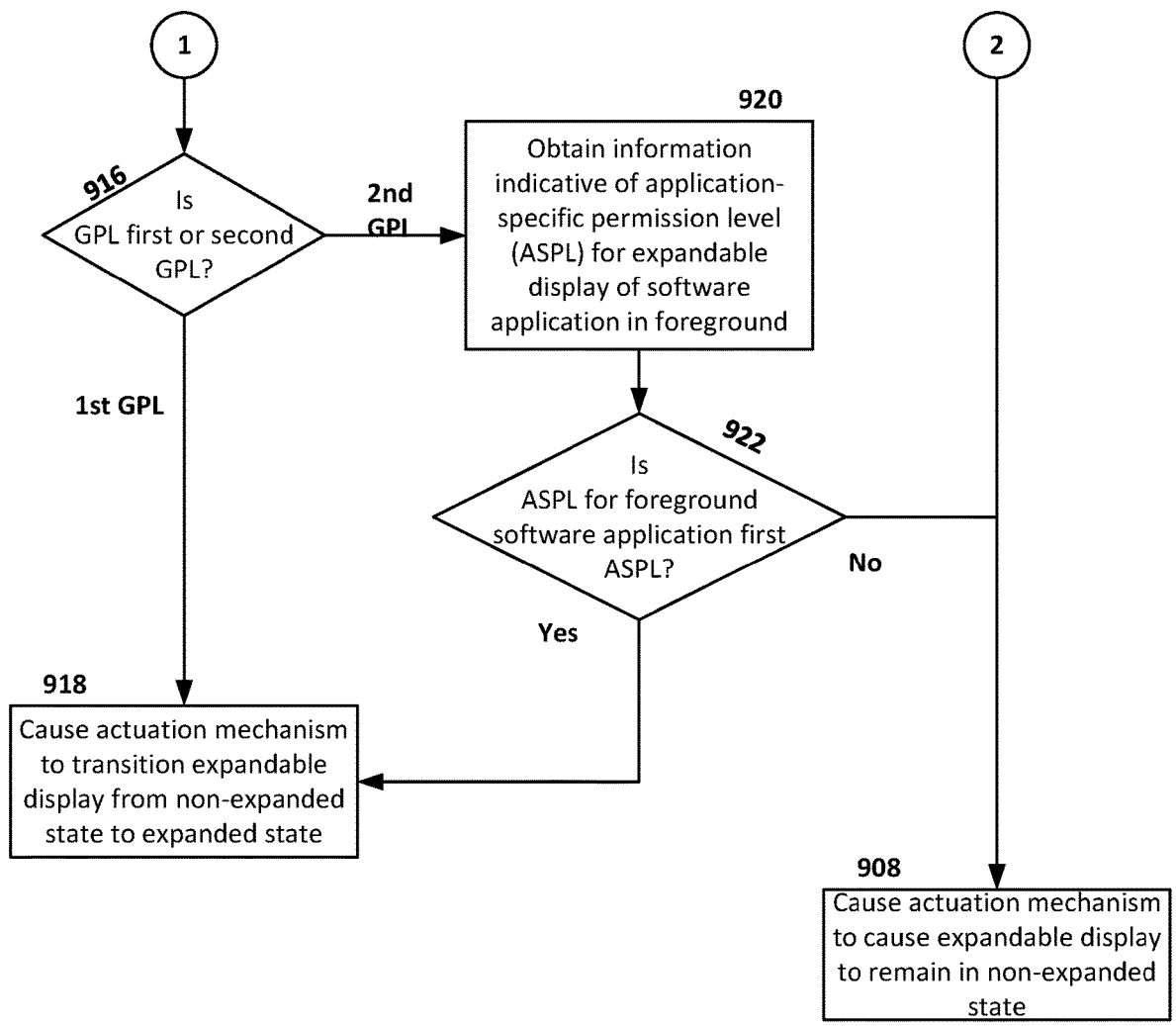

FIG. 9, spanning FIGS. 9A and 9B, depicts a flow diagram for another technique for expandable display management in which user-selectable global and application-specific permission levels may be used to determine whether or not to cause an expandable display to transition from the non-expanded state to an expanded state.

In block 902 of the technique of FIG. 9, a display expansion request signal is received by a controller of a device having an expandable display. The display expansion request signal may, for example, be a display expansion request signal similar to that described above with respect to FIGS. 6 through 8. Similarly, the expandable display in such a technique may be any type of expandable display, e.g., as discussed above, in which the expansion or contraction of the expandable display is actively powered.

In block 904, information may be obtained by the controller regarding a battery charge level of one or more batteries that are used to power at least the actuation mechanism for the expandable display.

In block 906, a determination may be made as to whether or not the one or more batteries that are used to power the actuation mechanism for the expandable display have a battery charge level that meets or exceeds a first threshold. The first threshold may, for example, be selected in a manner similar to that discussed above with respect to the first threshold of the technique of FIG. 7 or 8.

If it is determined in block 906 that the one or more batteries that are used to power the actuation mechanism for the expandable display have a battery charge level that does not meet the first threshold, the technique may proceed to block 908, in which the controller may cause the actuation mechanism for the expandable display to not be actuated, thereby causing the expandable display to remain in the non-expanded state.

If it is instead determined in block 906 that the one or more batteries that are used to power the actuation mechanism for the expandable display have a battery charge level that meets or exceeds the first threshold, however, the technique may proceed to block 910, in which information regarding compatibility of a software application that is executing in the foreground of the device having the expandable display with the expanded state of the expandable display may be obtained, similar to the technique of FIG. 8.

In block 912, a determination may be made, e.g., by the controller, as to whether or not the software application that is executing in the foreground on the apparatus is compatible with the expanded state of the expandable display. If a determination is made in block 912 that the software application that is executing in the foreground is not compatible with an expanded state of the expandable display, then the technique may proceed to block 908, in which, as discussed above, the controller may cause the actuation mechanism for the expandable display to not be actuated, thereby causing the expandable display to remain in the non-expanded state.

If it is instead determined in block 912 that the software application that is executing in the foreground is compatible with the expanded state of the expandable display, then the technique may proceed to block 914, in which the controller may obtain information regarding a global permission level for the expandable display. It will be understood that such information may be obtained earlier in the technique as well, or even prior to the receipt of the display expansion request signal. The global permission level may be a user-selectable setting that may be adjusted by users to change how application-specific permission levels associated with various software applications affect the operation of the expandable display.

The technique may then proceed to block 916, in which a determination may be made as to whether the global permission level is set to a first global permission level or a second global permission level. The first global permission level, for example, may be an unrestricted permission level in which no further restrictions are placed on the operation of the expansion feature of the expandable display (other than those relating to battery charge level and/or the compatibility of the foreground software application with the expandable display). The second global permission level may, for example, be a restricted permission level in which there may be restrictions on the operation of expansion feature of the expandable display that may be optionally enabled or disabled on an application-by-application basis.

Thus, for example, if it is determined in block 916 that the global permission level is set to the first global permission level, the technique may then proceed to block 918, in which the controller may cause the actuation mechanism for the expandable display to be actuated, thereby causing the expandable display to transition from the non-expanded state to the expanded state.

If it is determined in block 916 that the global permission level is set to the second global permission level, however, the technique may proceed to block 920, in which information regarding an application-specific permission level for the expandable display that is specific to the software application that is executing in the foreground may be obtained.

In block 922, a determination may be made whether the software application executing in the foreground has an application-specific permission level that is set to a first application-specific level as opposed, for example, to a second application-specific permission level. In some implementations one or the other of the first application-specific permission level and the second application-specific permission level may be an absence of an explicit application-specific permission level. For example, there may be a data structure that lists all of the application-specific permission levels for software applications that are installed on an apparatus having an expandable display. The data structure may have a field for each software application that tracks whether the first application-specific permission level for that software application is selected or not. If not, then it may be inferred that the second application-specific permission level is set for that software application instead. Alternatively, there may be a data structure that lists software applications that have the first application-specific permission level set; software applications that are not listed in such a data structure may similarly be viewed as having the second application-specific permission level set. In some instances, the data structure may instead track which software applications have the second application-specific permission level set, and the software applications having the first application-specific permission level may be inferred from such a data structure. Thus, the first or second application-specific permission levels may, generally speaking, be inferred from the status of the other of the first or second application-specific permission level with regard to each software application.

The first application-specific permission level may, for example, serve as a white-list of software applications for which, when such software applications are operating in the foreground, expansion of the expandable display from the non-expanded state to the expanded state is permitted even when the second global permission level is active. The second application-specific permission level may, in contrast, cause the expandable display to otherwise remain in the non-expanded state when software applications having the second application-specific permission level set are operating in the foreground of the apparatus.

Thus, for example, if it is determined in block 922 that the software application currently executing in the foreground has an application-specific permission level that is set to the first application-specific permission level, then the technique may proceed to block 918, in which, as described earlier, the controller may cause the actuation mechanism for the expandable display to be actuated, thereby causing the expandable display to transition from the non-expanded state to the expanded state.

If it is determined in block 922, however, that the software application currently executing in the foreground has an application-specific permission level that is set to the second application-specific permission level, then the technique may proceed to block 908, in which, as described earlier, the controller may cause the actuation mechanism for the expandable display to not be actuated, thereby causing the expandable display to remain in the non-expanded state.

Such a technique may allow a user some degree of control as to with which expandable display-compatible software applications the expandable display of an apparatus is able to be caused to transition to the expanded state. Such an implementation may be of particular use in apparatuses in which software applications may be able to generate the display expansion request signal that may be received by the controller. For example, in some implementations, the operating system of the apparatus, or a software application that is part of the operating system or associated with the operating system, may provide the capability to allow other software applications to request, e.g., via an API call or other mechanism, that the expandable display be transitioned from the non-expanded state to an expanded state. Such applications may, for example, automatically request that the expandable display transition to the expanded state (if not already in it) when first launched or, alternatively, when such an application is made to execute in the foreground. In other instances, such applications may, for example, request that an expandable display transition to an expanded state responsive to the application entering a particular mode, e.g., responsive to a user requesting that the application switch to such a mode. Users, however, may not desire that all expandable display-compatible software applications be able to initiate such expansion behavior in the expandable display. The technique of FIG. 9 allows a user to fine-tune for which software applications, assuming such a software application is executing in the foreground, display expansion is permitted.

Figure 10A:
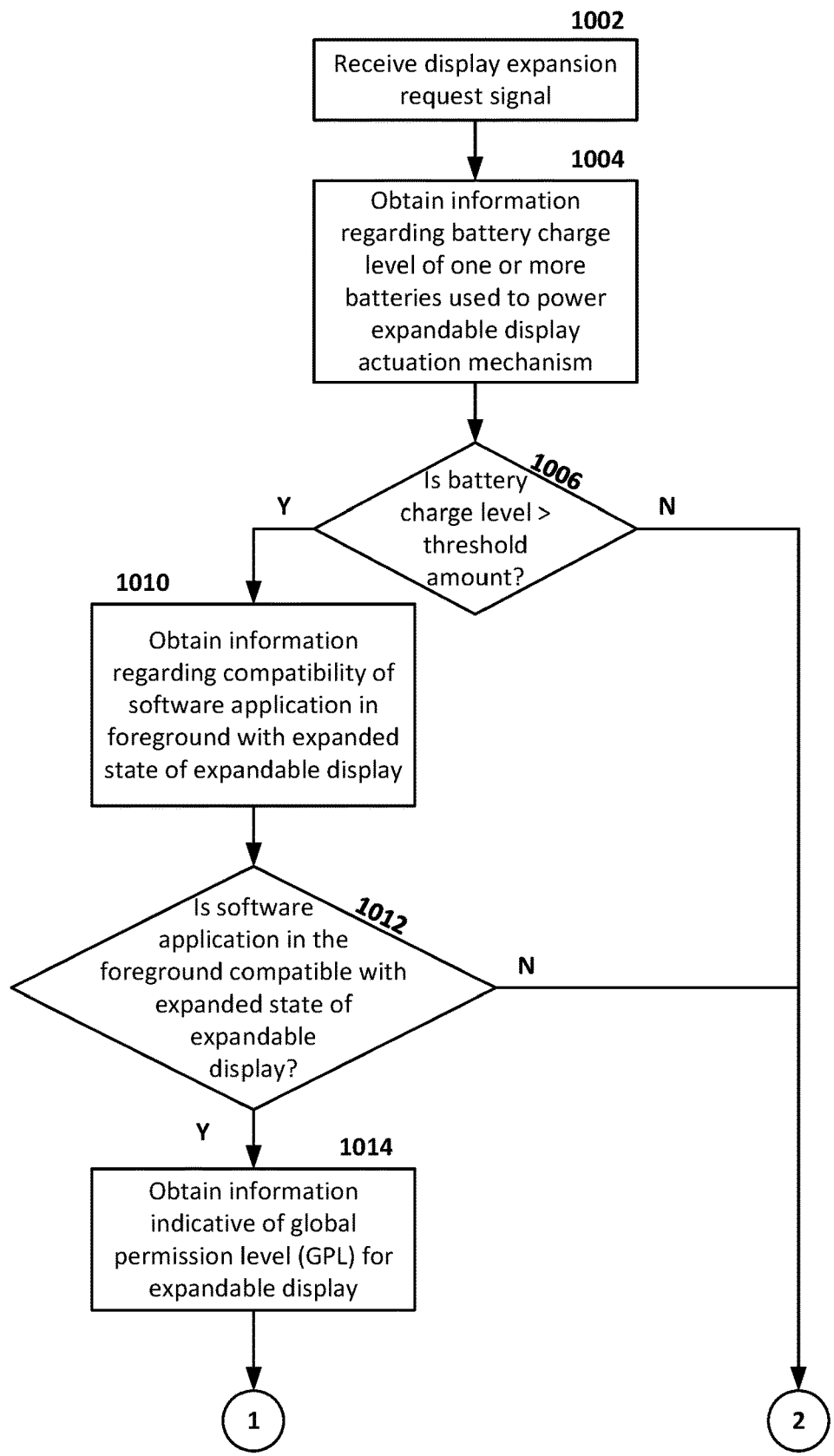
FIG. 10 (spanning FIGS. 10A and 10B) depicts a flow diagram of another technique for expandable display management in which user-selectable global and application-specific permission levels may be used to determine whether or not to cause an expandable display to transition from the non-expanded state to an expanded state.
Figure 10B:
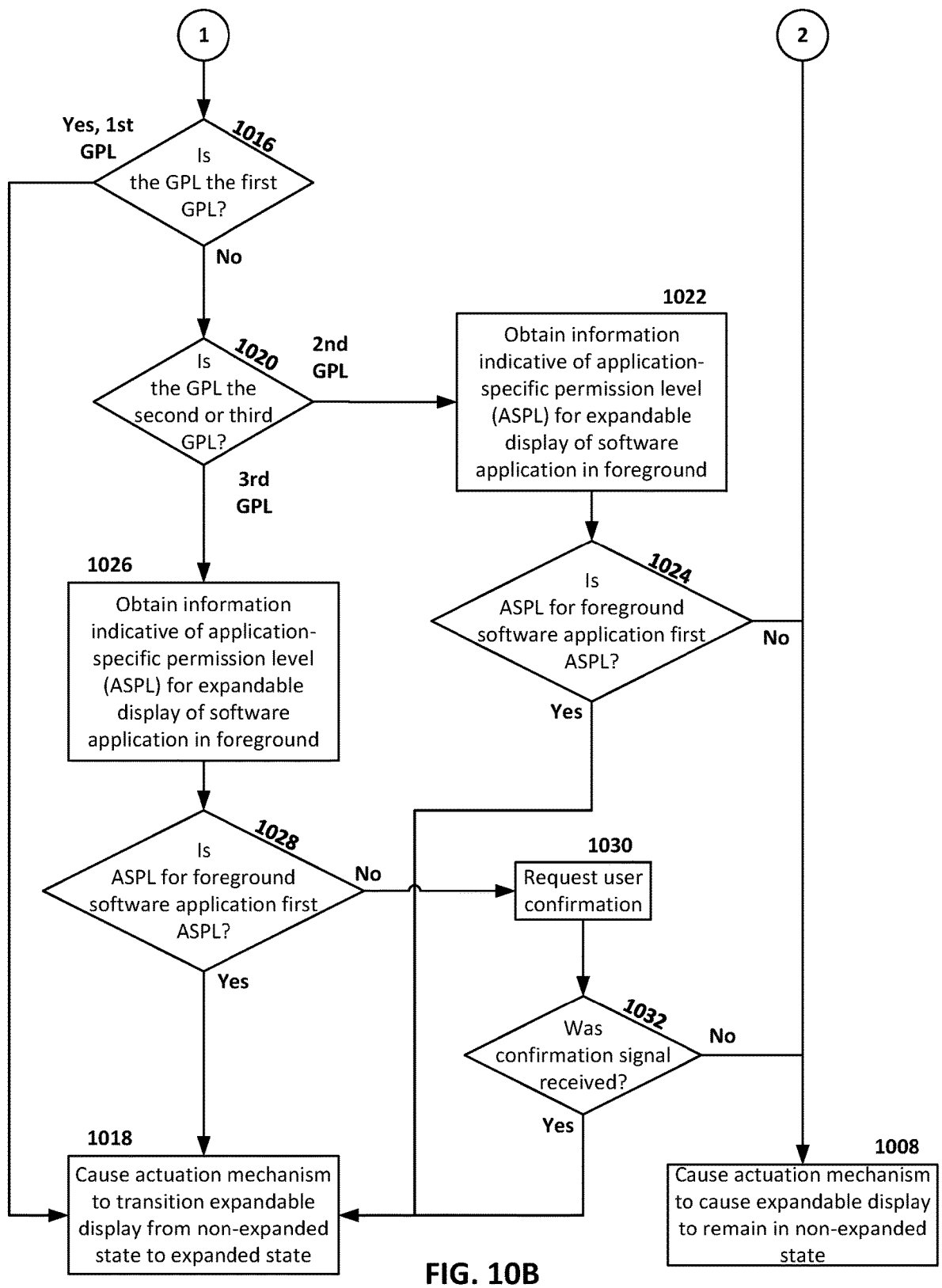

In some implementations, a variation of the technique of FIG. 9 may be utilized instead. FIG. 10 depicts an example of such a technique. In FIG. 10, blocks 1002 through 1014 are similar to blocks 902 through 914, and the discussion above regarding blocks 902 through 914 is to be understood to be equally applicable to blocks 1002 through 1014.

The technique of FIG. 10 begins to differ from the technique of FIG. 9 in block 1016, in which a determination is made as to whether the global permission is set to the first global permission level. If it is determined that the global permission level is set to the first global position level, then the technique may proceed to block 1018, in which the controller may cause the actuation mechanism for the expandable display to be actuated, thereby causing the expandable display to transition from the non-expanded state to the expanded state.

If it is instead determined in block 1016 that the global permission level is not set to the first global permission level, then the technique may proceed to block 1020, in which a further determination may be made as to whether the global permission level is set to the second global permission level or to a third global permission level.

It will be understood that the determinations of blocks 1016 and 1020 may also be collapsed into one determination, e.g., it may simply be determined which of the three global permission levels (first, second, and third) is currently set or active without resorting to a multi-stage determination.

If it is determined in block 1016 that the global permission level is set to the second global permission level, however, the technique may proceed to block 1022, in which information regarding an application-specific permission level for the expandable display that is specific to the software application that is executing in the foreground may be obtained.

The technique may then proceed to block 1024, in which a determination may be made whether the software application executing in the foreground has an application-specific permission level that is set to the first application-specific level as opposed, for example, to the second application-specific permission level.

Thus, for example, if it is determined in block 1024 that the software application currently executing in the foreground has an application-specific permission level that is set to the first application-specific permission level, then the technique may proceed to block 1018, in which, as described earlier, the controller may cause the actuation mechanism for the expandable display to be actuated, thereby causing the expandable display to transition from the non-expanded state to the expanded state.

If it is determined in block 1024, however, that the software application currently executing in the foreground has an application-specific permission level that is set to the second application-specific permission level, then the technique may proceed to block 1008, in which, as described earlier, the controller may cause the actuation mechanism for the expandable display to not be actuated, thereby causing the expandable display to remain in the non-expanded state.

Returning to block 1020, if it is instead determined in block 1020 that the global permission level is set to the third global permission level, the technique may instead proceed to block 1026, in which information regarding an application-specific permission level for the expandable display that is specific to the software application that is executing in the foreground may be obtained (the same as in block 1022).

The technique may then proceed to block 1028, in which a determination may be made as to whether the application-specific permission level for the software application executing in the foreground is set to the first application-specific permission level or the second application-specific permission level. If it is determined in block 1028 that the application-specific permission level for the software application executing in the foreground is set to the first application-specific permission level, the technique may then proceed to block 1018, in which, as discussed above, the controller may cause the actuation mechanism for the expandable display to be actuated, thereby causing the expandable display to transition from the non-expanded state to the expanded state.

If it is instead determined in block 1028 that the application-specific permission level for the software application executing in the foreground is set to the second application-specific permission level, then the technique may proceed to block 1030, in which the controller may request user confirmation that the expandable display may be allowed to transition from the non-expanded state to the expanded state. For example, the controller may cause a dialog box or other graphical user interface element to be presented to the user. Such a dialog box may have a prompt or other information depicted that provides the user with the ability to make a selection between permitting or prohibiting expansion of the expandable display while the software application in question is in the foreground.

The technique may then proceed to block 1032, in which a determination may be made as to whether a confirmation signal was received responsive to the prompt provided in block 1030. The confirmation signal may, for example, be any signal that correlates with a user selection of an option to permit the expandable display to expand for the software application in question.

If it is determined in block 1032 that the confirmation signal was received, the technique may proceed to block 1018, in which, as discussed above, the controller may cause the actuation mechanism for the expandable display to be actuated, thereby causing the expandable display to transition from the non-expanded state to the expanded state.

If it is instead determined in block 1032 that the confirmation signal was not received, e.g., a denial signal was received instead, then the technique may instead proceed to block 1008, in which, as described earlier, the controller may cause the actuation mechanism for the expandable display to not be actuated, thereby causing the expandable display to remain in the non-expanded state.

The technique of FIG. 10 may be used to provide users with an enhanced level of control granularity over when the expansion capability of an expandable display will be available for use. As with the technique of FIG. 9, the technique of FIG. 10 allows for unfettered expansion of the expandable display when the global permission level is set to the first global permission level, restricted expansion of the expandable display when the global permission level is set to the second global permission level, and a dynamically adjustable access to the expandable screen expansion functionality when the global permission level is set to the third global permission level. In both the second and third global permission levels, when software applications having the first application-specific permission level are executing in the foreground, the expansion capability of the expandable display may be accessed and used to cause the expandable display to transition from the non-expanded state to an expanded state.

The second and third global permission levels differ with respect to how access to the expandable display expansion functionality is managed when software applications having the second application-specific permission level are executing in the foreground. For the second global permission level, expansion of the expandable display is simply disabled or otherwise prevented from occurring while a software application having its application-specific permission level set to the second application-specific permission level is executing in the foreground. For the third global permission level, expansion of the expandable display is also disabled or otherwise prevented from occurring while a software application having its application-specific permission level set to the second application-specific permission level is executing in the foreground. However, the user is also given the option to override this behavior and authorize expansion of the expandable display.

Such implementations may allow users an increased level of control over how an expandable display on an apparatus may be caused to transition from the non-expanded state to an expanded state. The technique of FIG. 10 is similar to that of FIG. 9, except that the user is given the additional ability to enable access to the expandable display expansion function on a case-by-case basis for software applications that would otherwise be denied such access despite being compatible with the expanded state of the expandable display.

The various techniques discussed above allow for more granular control of how the expansion function of expandable displays may be used by putting in place controls on the circumstances in which such an expansion function may be used. This allows for potential power savings, as the power associated with undesired or unnecessary display expansion operations (or with increased display power consumption due to being in an expanded state and requiring additional power to illuminate additional pixels and perform additional processing in order to control such additional pixels) may be avoided.

It will be understood that apparatuses that may implement techniques that involve global permission levels and/or application-specific permission levels may also be configured to present graphical user interfaces that allow a user to, for example, modify such permission levels. For example, such an apparatus may be configured to provide a graphical user interface (GUI) that may indicate the current global permission level for the expandable display and include one or more user-selectable controls, e.g., buttons, toggles, checkboxes, drop-down lists, option groups, etc., that may be selected by the user to set the global permission level to the first global permission level or the second global permission level (or, if the apparatus is configured to implement the technique of FIG. 10, the third global permission level). Such an apparatus may, responsive to receipt of one or more user selection input signals resulting from user interactions with such a GUI, cause a setting stored in memory of the apparatus (or elsewhere) to be updated per the user's selection. Such a setting may then be referenced by the apparatus at a later point in time when a determination is being made as to whether or not an expandable display of the apparatus should be transitioned from the non-expanded state to an expanded state. Similarly, such apparatuses may also be configured to provide a GUI that allows users to specify application-specific permission levels for one or more software applications that may be executable by the apparatus. Such a GUI may be configured to show a list of software applications, e.g., all of the software applications stored on the apparatus or presently executable on the apparatus or, alternatively, a subset of such software applications, such as only software applications that are compatible with expanded display expansion functionality. Each listed software application in such a GUI may have a corresponding user-selectable control that may, when selected, cause the apparatus to modify an application-specific permission level setting stored in memory for the corresponding software application, e.g., causing the application-specific permission level setting stored in memory for that software application to switch to the first application-specific permission level or the second application-specific permission level.

Figure 11:
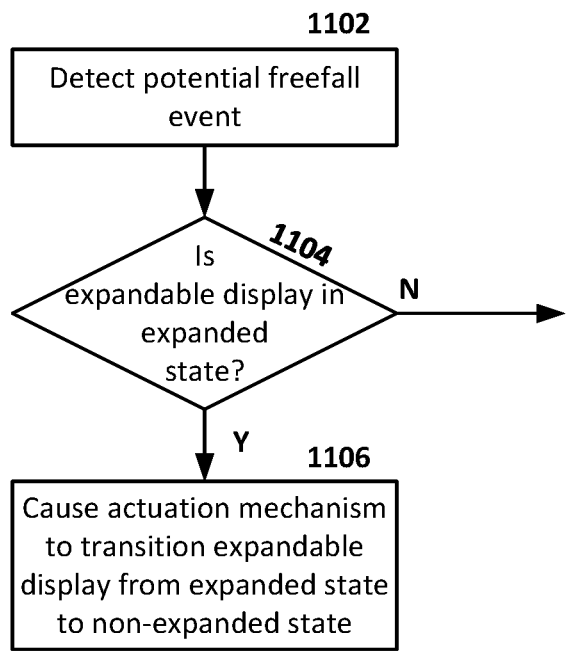
FIG. 11 depicts a technique for transitioning an expandable display from an expanded state to the non-expanded state in order to potentially shield the expandable display from damage.

In addition to the techniques discussed above for managing when expandable displays may be transitioned from the non-expanded state to an expanded state, other techniques discussed herein may manage when expandable displays may be transitioned to the non-expanded state from the expanded state. FIG. 11 depicts a technique for transitioning an expandable display from an expanded state to the non-expanded state in order to potentially shield the expandable display from damage.

The technique of FIG. 11 begins in block 1102, in which an apparatus having an expandable display may detect a free-fall event, i.e., detect that the apparatus is experiencing free fall, such as after being dropped. For example, the apparatus may have one or more accelerometers located within it that may be monitored by a controller of the apparatus during at least periods of time in which the expandable display of the apparatus is in an expanded state. If the accelerometers register an acceleration that is commensurate with a free-fall state, e.g., the accelerometers register a zero-G or an acceleration below a threshold value, e.g., below 0.2 G, then the controller may interpret such data as being indicative of a free-fall event.

In block 1104, a determination may be made as to whether the expandable display is in an expanded state. If not, the technique may end. If so, the technique may proceed to block 1106, in which the controller may cause the actuation mechanism of the expandable display be actuated so as to cause the expandable display to transition from the expanded state to the non-expanded state. If such a transition is fast enough, the expandable display may be completely transitioned to the non-expanded state prior to the apparatus potentially impacting a surface or object. Even if the transition to the non-expanded state has not completed prior to such an impact event, the partially transitioned expandable display may still be less susceptible to damage than it would be in the expanded state. For example, when an expandable display is in an expanded state, portions of the mechanism that provide for the physical expansion of the expandable display may be longer and thus, when a force is applied to an outermost edge of the apparatus housing, may see higher torques (due to the increased moment arm that arises from the expanded size of the apparatus housing) than such portions may see when the expandable display is in the non-expanded or a less-expanded state. Moreover, the amount of contact area between the portions of the housing that move relative to one another in order to provide the expansion functionality may shrink as the expandable display transitioned from the non-expanded state to the expanded state, but may also do the reverse when transitioned from the expanded state to the non-expanded state. When in the expanded state, the amount of contact area between such portions of the housing may be at a minimum, resulting in higher stresses through such an interface when the two portions are subjected to, for example, bending moments. As the two portions are transitioned to the positions they are in when in the non-expanded state, the amount of contact area between the two portions may increase accordingly, resulting in lower stresses being transmitted through the interface between the two portions.

The techniques, and systems that implement them, discussed above may allow for power conservation and damage mitigation strategies to be implemented for expandable displays. This disclosure, however, also provides techniques, and systems that may implement them, for evaluating expandable displays that may have experienced an operational fault that impairs their expansion and/or retraction capability. Such techniques may allow for the actual expansion state of an expandable display to be determined and/or verified and, potentially, for mitigation measures to be implemented if an expandable display is identified as having degraded performance.

For example, an expandable display may, for varying reasons, sometimes experience degradation in its mechanical or electromotive systems that may result in the expandable display expanding to a lesser degree extent than is expected in response to a display expansion request signal. The extent to which the expandable display falls short of the desired amount of expansion may be relatively minor, e.g., only a few percent of the total expected expansion distance, or significant, e.g., 20%, 40%, 50%, 60%, 70%, 80%, or 90% of the total expected expansion distance. Such performance degradation may result, for example, from factors such as component failure, fatigue, wear and tear, dirt and/or dust accumulating in the electromotive systems used to actuate the expandable display, power faults, etc.

Such failures or faults may compromise the performance of the expandable display but may also potentially be able to be accommodated or corrected for to allow the expandable display to be placed into a state in which such failures or faults are potentially less noticeable. For example, if an expandable display has expanded to a lesser extent than is expected, the resolution of the expandable display in the actual expanded state may be less than the expected resolution. If the actual expanded state of the expandable display is determined, then the resolution of the expandable display may be adjusted so as to align with the actual dimensions of the visible display area of the expandable display. For example, if the expandable display uses a flexible display panel that is rolled/unrolled from a roller, thereby allowing an example such expandable display of 5.9 inches in height to expand from a width of 2.4 to 4.2 inches, the screen resolution, assuming a DPI of 360 pixels/inch, may be able to expand from 869×2136 pixels to 1520×2136 pixels. However, if the expandable display expansion capability is compromised in some way, e.g., by dust or dirt that may prevent the expandable display from fully extending, or potentially by damage to the extension mechanism, then the expandable display may only expand partially, e.g., 85% of its normal expansion capability. As such, the visible area of the expandable display would only be 1436×2136 pixels, or ~93% of the normal expanded screen resolution. If the actual expansion state of the expandable display can be determined, this may allow the visible resolution of the expandable display to be recalculated and appropriate adjustment made, e.g., providing information on the actual screen resolution to the operating system of the apparatus having the expandable display and/or applications executing therein so as to allow for the GUIs and other graphical elements displayed thereupon to be adjusted to compensate for the actual screen size/resolution. Additionally, the columns or rows of the expandable display's pixels that are not actually visible to users due to the fault may be optionally deactivated based on the determination of the actual expandable display size in the expanded state so as to avoid unnecessary power consumption and potential visual artifacts that may result from, for example, overlaying portions of the expandable display (e.g., one portion overlapping with another portion such that light emitted from the pixels in the overlaid portion bleeds through the overlying portion).

Similarly, other systems that may be tied to screen size may also be adjusted so as to avoid potential aberrant behavior and/or unnecessary power consumption. For example, touch-sensing systems that may be coextensive with the expandable display surface may be similarly partially deactivated and/or inputs therefrom adjusted to compensate for the reduced expandable display size. Similarly, under- or in-screen ultrasonic fingerprint sensors that may be located below the expandable display surface, if present, may be similarly partially deactivated and/or inputs therefrom adjusted to compensate for the reduced expandable display size, thereby reducing potential power consumption and/or the potential for erroneous readings.

In some instances, the detection of a potential fault in the operation of an expandable display and the determination of the actual expansion state of the expandable display may be performed separately. For example, an apparatus with an expandable display may detect a potential fault with the operation of the expandable display, e.g., motors or actuators used to actuator the expandable display may exhibit a higher power draw than normal, or may operate at lower speeds than expected, thereby indicating a potential fault with the expandable display actuation mechanism that may lead to incomplete expansion of the expandable display. If such a fault is detected, then the apparatus with the expandable display may take additional actions to determine the extent to which the fault may have affected the screen expansion. In other implementations, however, the determination of the actual expansion state and the determination of a potential fault in the operation of the expandable display may both be determined concurrently, e.g., sensor data that indicates the actual expansion state may be obtained, and if the actual expansion state does not match the expected expansion state, then it may be determined that a fault has occurred. In such a case, the determination of the actual expansion state would occur as part of the fault determination.

Various techniques and systems for monitoring the operation of an expandable display's expansion mechanism and/or determining the actual expansion state of an expandable display are discussed below.

Figure 12:
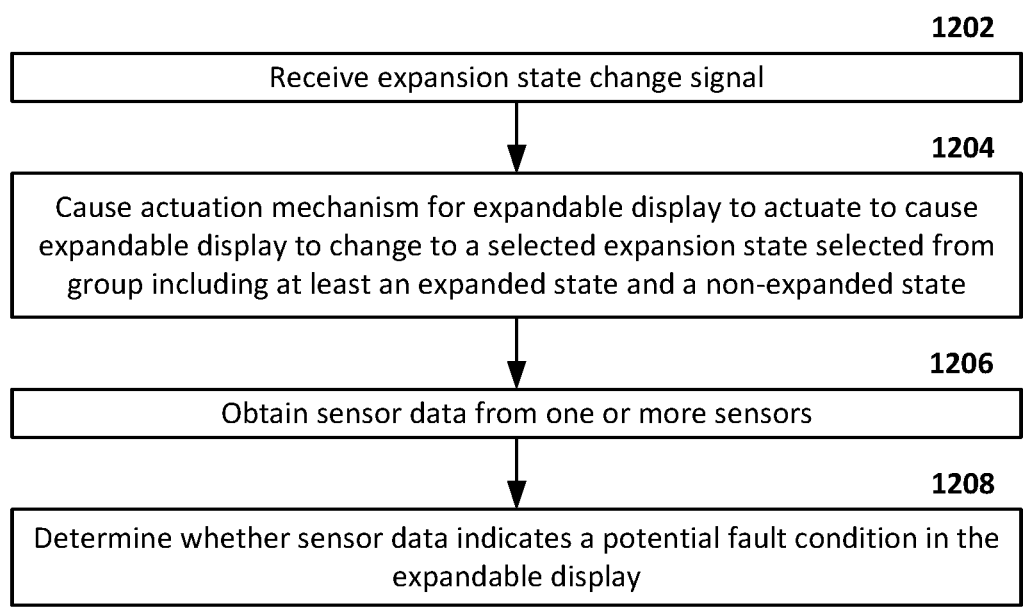
FIG. 12 depicts a flow diagram of a technique for determining whether an expandable display is in a desired expansion state.

FIG. 12 depicts a flow diagram of a technique for determining whether an expandable display is in a desired expansion state. The technique begins in block 1202, in which a controller of an apparatus having an expandable display may receive an expansion state change signal, e.g., a display expansion request signal, a display retraction request signal, or some other signal that causes the controller of the apparatus, upon receipt thereof, to cause the actuation mechanism of the expandable display to operate so as to transition the expandable display between different expansion states.

In block 1204, the controller may cause the actuation mechanism for the expandable display to actuate so as to cause the expandable display to change to a selected expansion state, e.g., as selected based on the expansion state change signal. The expansion state may be selected from a group that includes at least an expanded state and a non-expanded state.

In block 1206, the controller may obtain sensor data from one or more sensors of the apparatus. Such sensor data may come from a single sensor or, in some implementations, from a variety of sensors. For example, sensor data from rotational or linear encoders that may monitor, for example, positional information regarding the extension state of linear actuators that are part of the actuation mechanism for the expandable display may be obtained and used to determine the extent to which the expandable display has been extended.

In another example, sensor data from rotational or linear encoders that may monitor, for example, a speed of operation of the actuation mechanism over time may be obtained.

In yet another example, sensor data from an optical distance measurement sensor, linear variable displacement transducer, variable resistor, or other sensor configured to measure a distance between a point that remains fixed with respect to a first portion of an expandable display and another point that remains fixed with respect to a second portion of the expandable display that moves relative to the first portion thereof during actuation of the expandable display.

In another example, sensor data regarding an amount of power consumed by the actuation mechanism, or sensor data indicative of a current and/or voltage level provided to the actuation mechanism, may be obtained. Such sensor data may be obtained from sensors that may monitor voltage, current, and/or power provided to various electrical components of the apparatus, e.g., to motors or actuators of the actuation mechanism.

In yet another example, sensor data from a touch-sensing system of the apparatus having the expandable display may be obtained. Such sensor data may, for example, include data that indicates one or more locations where the touch-sensing system may detect a potential touch-event. Such touch-events may, for example, be produced by contact between a user's finger(s) and a surface of the apparatus proximate to or provided by the touch-sensing system. However, the touch-sensing system may also register touch-events responsive to other physical phenomena, e.g., occlusion of some of the touch-sensing system by, for example, a display panel of an expandable display or a housing of the apparatus or a portion of a flexible display panel for an expandable display.

In a similar example, sensor data from an ultrasonic fingerprint sensor that extends across at least part of the expandable display may be obtained. Such sensor data may, for example, be in the form of ultrasonic scan data or information that may, in typical use, be used to obtain fingerprint scans of a user. However, such sensor data may also indicate the locations of anomalies that may arise from the ultrasonic fingerprint sensor being occluded by, for example, a display panel of an expandable display or a housing of the apparatus or a portion of a flexible display panel for an expandable display.

As noted above, the sensor data may be obtained from one or more sensors of the apparatus, including from combinations of at least any two of the above-referenced sensors. In some implementations, however, the sensor data may be obtained from only one of the above-referenced sensors.

In block 1208, a determination may be made as to whether the sensor data from the one or more sensors indicates a potential fault condition in the expandable display that prevents the expandable display from being transitioned into the desired expansion state. For example, if the sensor data includes sensor data from rotational or linear encoders that may monitor an extension state of the actuation mechanism, the extent to which the expandable display has been extended (or retracted, as appropriate) as indicated in the sensor data may be compared against the amounts of extension or retraction that are expected during normal operation. If the extension or retraction amounts (which may collectively be referred to as actuation amounts) indicated in the sensor data do not match, or are more than a threshold amount or percentage different from, the expected amounts of extension or retraction, then the controller may determine that a potential fault condition exists in the expandable display.

In another example, if the sensor data includes sensor data from a rotational or linear encoder (or other sensor) that may monitor a speed of actuation of the actuation mechanism, then the controller may compare the actuation speed of the actuation mechanism against a baseline actuation speed to determine if the sensed actuation speed is within a threshold amount of the baseline actuation speed. If the sensed actuation speed is not within the threshold amount of the baseline actuation speed, then the controller may determine that a potential fault condition exists in the expandable display. For example, if the actuation mechanism is operating at a lower speed than normal, this may indicate that the actuation mechanism has been compromised, e.g., experiencing a potential fault condition that may affect the ability of the expandable display to transition to the desired expansion state. The baseline actuation speed may, for example, be set to a predetermined amount based on an expected baseline actuation speed for the expandable display in question or may be set to a value that is determined based on historical actuation speeds experienced by the apparatus having the expandable display. For example, the controller of the apparatus may monitor the actuation speeds of the actuation mechanism for the expandable display during multiple transitions between different expansion states and may, for example, average the actuation speeds for a predetermined number of such transitions to arrive at a baseline actuation speed.

In yet another example, if the sensor data includes sensor data indicating an amount of power, current, and/or voltage provided to the actuation mechanism, such sensor data may be compared against baseline levels of such parameters to determine if a potential fault condition exists. For example, if the actuation mechanism experiences a mechanical fault, e.g., being impaired by dirt or debris or by physical damage, e.g., deformation of a portion of the actuation mechanism, that either inhibits the actuation mechanism from actuating the expandable display into a particular expansion state or increases the amount of force necessary in order to do so, the actuation mechanism may exhibit a higher power draw (or increase voltage and/or current draw) as it tries to overcome the obstacle that is preventing, or at least inhibiting, the transition of the expandable display to a particular expansion state. The baseline level(s) of power, current, and/or voltage may, in a manner similar to that discussed above for actuation speed, be either predetermined based on expected power, current, and/or voltage values for the actuation mechanism during operation or may be based on historical power, current, and/or voltage values.

In yet another example, if the sensor data includes sensor data indicating an distance between two points, one on a first portion of the expandable display and the other on a second portion of the expandable display that moves relative to the first portion during expansion or retraction of the expandable display, then the controller may determine whether a fault condition exists by comparing the distance indicated by the sensor data with an expected distance associated with the desired expansion state. For example, if the distance indicated by the sensor data is within a threshold amount of the expected distance, then the controller may determine that the expandable display is not experiencing a fault condition. However, if the distance indicated by the sensor data is not within the threshold amount of the expected distance, then the controller may determine that the expandable display is experiencing a fault condition.

Figure 13:
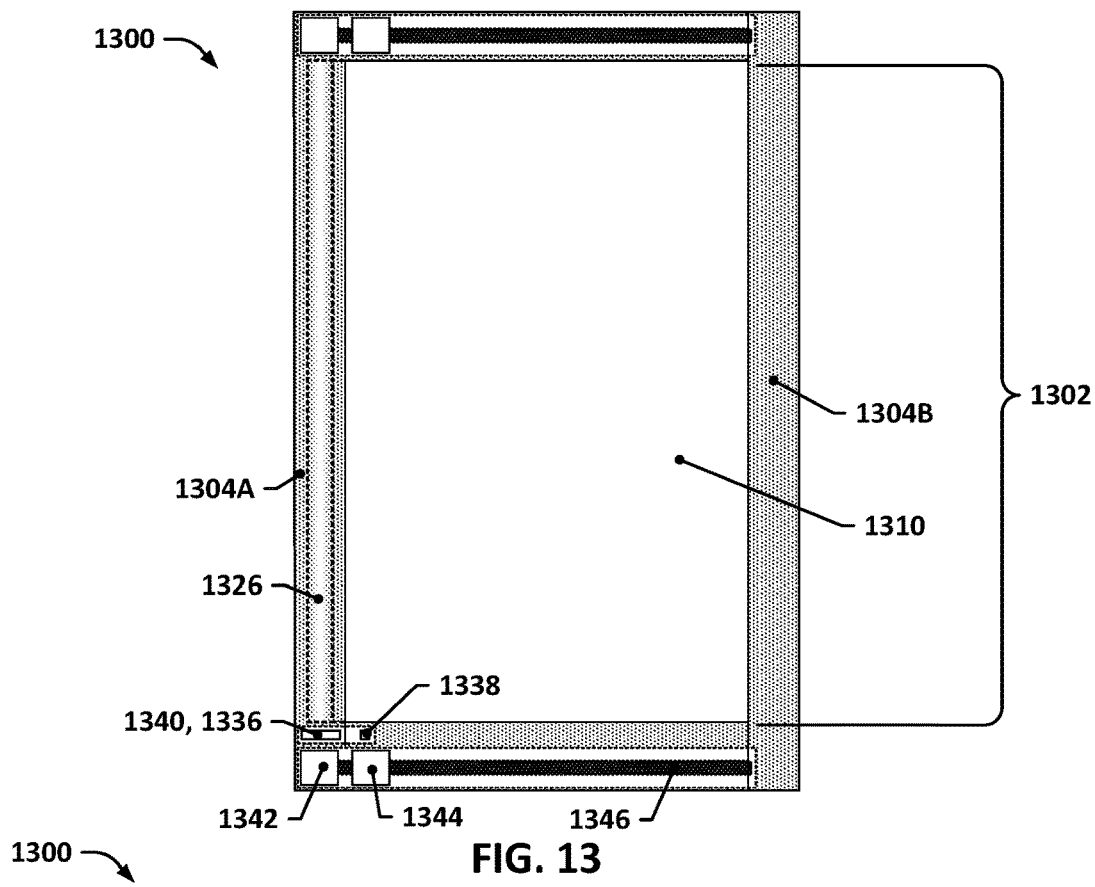
FIGS. 13 and 14 depict an example apparatus that has an expandable display in a non-expanded and expanded state, respectively.
Figure 14:
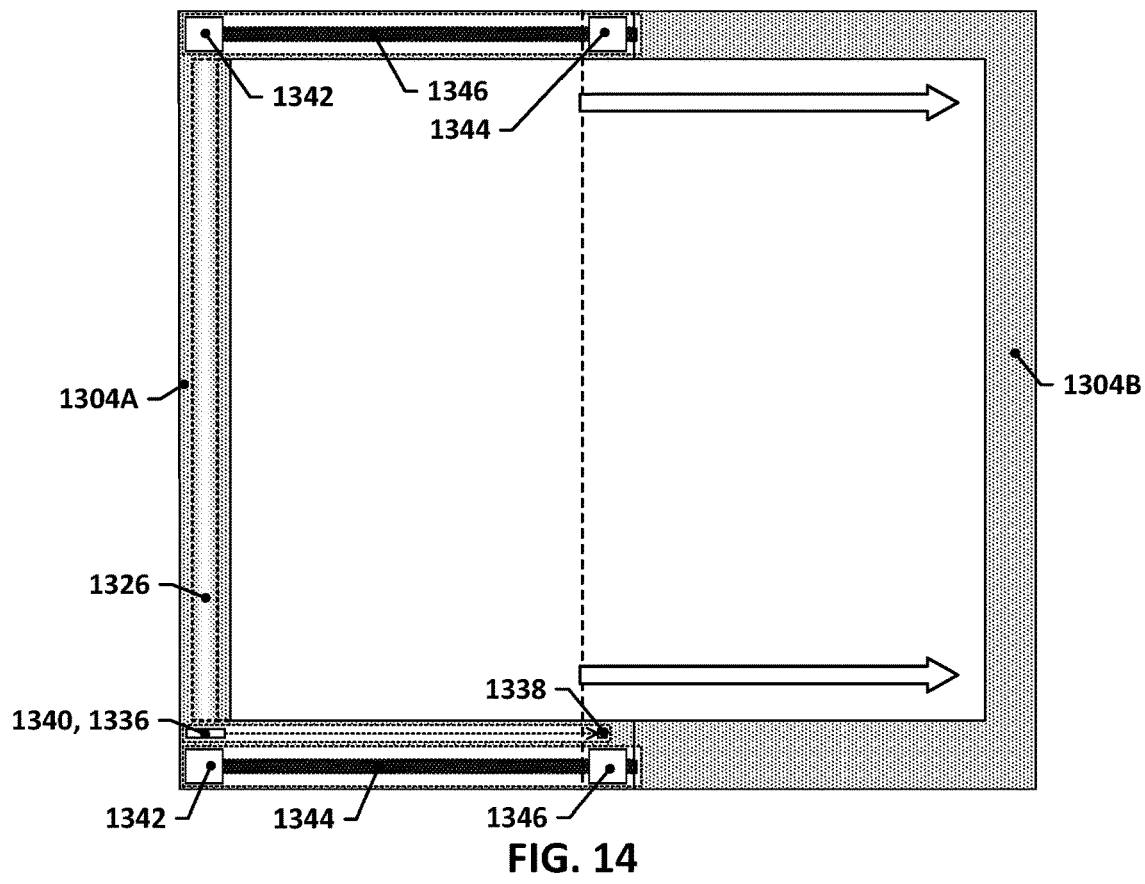

Such an arrangement is shown in FIGS. 13 and 14, which depict an example apparatus 1300 that has an expandable display 1302. The expandable display 1302 is, in this example, a rollable expandable display with a roller 1326 onto which a portion of a flexible display panel 1310 may be rolled when the expandable display 1302 is in the non-expanded state. The apparatus 1300 may have a housing with a first portion 1304A that houses the roller 1326, and a second portion 1304B that is movably connected with the first portion 1304A such that the first portion 1304A and the second portion 1304B are able to translate relative to each other. The end of the flexible display panel 1310 that is opposite the end of the display panel that is rolled onto the roller 1326 may be fixed with respect to the second portion 1304B such that when the first portion 1304A and the second portion 1304B are translated relative to one another, the flexible display panel 1310 may be rolled onto or unrolled from the roller 1326.

The first portion 1304A of the housing may further include an actuation mechanism that includes motors 1342 that may be connected with screws 1346 so as to be able to rotationally drive the screws 1346 responsive to one or more input signals. Similarly, the second portion 1304B of the housing may be fixedly connected with nuts 1344 that are threaded or otherwise coupled with the screws 1346 such that when the screws 1346 are rotated, the nuts 1344 are caused to translate along the screws 1346, thereby causing the second portion 1304B to translate relative to the first portion 1304A.

Also shown in FIGS. 13 and 14 are an optical distance measurement sensor 1340 which may be located at a first point 1336 that is fixed with respect to the first portion 1304A of the housing. The optical distance measurement sensor 1340 may be configured to obtain distance measurements between itself, i.e., the first point 1336, and a second point 1338 that is fixed with respect to the second portion 1304B. The optical distance measurement sensor may, for example, direct a light beam, e.g., a laser, towards the second point 1338 and determine the distance that the second point 1338 is away from the first point 1336. Such optical distance measurement sensors 1340 may thus allow for direct measurements of the actual amount by which the first portion 1304A and the second portion 1304B are displaced relative to each other, thereby allowing for the determination of the actual expansion state of the expandable display 1302.

In a further example, if the sensor data includes sensor data from a touch-sensing system that indicates potential touch-events, the controller may determine that a potential fault has occurred in the expandable display if the touch-sensing system sensor data exhibits artifacts or touch-events that indicate that the touch-sensing system is partially (or completely) obscured by, for example, a display panel or a portion of the apparatus housing. For example, in an expandable display that features multiple discrete display panels in which one display panel may overlay another display panel when in the non-expanded state and then transition to a state in which that display panel overlays the other display panel to a lesser extent (or not at all), a touch-sensing system associated with the bottom display panel may register artifacts or phantom touch events at locations that are overlaid by the upper display panel. Thus, if the touch-sensing data indicates that such artifacts or phantom touch events are occurring at a location where the bottom display panel should not be obscured by the upper display panel, the controller may determine that the expandable display has experienced a potential fault and that the bottom display panel has not reached the desired expansion state. Similarly, if the desired expansion state is a non-expanded state (or less-expanded state), the controller may evaluate the touch-sensing system sensor data to determine if portions of the lower display panel that should be obscured by the upper display panel in such a state are registering expected artifacts or phantom touch events in locations where the lower display should be obscured by the upper display. If such artifacts or phantom touch events are not observed in locations of the lower display where the touch-sensing system should be registering such phantom touch events, the controller may determine that the expandable display has experienced a potential fault.

Such sensor data may also be used to similar effect in flexible display-type expandable displays except that instead of such artifacts or phantom touch events being generated by the touch-sensing system for a lower display panel being overlaid by an upper display panel, such artifacts or phantom touch events may be generated instead by the portion of the flexible display having the touch-sensing system being overlaid, for example, by the housing of the apparatus proximate where the flexible display extends from or retracts onto a roller or into a track or guide or by another portion of the flexible display (e.g., such as may occur when the flexible display is rolled onto a roller).

Similarly, if the sensor data includes ultrasonic fingerprint sensor data that is coextensive with at least a portion of the expandable display, the controller may determine that a potential fault has occurred in the expandable display if the ultrasonic fingerprint sensor data, e.g., ultrasonic scan data, exhibits artifacts that indicate that the touch-sensing system is partially (or completely) obscured by, for example, a display panel or a portion of the apparatus housing. For example, an ultrasonic fingerprint sensor may transmit an ultrasonic wave that may propagate outward and reflect off of surfaces that it encounters during its transit; the reflected ultrasonic waves may then be detected by a piezoelectric material within the ultrasonic fingerprint sensor that allows for the locations of such reflected waves to be determined with high accuracy. Ultrasonic waves that, for example, pass through different thicknesses of material, e.g., through a portion of an expandable display that is overlaid by a portion of a device housing or other structure (as opposed to not being overlaid by another structure) may exhibit different reflection characteristics, e.g., wave fronts that are separated in time due to being reflected at different distances from the ultrasonic wave generator. As a result, the ultrasonic fingerprint sensor data may exhibit artifacts that may indicate the location where a portion of the expandable display transitioned from being obscured by an overlying structure to not being obscured by an overlying structure. If the location of such a transition indicated by the ultrasonic fingerprint sensor data is within a threshold distance of the expected location of such a transition, then the controller may determine that the expandable display has transitioned to the desired expansion state. If the location of such a transition indicated by the ultrasonic fingerprint sensor data is not within the threshold distance of the expected location of such a transition, then the controller may determine that the expandable display has experience a potential fault in transitioning to the desired expansion state.

The technique of FIG. 12 may be used to determine if a potential fault condition exists in the expansion/retraction functionality of an expandable display. However, in some instances, it may be desirable to not only identify when a potential fault in the expansion/retraction functionality of a display exists, but to also identify the extent to which the expandable display expansion/retraction functionality has been impaired. For example, it may be desirable to determine the extent to which an expandable display experiencing a fault condition is actually expanding (or retracting to) when transitioned to a particular expansion state. If such information on the actual state of expansion (or retraction) of the expandable display is able to be provided, then the operation of one or more aspects of the apparatus having the expandable display may, for example, be modified based on that information, as discussed above.

Figure 15:
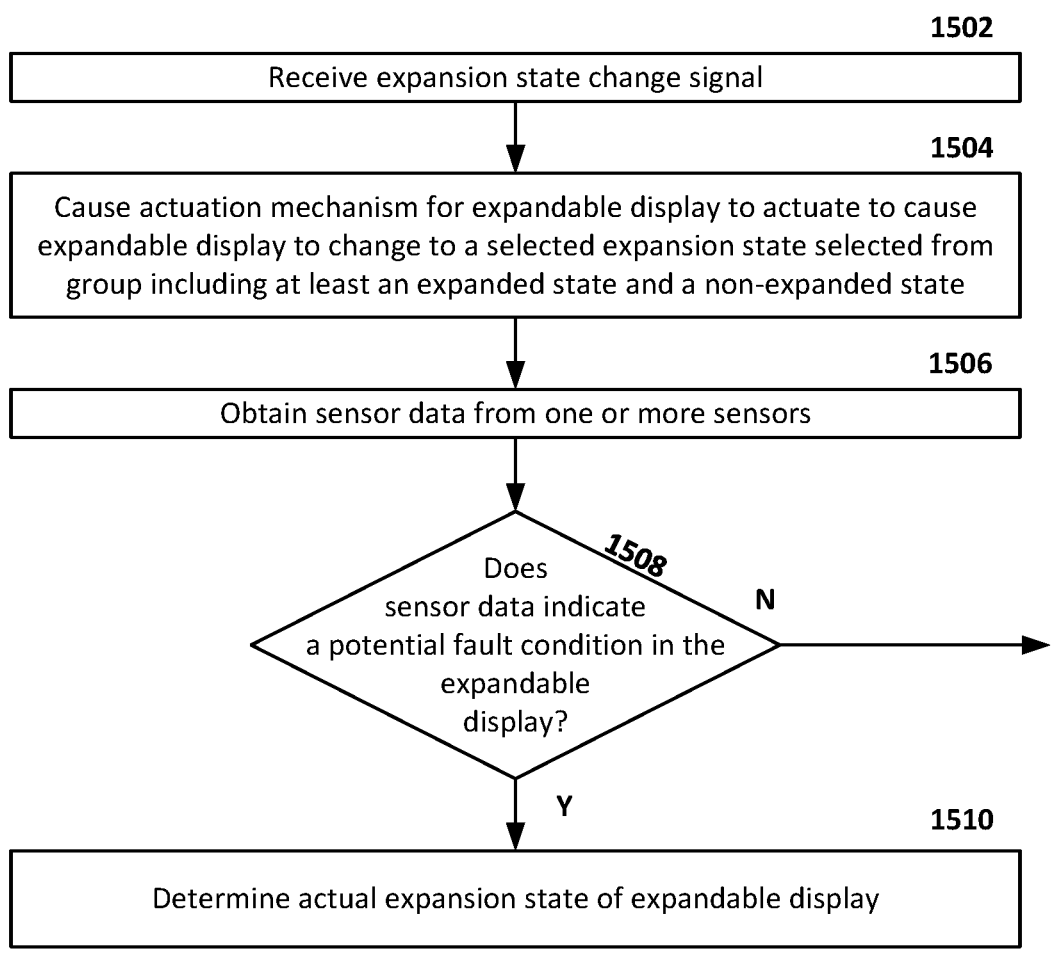
FIG. 15 depicts a flow diagram of an enhanced technique for not only determining whether a potential fault condition in an expandable display may exist, but for also determining the actual expansion state of the expandable display.

FIG. 15 depicts a flow diagram of an enhanced technique for not only determining whether a potential fault condition in an expandable display may exist, but for also determining the actual expansion state of the expandable display.

Blocks 1502 through 1508 are generally the same as blocks 1202 through 1208 of FIG. 12, and the discussion provided above with respect to FIG. 12 is to be understood to be equally applicable to the corresponding blocks in FIG. 15. FIG. 15 differs from FIG. 12 in that if it is determined that a potential fault condition does not exist in block 1508, then the technique (or at least that iteration of the technique) may terminate, whereas if it is determined in block 1508 that a potential fault condition exists, the technique proceeds to block 1510, in which a determination is made as to the actual expansion state of the expandable display.

It is to be noted and understood that in some instances, block 1510 may, for example, be performed as part of block 1508 (and regardless of whether or not a potential fault condition is identified) or prior to block 1508. For example, if the sensor data used to determine the potential fault condition is sensor data that allows for a potential fault to be detected because the sensor data indicates the actual expansion state of the expandable display does not match the desired expansion state, the actual expansion state may inherently be determined as part of such a determination. Thus, for example, the determination that there is a potential fault may be made after the actual expansion state for the expandable display has been determined, e.g., based on the determination of the actual expansion state.

The determination of the actual expansion state may be performed using a number of techniques. For example, if the controller receives sensor data from sensors that directly measure the relative position (or changes therein) of portions of the expandable display that move relative to one another along the axis of expansion or retraction, then the controller may, based on such sensor data, directly determine the positions of such portions relative to each other and thereby determine the extent to which those relative positions differ from an expected relative position. The distance between the expected relative position and the actual relative position may, in conjunction with the known dimensions of the expandable display, allow the controller to determine what the actual expansion state of the expandable display is. For example, if a distance-sensing sensor configured to measure a distance along a first axis between two points within an apparatus, one fixed with respect to a first portion of the apparatus and the other fixed with respect to a second portion thereof which is configured to translate along the first axis relative to the first portion, would normally measure a distance of 0.1" when the expandable display is in a non-expanded state and a distance of 1.9" when the expandable display is in a first expanded state, sensor data showing that the distance measured by the distance-measuring sensor was only 1.7" after the apparatus causes the actuation mechanism for the expandable display to cause the expandable display to attempt to transition to the first expanded state would indicate that the expandable display, when transitioning to the first expanded state, would actually only extend to ~89% of the expected amount of extension that would normally be needed to reach the first expanded state. Based on this determination, the controller may be able to determine, for example, what the actual dimensions of the entire visible area of the expandable display in the "actual" first expanded state are and/or what the screen resolution is of the entire visible area of the expandable display in the "actual" first expanded state (as opposed to the desired first expanded state). For example, if the expandable display discussed above were to be the example expandable display discussed further above, i.e., of 5.9 inches in height, able to expand from a width of 2.4 to a first expanded state of 4.2 inches (when in perfect working order), and having a DPI of 360 pixels/inch, then the dimensions and resolution of the viewable active area of such an expandable display when in the actual first expanded state (assuming a fault that results in only 89% of the desired amount of expansion occurring) may be 5.9 inches in height by 2.4 inches+0.89·(4.2 inches−2.4 inches)=2.4 inches+0.89·1.8 inches=4 inches in width, and may have a resolution of 4 inches 360 pixels per inch=1440 pixels in width and 2136 pixels in height.

In other implementations, the determination of the actual expansion state of the expandable display may be made using other sensor data in the sensor data from the sensor data used to determine if a potential fault condition exists in the expandable display. For example, if sensor data indicating the power, current, and/or voltage provided to the actuation mechanism that drives the expandable display to transition between different expansion states is used to determine a potential fault condition, such sensor data would not provide insight as to the actual expansion state of the expandable display, so the controller would need to look to other sensor data in the sensor data, i.e., sensor data from some other sensor, in order to determine the actual expansion state of the expandable display after determining that a potential fault existed.

As indicated above, sensor data from certain sensors, e.g., such as the distance-sensing sensors discussed above, may be used to directly determine the relative positioning of the movable portions of an expandable display and thereby determine the actual expansion state thereof. In addition to such distance-sensing sensors, other sensors that may be used to similar effect include, for example, linear or rotational encoders that may monitor the amount of extension that the actuation mechanism has undergone (and that the expandable display has thus presumably undergone) in transitioning between two expansion states. Further examples of sensors that may be used to directly determine the actual expansion state of an expandable display include the touch-sensing systems and in- or under-screen ultrasonic fingerprint sensors discussed above.

Figure 16:
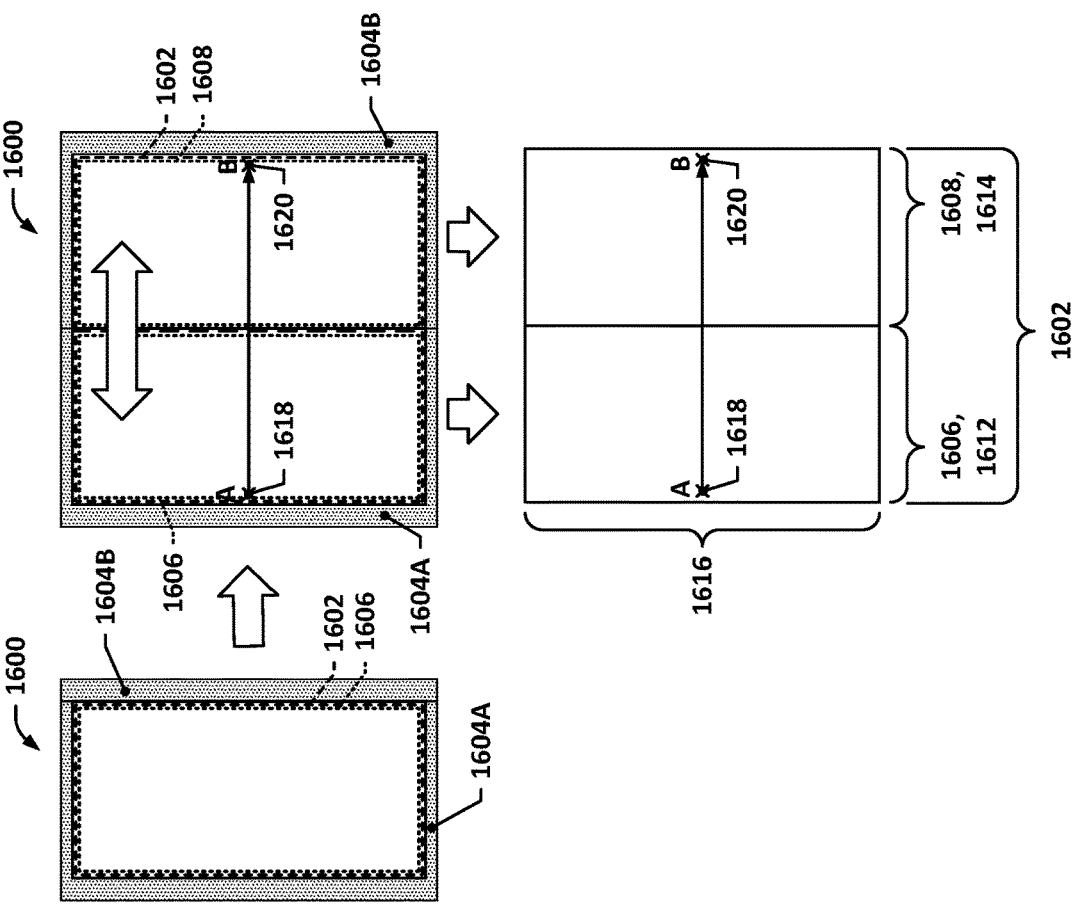
FIG. 16 depicts an example apparatus having an expandable display.

The use of touch-sensing systems to determine the actual expansion state of an expandable display is discussed in more detail below with reference to FIG. 16. FIG. 16 depicts an example apparatus having an expandable display. In the top left part of FIG. 16, the apparatus 1600 is shown in a non-expanded state, and in the top right part of FIG. 16, the apparatus 1600 is shown in an expanded state. The apparatus 1600 features an expandable display 1602 that includes two discrete display panels 1606 and 1608; the display panel 1608 is positioned such that when the expandable display 1602 is in a non-expanded state, as shown at upper left in FIG. 16, the display panel 1608 is obscured or hidden beneath the display panel 1606. The apparatus 1600 further includes a housing 1604 that may include a first portion 1604A and a second portion 1604B. The first portion 1604A and the second portion 1604B may be able to be caused to translate relative to one another, e.g., by an actuation mechanism (not shown, but see later Figures for an example), so as to cause the display panels 1606 and 1608 to slide away from, or towards, one another (depending on the nature of the transition of the expandable display 1602 between expansion states).

As can be seen, in the expanded state, the first portion 1604A and the second portion 1604B of the housing 1604 have been translated relative to one another along the direction indicated by the double-ended arrow. The visible display area of the expandable display 1602 has thus nearly doubled due to the display panel 1608 sliding out from beneath the display panel 1606.

The apparatus 1600 shown in FIG. 16 is shown in expanded and non-expanded states commensurate with theoretical "normal" operation of the apparatus 1600, i.e., with no degradation in the performance of the expansion functionality. When in the expanded state, the two display panels 1606 and 1608 of the expandable display 1602 may, effectively, be side-by-side (with a small amount of potential overlap of the display panel 1606 over the display panel 1608). The display panels 1606 and 1608 may include touch-sensing systems 1612 and 1614, respectively, that may, for example, be provided by a touch screen layer that is integrated into or positioned over or under the substrate on which the display pixels of each display panel 1606 and 1608. The touch-sensing system 1614 may be caused to be deactivated by the controller when the expandable display 1602 is in the non-expanded state, as the display panel 1608 with which the touch-sensing system 1614 is associated is not visible and there is thus no need to register touch-inputs to the touch-sensing system 1614 in the non-expanded state. When the expandable display 1602 is in the expanded state, both touch-sensing systems 1612 and 1614 may be active or enabled, and the touch inputs received therefrom may be provided to a controller of the apparatus which may combine the inputs therefrom into inputs relative to a single display coordinate system, effectively turning the two smaller touch-sensing systems 1612 and 1614 into a single composite touch-sensing system 1616.

Thus, if a user were to place a fingertip at a first touch input location 1618 and then slide it across the expandable display 1602 in the expanded state to a second touch input location 1620, the composite touch-sensing system 1616 would register a continuous touch event or gesture of a fingertip sliding from one edge of the expandable display 1602 to the opposite edge of the expandable display 1602.

Figure 17:
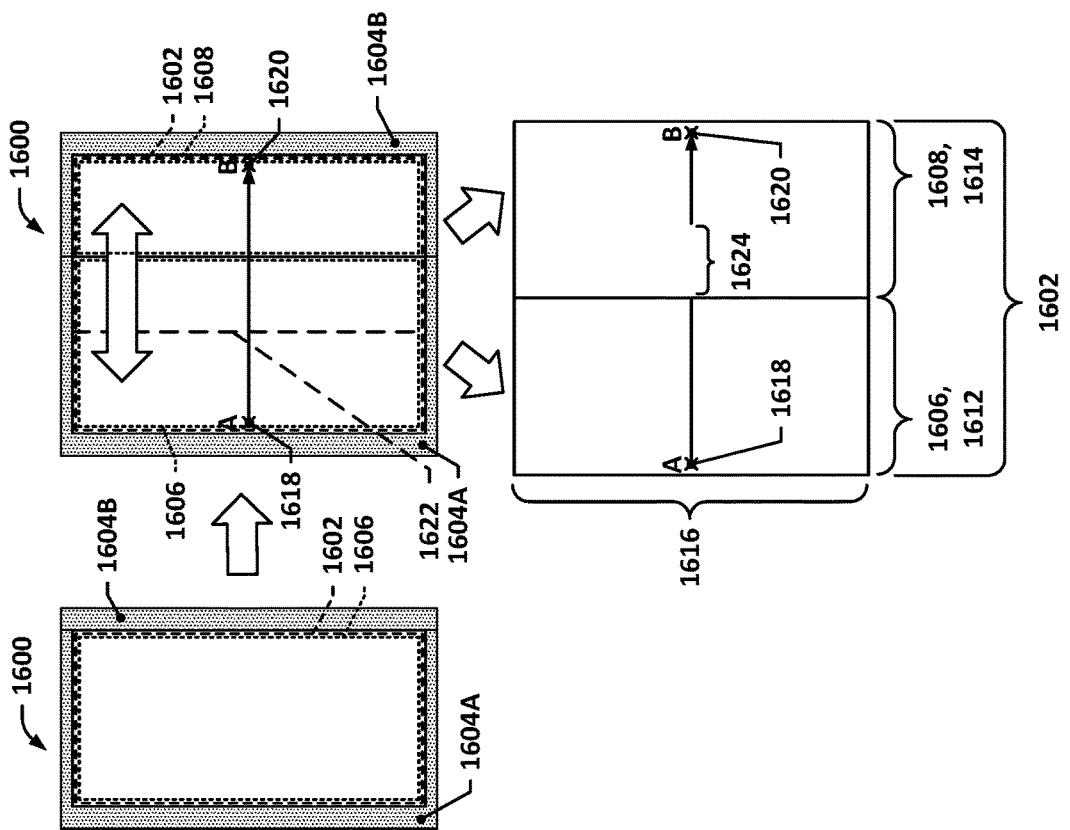
FIG. 17 depicts the same apparatus as FIG. 16, but with the apparatus having experienced a fault that leaves the expandable display only partially extended when in the expanded state.

FIG. 17 depicts the same apparatus 1600 as FIG. 16, but with the apparatus 1600 having experienced a fault that leaves the expandable display only partially extended when in the expanded state. As can be seen, the visible display area of the expandable display 1602 in the "expanded" state (upper right of FIG. 17) is considerably smaller than the visible display area of the expandable display 1602 in the expanded state of FIG. 16. Almost half of the display panel 1608 is still obscured behind the display panel 1606 (the trailing edge 1622 of the display panel 1608, which would be behind the display panel 1606, is shown for reference).

If a user were to perform the same touch input as shown in FIG. 16, i.e., sliding their fingertip across the expandable display 1602 from a first touch input location 1618 adjacent to one side of the expandable display 1602 to a second touch input location 1620 adjacent to an opposite side of the expandable display 1602, then the composite touch-sensing system 1616 may register a very different touch input gesture. Instead of a single, continuous path from the first touch input location 1618 to the second touch input location 1620, as shown in FIG. 16, the composite touch-sensing system may register two disconnected touch input paths separated by a gap 1624, as shown in the bottom image of FIG. 17. The gap 1624 corresponds with the area of the touch-sensing system 1614 of the display panel 1608 that is obscured behind the display panel 1606 and thus, in this example, unable to detect touch inputs. The controller may determine the actual expanded state of the expandable display 1602 based on the size of the gap 1624.

Figure 18:
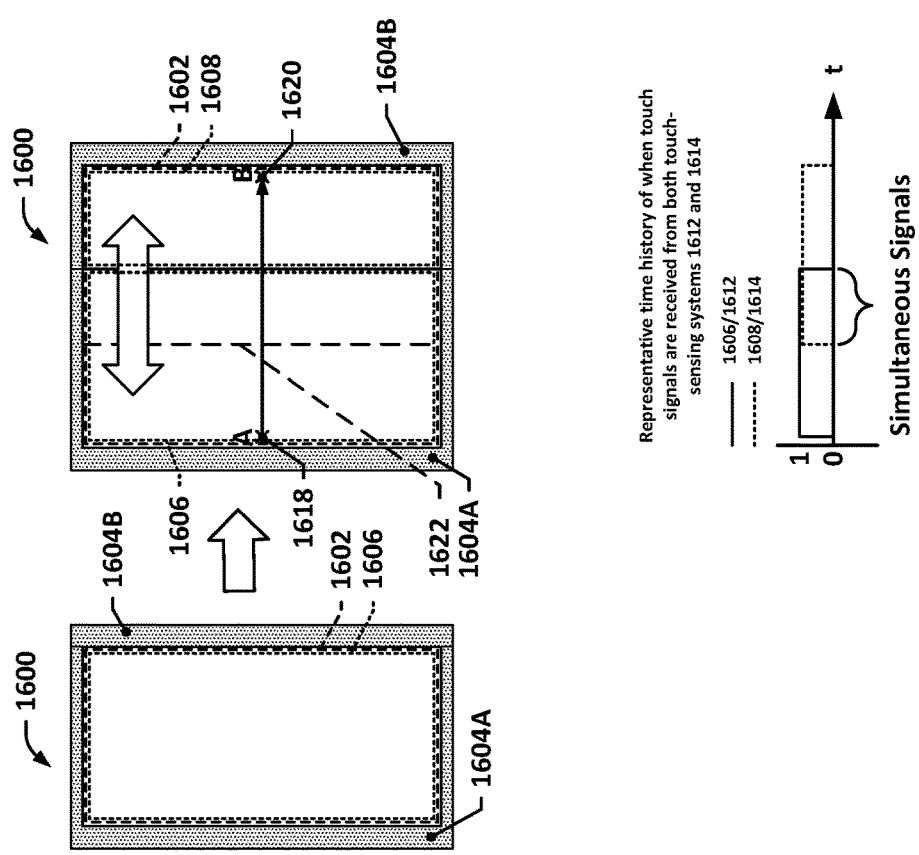
FIG. 18 depicts the apparatus in a similar faulty expanded state to that shown in FIG. 17.

FIG. 18 depicts the apparatus 1600 in a similar faulty expanded state to that shown in FIG. 17. However, in this example, the touch-sensing systems 1612 and 1614 (or at least the touch-sensing system 1614) is actually able to sense touch inputs even when obscured behind the display panel 1606. Accordingly, when a user slides a fingertip from the first touch input location 1618 to the second touch input location 1620, there will, due to the overlap between the display panel 1606 and the display panel 1608, be a period of time in which both display panels simultaneously register the same touch input, thereby each simultaneously generating a touch input signal. From the perspective of a composite touch-sensing system, the resulting touch input signal may indicate that the touch input starts at the first touch input location 1618 and then moves toward the second touch input location 1620; when the touch input reaches the point where the trailing edge 1622 of the display panel 1608 is, the touch input signal will cause a second touch input to appear approximately midway across the composite touch-sensing system area, also travelling towards the second touch input location. The second touch input will move in tandem with the original touch input with respect to the composite touch-sensing system coordinate system until the original touch input reaches the transition between the display panel 1606 and the display panel 1608, at which point the second touch input will disappear, leaving only the original touch input to complete the traversal to the second touch input location 1620. The representative time history shown in the bottom portion of FIG. 18 depicts such overlapping input location signals graphically. The controller may be configured to look for such duplicate motion signals during such touch input movements and to determine, based on the distance during which such dual motion signals coexist, what the amount of overlap is between the display panels 1606 and 1608, thereby allowing, as with the example of FIG. 17, the controller to determine the actual expanded state of the expandable display.

It will be understood that in the techniques discussed above with respect to FIGS. 17 and 18, the touch inputs used to determine the degree to which the display panels 1606 and 1608 have failed to completely transition to the desired expansion state may need to be provided by a user. Accordingly, if the controller of the apparatus determines that verification of the actual expansion state is desired, e.g., if it is determined that a fault condition exists, the controller may cause the expandable display to provide one or more prompts to guide a user through the steps for determining the extent to which the expansion state transition is incomplete. For example, the prompts may instruct the user to touch a finger to the expandable display along a particular edge of the display and to then swipe to the opposing edge in one continuous motion. It will be understood that in implementations such as are shown in FIGS. 16 through 18, such touch inputs may not technically need to extend across the entire expandable display 1602, but may instead start (or end) at an intermediate location—as long as the touch input motion is sufficient to identify the size of the region in which the two touch-sensing systems 1612 and 1614 overlap each other. It will also be understood that in some implementations, motions other than a simple, linear side-to-side swipe of a fingertip may be used. Generally speaking, any touch input movement that includes a component that extends over enough of the expandable display 1602 visible area in a direction parallel to the direction of expandable display expansion or retraction may potentially be sufficient for the purposes discussed above. Thus, touch inputs that draw a diagonal line from corner to corner of the expandable display (or two touch inputs that draw an X between the corners), sloped paths, or even a circular path may be sufficient to determine the actual expansion state.

Figure 19:
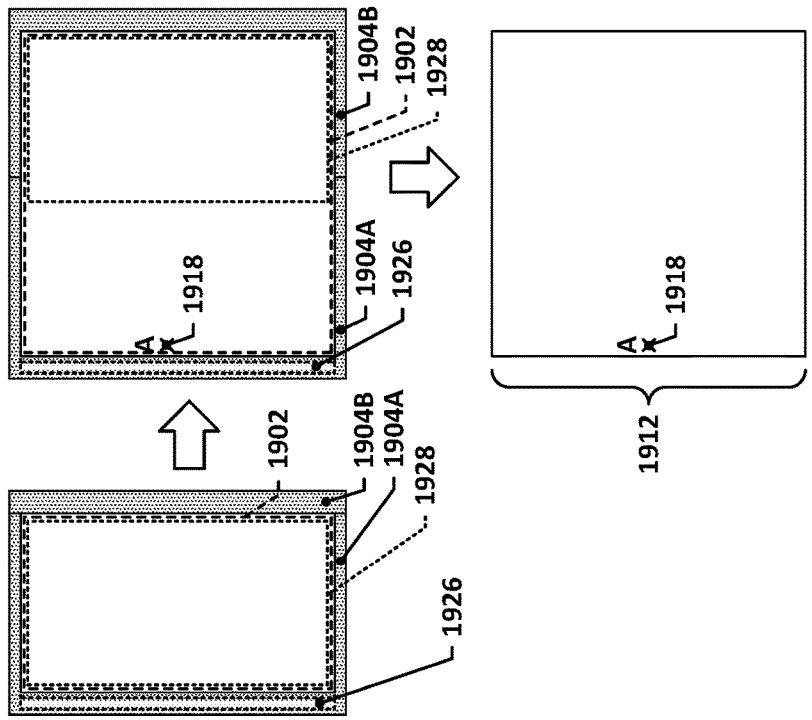
FIG. 19 depicts an example of an apparatus that includes an expandable display.

FIG. 19 depicts an example of an apparatus 1900 that includes an expandable display 1902. The expandable display 1902 in FIG. 19 includes a flexible display panel 1910 that may be rolled onto a roller 1926 that is located within a housing 1904 having a first portion 1904A and a second portion 1904B. One end of the flexible display panel 1910 may be attached to the second portion 1904B such that when the second portion 1904B is caused to translate in a direction perpendicular to the rotational axis of the roller 1926 relative to the first portion 1904A, the flexible display panel 1910 is unrolled from (or rolls up onto) the roller 1926. In some implementations, the roller 1926 may be a sprung roller such that if the flexible display panel 1910 is unrolled from the roller 1926, the spring causes the roller 1926 to attempt to roll the flexible display panel 1910 back onto the roller 1926; alternatively, the roller 1926 may be motor-driven with the motor being controlled to take up any slack in the flexible display panel 1910 that arises from retraction of the second portion 1904B towards the first portion 1904A.

The upper left corner of FIG. 19 shows the apparatus 1900 in a non-expanded state, while the upper right corner of FIG. 19 shows the apparatus 1900 in a first expanded state. When in the non-expanded state, a first portion 1928 of the flexible display panel 1910 may be visible to the user. When in the first expanded state, the first portion 1928 of the expandable display may be moved further from the roller 1926 such that a portion of the flexible display panel that was previously rolled up onto the roller may be unrolled and interposed between the first portion 1928 and the roller 1926. The flexible display panel 1910 may include a touch-sensing system 1912 (shown in the bottom of FIG. 19) that may extend across the flexible display panel 1910; when the expandable display 1902 is in the first expanded state, the touch-sensing system 1912 may have a touch-sensitive area as shown at bottom in FIG. 19.

When a touch input is provided to the touch-sensing system 1912, e.g., at touch input 1918 location to the exposed portion of the flexible display panel 1910 adjacent to the edge of the expandable display 1902 nearest the roller 1926 and when the expandable display 1902 is in the expanded state, the touch input will generally be at a location at the edge of the touch-sensing system 1912 (assuming that the touch-sensing system does not extend beyond the edge of the visible area of the expandable display 1902).

FIG. 20 depicts the same apparatus 1900 as in FIG. 19. The upper left corner of FIG. 20 depicts the apparatus 1900 in the non-expanded state, while the upper right corner of FIG. 20 depicts the apparatus 1900 in a faulty expanded state. The dotted outline 1904B' shows the desired expanded state of the expandable display 1902; as can be seen, the actual expanded state of the expandable display is much smaller. When the touch input 1918 is provided in the same location relative to the housing 1904 as in FIG. 19, the touch-sensing system 1912 may register a touch input that is, as shown in the lower portion of FIG. 20, offset from the edge of the touch-sensing system 1912 by a distance that is commensurate in size with a width (in the direction of extension/retraction) of a second portion 1930 of the flexible display panel 1910 that is still on the roller 1926 due to the faulty expanded state. Accordingly, the location of the touch input 1918 may provide information that allows the actual expansion state to be determined.

For example, if the touch-sensing system 1912 detects the touch input at a location 1 inch from the edge of the flexible display panel 1910 that is attached to the roller 1926, then the controller may determine that the actual expanded state is equal to the maximum expanded state minus 1 inch. Thus, if the expandable display discussed above were to be the example expandable display discussed further above, i.e., of 5.9 inches in height, able to expand from a width of 2.4 to a first expanded state of 4.2 inches (when in perfect working order), and having a DPI of 360 pixels/inch, then the dimensions and resolution of the viewable active area of such an expandable display when in the actual expanded state (assuming a fault that results in 1 inch of the flexible display panel 1910 being unable to be extended) may be 5.9 inches in height by 4.2 inches−1 inch=3.2 inches in width, and may have a resolution of 3.2 inches 360 pixels per inch=1152 pixels in width and 2136 pixels in height.

Figure 21:
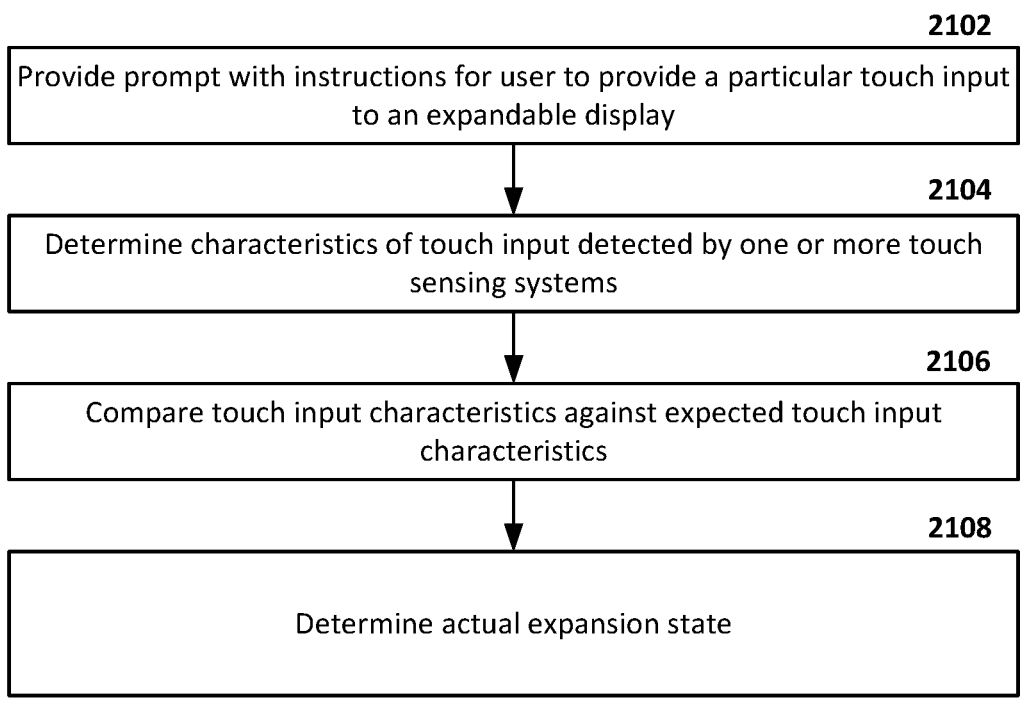
FIG. 21 depicts a flow diagram for a technique for determining the actual expansion state of an expandable display using a touch-sensing system thereof

FIG. 21 depicts a flow diagram for a technique for determining the actual expansion state of an expandable display using a touch-sensing system thereof. In block 2102, a controller of an apparatus having an expandable display may cause a prompt to be provided to a user instructing the user to provide a particular touch input to the expandable display. For example, the prompt may instruct the user to provide a touch input to the exposed portion of the flexible display panel adjacent to the edge of the expandable display nearest the roller (when the expandable display 1902 is in the expanded state or in a state that results from a faulty attempt to transition to the expanded state). Alternatively, the user may be prompted to provide a touch input along a particular path that includes such a location, e.g., a swipe from one edge to the other.

In block 2104, the characteristics of a touch input provided to the touch-sensing system may be determined from data obtained from one or more touch-sensing systems of the apparatus having the expandable display. Such characteristics may, for example, include touch positions relative to the coordinate system of the touch-sensing system (or composite touch-sensing system), either individual such locations or multiple such locations defining a path of the touch input.

In block 2106, the controller may analyze the touch input characteristics with respect to the expected touch input characteristics, e.g., such as is discussed earlier. Such analysis may involve, for example, determining a difference between an expected location of the touch input and the actual touch input location, determining whether a touch input path has a gap in it or a portion where two different touch-sensing systems registered the same touch input simultaneously (thus indicating that such touch-sensing systems are overlapping), or other evaluation such as those discussed above.

In block 2108, the controller may use the results of the comparison of block 2106 to determine the actual expansion state of the expandable display, e.g., by determining the extent to which the expandable display has either extended or failed to extend.

It will be understood that ultrasonic fingerprint sensors may be used in a similar manner with respect to the technique of FIG. 21, e.g., instead of using a touch-sensing system to obtain the locations of touch inputs, the controller may use an ultrasonic fingerprint sensor that is coextensive with at least a portion of the expandable display in order to obtain information on touch inputs. It will also be understood that, as discussed earlier, ultrasonic fingerprint sensors may, if used to determine the actual expansion state, also potentially be usable to determine the actual expansion state without requiring any actions on the part of the user at all. Thus, while ultrasonic fingerprint sensors may be used in some implementations to obtain touch inputs per the above-discussed examples, other implementations may use ultrasonic fingerprint sensors to detect expansion state without requiring the user to provide any touch inputs.

For example, some ultrasonic fingerprint sensors operate by emitting a planar ultrasonic wave or pulse that travels in a direction normal to the plane in which the ultrasonic fingerprint sensor is implemented, e.g., normal to the surface of a display with which the ultrasonic fingerprint sensor may be integrated or coupled. As the ultrasonic wave passes through interfaces between different materials or substances with different acoustic impedances, e.g., through an interface between a person's fingertip and a surface of a display, portions of the ultrasonic wave may be reflected by such interfaces with different intensities. For example, portions of ultrasonic waves that encounter an interface between glass and air, such as may be found between the portions of a person's fingertip that correspond with valleys in the person's fingerprints, may be reflected to a larger extent than portions of those ultrasonic waves that encounter an interface between glass and a person's skin, such as may be found between the portions of a person's fingertip that correspond with ridges in the person's fingerprints. The reflected waves may be detected by a pixelized piezoelectric receiver that converts the detected reflected ultrasonic wave energy into an image that may then be used for fingerprint detection. Such images are, in effect, graphical representations of acoustic impedance. Since such images may need to be relatively high-resolution in order to resolve the features of a fingerprint with sufficient detail to allow fingerprint recognition to be performed, ultrasonic fingerprint sensors may typically have a resolution on the order of at least several hundred DPI, e.g., 500 dpi.

Ultrasonic fingerprint sensors may also, however, be able to detect the presence of other objects that may be in the acoustic propagation path of the ultrasonic waves emitted thereby. For example, if an ultrasonic sensor (or sensors) is provided that is coextensive with the maximum display area of an expandable display, such a sensor would, when the expandable display is in its fully expanded state, be able to obtain fingerprint images of fingertips that are touching any portion of the expandable display. However, when the same expandable display is either in the non-expanded state or in a less than fully expanded state, the ultrasonic fingerprint sensor will not only detect locations of fingertips on the parts of the ultrasonic fingerprint sensor that underlie the visible portion of the expandable display, but it will also detect other objects that may overlap other portions of the expandable display, such as, for example, an additional display panel, a portion of the apparatus housing (such as a bezel), etc. Moreover, since it is likely that the transition between the visible area of the expandable display and the hidden part of the expandable display will be linear across the height of the expandable display (in a direction perpendicular to the expansion/contraction axis of the expandable display), the representation of such a transition in the image data provided by the ultrasonic fingerprint sensor will generally exhibit a sharp transition or linear visual artifact at the location where the transition is detected. The actual expansion state may thus be determined by the controller by identifying the location of such a transition relative to the ultrasonic fingerprint sensor coordinate system and then correlating that with the physical characteristics of the expandable display.

This is depicted graphically in FIGS. 22 through 24, which show an apparatus 2200 with an expandable display 2202 that includes a first display panel 2206 and a second display panel 2208. The first display panel 2206 is fixed in space with respect to a first portion 2204A of the apparatus housing, and the second display panel 2208 is fixed in space with respect to a second portion 2204B of the housing. The first portion 2204A and the second portion 2204B of the housing are able to translate relative to each other, as shown by FIGS. 23 and 24, which show the expandable display 2202 in the fully expanded state and a faulty fully expanded state (in which the expandable display 2202 is only partially expanded), respectively. In the depicted example, the first display panel 2206 and the second display panel 2208 have ultrasonic fingerprint sensors 2232A and 2232B, respectively, that are coextensive therewith.

As noted above, in FIG. 23, the apparatus 2200 is shown with the expandable display 2202 in a fully expanded state. If the ultrasonic fingerprint sensor 2232B is activated so as to obtain an image scan across the width of the display panel 2208, the resulting image may generally be uniform in nature (assuming there are no objects, such as fingers, pressed against the display panel 2208) but may exhibit a sudden change in appearance along the right edge at a location that coincides with where the display panel 2206 may overlap the display panel 2208 (and thus the ultrasonic fingerprint sensor 2232B); this is represented symbolically in the signal plot shown below the apparatus 2200. The signal plot may be viewed as representing normalized pixel values for a row of pixels across the ultrasonic fingerprint sensor 2232B (extending left to right). As can be seen, for most of the width of the ultrasonic fingerprint sensor 2232B, the signal is at 0, indicating that no objects are evident in the scanned image provided by the ultrasonic fingerprint sensor. However, at the rightmost edge of the ultrasonic fingerprint sensor, the signal transitions to a value of 1 due to the presence of the overlapping portion of the first display panel 2206. It will be understood that the signal plot shown in FIG. 23 is symbolic in nature, and that in actual practice, there will likely be noise, potentially other artifacts (such as images of user fingertips that may be on the expandable display panel), etc. that may be present. The controller may thus potentially post-process scanned ultrasonic fingerprint images to identify features of interest, such as a linear edge feature that represents the transition between the two display panels 2206 and 2208.

As also noted above, FIG. 24 depicts the apparatus 2200 with the expandable display 2202 in a faulty fully expanded state, i.e., the apparatus has attempted to place the expandable display 2202 into the fully expanded state but has, due to a fault, only partially expanded it. If the ultrasonic fingerprint sensor 2232B is activated so as to obtain an image scan across the width of the display panel 2208, the resulting image may generally be uniform in nature (assuming there are no objects, such as fingers, pressed against the display panel 2208) but may exhibit a sudden change in appearance—approximately in the middle, in this case—at a location that coincides with where the display panel 2206 may overlap the display panel 2208 (and thus the ultrasonic fingerprint sensor 2232B); this is represented symbolically in the signal plot (similar to that in FIG. 23) shown below the apparatus 2200.

It will be understood that the ultrasonic fingerprint sensor(s), while shown in FIGS. 22 through 24 as extending across the entire expandable display 2202, may also be configured to extend across only a sub-portion of the expandable display 2202. For example, instead of extending across the entire maximum width and height of the expandable display 2202, the ultrasonic fingerprint sensor(s) may extend across the entire width thereof, but only across a small portion of the height thereof. In a further or alternative example, the ultrasonic fingerprint sensor(s) may only extend across a portion of the width thereof. For example, in the apparatus 2200, the ultrasonic fingerprint sensor 2232A may be entirely omitted for the purposes of actual expansion state determination since the ultrasonic fingerprint sensor 2232A is not used in determining the actual expansion state. Generally speaking, if an ultrasonic fingerprint sensor is used to determine the actual expansion state of an expandable display, the ultrasonic fingerprint sensor generally only needs to be coextensive with a region or portion of the expandable display that is obscured or covered when in the non-expanded state but exposed when in the fully expanded state.

It will also be recognized that the example discussed above may also be implemented in apparatuses that have rollable expandable displays, e.g., expandable displays with flexible display panels that are able to be partially rolled up onto a roller within the apparatus, or in expandable displays that use flexible display panels but use mechanisms other than a roller to store the hidden portion of the flexible display panel when in the non-expanded state. In such implementations, instead of detecting the edge of the overlapping display panel 2206, the ultrasonic fingerprint sensor would instead detect the edge of the overlapping part of the housing that is proximate to the roller or that is the edge of the housing that the flexible display panel otherwise retracts into or extends from during expansion state changes.

As discussed earlier, once a determination has been made as to an expandable display's actual expansion state (in the event of a fault), some implementations of apparatuses with expandable displays may be configured to take corrective action with respect to one or more systems of the apparatus, e.g., to enhance usability, mitigate faults in such other systems that may arise due to the expandable display fault, and/or to conserve power.

Figure 25:
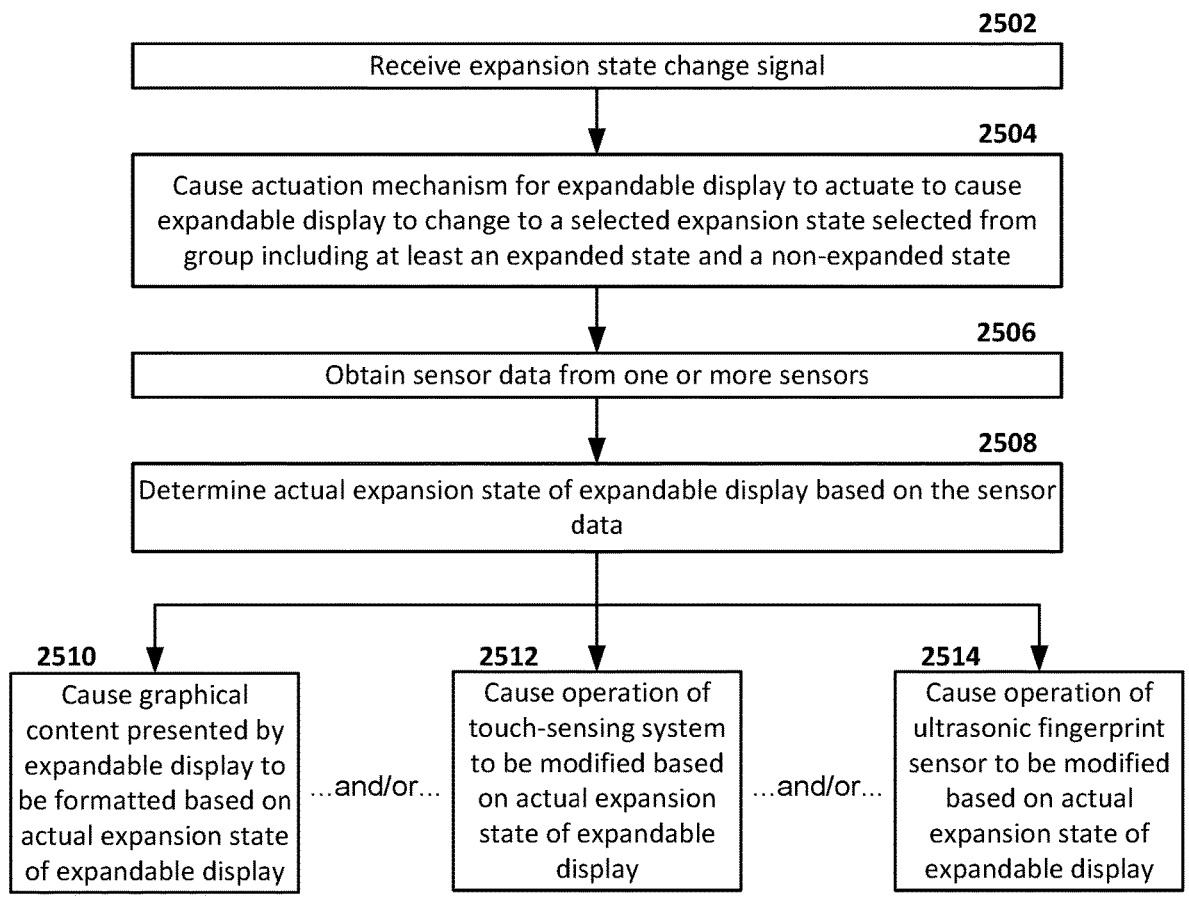
FIG. 25 depicts an example technique for various mitigation measures that may be taken to address expandable display expansion faults.

FIG. 25 depicts an example technique for some such mitigation measures. In block 2502, for example, a controller of an apparatus with an expandable display may receive an expansion state change signal, e.g., to indicate that the expandable display should be transitioned from a non-expanded state to an expanded state or vice-versa.

In block 2504, the controller may cause an actuation mechanism for the expandable display to actuate so as to cause the expandable display to transition to the desired expansion state, e.g., an expanded state or the non-expanded state.

In block 2506, the controller may obtain sensor data from one or more sensors that may, for example, be used to determine an actual expansion state of the expandable display. In block 2508, the controller may determine an actual expansion state for the expandable display, e.g., using one of the techniques discussed above.

The controller may then modify how one or more different components are used or operated, e.g., modify how the expandable display display elements operate or are used, modify how a touch-sensing system (if present) of the device with the expandable display operates or is used, and/or modify how an ultrasonic fingerprint sensor (if present) of the device with the expandable display operates or is used.

For example, in block 2510, the controller may cause graphical content presented by the expandable display to be formatted based on the actual expansion state of the expandable display. For example, the controller, which may include a display controller, may be configured to provide screen resolution information to software that is being executed by the apparatus that indicates the actual resolution of the visible area of the expandable display in the actual expansion state such that the software is able to, for example, adjust the sizes and/or positions of various interface elements according to the resolution of the expandable display in the actual expansion state. In some further implementations, the controller may cause only the portions of the expandable display that are visible in the actual expansion state to be provided with display signals. For example, the controller may cause only the rows or columns of pixels of the expandable display that are located in the portions of the expandable display that visible in the actual expanded state to be provided with display signals, e.g., provided power, scanned, etc. The rows and/or columns of pixels that are in portions of the expandable display that are hidden from view in the actual expansion state may be deactivated by the controller, e.g., not provided with power, not scanned, etc. This avoids situations in which portions of the display that are not visible may be caused to present graphics that may, in some instances, result in noticeable artifacts (such as, for example, if two discrete display panels are used in the expandable display and one of the display panels overlaps the other—graphics shown on the overlapped portion thereof may, for example, be visible or partially visible through the overlapping portion). This may also avoid situations in which portions of the expandable display that are not visible in the actual expansion state may be powered, thereby wasting power used to illuminate such portions of the display and processing power used to cause pixels in such portions to change state to display graphics that are not able to be seen.

Similar techniques may be used to adjust the operation of other components of the apparatus. For example, in block 2512, if the apparatus includes one or more touch-sensing systems, then the controller may adapt or modify how a portion or portions of the touch-sensing system(s) that are collocated with a portion or portions of the expandable display that are not visible in the actual expansion state operate or are used. For example, in some implementations, the controller may simply ignore touch input data that indicates touch events that are in such a portion or portions, thereby preventing potential spurious inputs to portions of the touch-sensing system(s) that correspond with locations of the expandable display that are not visible. In yet further implementations, the controller may cause the touch-sensing system(s) to avoid scanning the portion or portions of the touch-sensing system(s) that lie within such a non-visible portion or portions of the expandable display, e.g., the controller may cause individual rows or columns of sensor elements (sensor pixels) within the touch-sensing system(s)

to not be scanned for touch event data when such rows or columns of sensor pixels are entirely within the portion or portions of the expandable display that are not visible in the actual expansion state. This may similarly act to prevent the detection of spurious inputs to a portion or portions of the expandable display that are not visible, but may also reduce computational and processing overhead, as the controller processes data from a reduced number of sensor pixels. In yet further implementations, the controller may cause some elements of the touch-sensing system(s) that lie within such a portion of portions of the expandable display that are not visible to not be provided with power. For example, the controller may cause columns or rows of sensor pixels in the portion or portions of the touch-sensing system(s) that are collocated with the portion or portions of the expandable display that are not visible to not receive power during operation of the touch-sensing system. Such a technique may avoid unnecessary power consumption, thereby reducing heating of the apparatus and extending the battery life of such an apparatus.

It will be understood that a similar technique may be practiced with respect to an ultrasonic fingerprint system that has a portion or portions thereof that are coextensive with a portion or portions of an expandable display that are not visible based on the expandable display's actual expansion state. For example, in some implementations and as in block 2514, if the apparatus includes one or more ultrasonic fingerprint sensors, then the controller may adapt or modify how a portion or portions of the ultrasonic fingerprint sensor(s) that are collocated with a portion or portions of the expandable display that are not visible in the actual expansion state operate or are used, e.g., by making such portions inactive or treating them as inactive. For example, the controller may simply ignore a portion or portions of scan data from the ultrasonic fingerprint sensor(s) for a portion or portions of the ultrasonic fingerprint sensor(s) that are coextensive with a portion or portions of the expandable display that are not visible in the actual expansion state. Such implementations may thereby avoid the processing overhead that may come with processing the ultrasonic scan data for such a portion or portions of the expandable display that are not visible. In yet further implementations, the controller may cause the ultrasonic fingerprint sensor(s) to avoid scanning the portion or portions of the ultrasonic fingerprint sensor(s) that lie within such a non-visible portion or portions of the expandable display, e.g., the controller may cause individual rows or columns of sensor elements (sensor pixels) within the ultrasonic fingerprint sensor(s) to not be scanned for reflected ultrasonic wave data when such rows or columns of sensor pixels are entirely within the portion or portions of the expandable display that are not visible in the actual expansion state. This may similarly act to avoid the processing of the scan data from such a portion or portions of the ultrasonic fingerprint sensor(s) and the processing overhead associated therewith, but may also potentially result in further power conservation due to the reduced number of scan operations that are performed to obtain a scan data set from the ultrasonic fingerprint sensor(s). In yet further implementations, the controller may cause some elements of the ultrasonic fingerprint sensor(s) that lie within such a portion of portions of the expandable display that are not visible to not be provided with power. For example, the controller may cause columns or rows of sensor pixels in the portion or portions of the ultrasonic fingerprint sensor(s) that are collocated with the portion or portions of the expandable display that are not visible to not receive power during operation of the ultrasonic fingerprint sensor. Such a technique may avoid unnecessary power consumption, thereby reducing heating of the apparatus and extending the battery life of such an apparatus.

It will be understood that any or all of the above-discussed techniques may be implemented, as desired, in a single apparatus in combination with any of the other above-discussed techniques, e.g., by a controller of the apparatus.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or technique or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

It is to be understood that the phrases "for each <item> of the one or more <items>," "each <item> of the one or more <items>," or the like, if used herein, are inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items. Similarly, the term "set" or "subset" should not be viewed, in itself, as necessarily encompassing a plurality of items—it will be understood that a set or a subset can encompass only one member or multiple members (unless the context indicates otherwise).

Terms such as "about," "approximately," "substantially," "nominal," or the like, when used in reference to quantities or similar quantifiable properties, are to be understood to be inclusive of values within ±10% of the values or relationship specified (as well as inclusive of the actual values or relationship specified), unless otherwise indicated.

The use of "between," unless otherwise indicated, is to be understood to be inclusive of the values indicated. Thus, for example, "between A and B" is to be understood to be inclusive of not only the values less than B and greater than A (or vice versa, depending on the order of A and B) but also the values A and B.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood. It is also to be understood that use of the ordinal indicator "first" herein, e.g., "a first item," should not be read as suggesting, implicitly or inherently, that there is necessarily a "second" instance, e.g., "a second item."

At the very least, the present disclosure is directed to, but not limited to, the following numbered implementations.

Implementation 1: An apparatus comprising:
an expandable display;
an actuation mechanism; and
a controller, wherein:
  the expandable display is transitionable at least between an expanded state and a non-expanded state,
  the actuation mechanism is configured to cause the expandable display to transition between the expanded state and the non-expanded state responsive to receipt of one or more signals, and
  the controller is configured to:
    a) receive a display expansion request signal,
    b) determine, responsive to (a), whether one or more expansion conditions are met,
    c) cause the actuation mechanism, when the expandable display is in the non-expanded state, to transition the expandable display from the non-expanded state to the expanded state responsive to receipt of the display expansion request signal and a determination that the one or more expansion conditions are met, and
d) cause the actuation mechanism, when the expandable display is in the non-expanded state, to cause the expandable display to remain in the non-expanded state responsive to receipt of the display expansion request signal and a determination that the one or more expansion conditions are not met.

Implementation 2: The apparatus of implementation 1, wherein the controller is configured to obtain information indicative of a battery charge level of one or more batteries used to power the actuation mechanism, and wherein the one or more expansion conditions are met, at least in part, by the battery charge level being above a first threshold amount.

Implementation 3: The apparatus of either implementation 1 or implementation 2, wherein the one or more expansion conditions are met, at least in part, or further met, at least in part, when a first software application that is in the foreground is associated with information that indicates that the first software application is compatible with the expandable display.

Implementation 4: The apparatus of implementation 3, wherein:
the apparatus further comprises one or more memory devices that store a) information indicative of a global permission level for the expandable display and b) information indicative of an application-specific permission level for each software application of a plurality of software applications executable by the apparatus,
the plurality of software applications includes the first software application,
the global permission level is selected from a group of global permission levels including at least a first global permission level and a second global permission level,
each application-specific permission level is selected from a group of application-specific permission levels including at least a first application-specific permission level and a second application-specific permission level,
the one or more expansion conditions are further met, at least in part, when either i) the information indicative of a global permission level for the expandable display indicates the first global permission level or ii) the information indicative of a global permission level for the expandable display indicates the second global permission level and the information indicative of the application-specific permission level for the first software application indicates the first application-specific permission level.

Implementation 5: The apparatus of implementation 3, wherein:
the apparatus further comprises one or more memory devices that store a) information indicative of a global permission level for the expandable display and b) information indicative of an application-specific permission level for each software application of a plurality of software applications executable by the apparatus,
the plurality of software applications includes the first software application,
the global permission level is selected from a group of global permission levels including at least a first global permission level, a second global permission level, and a third global permission level,
each application-specific permission level is selected from a group of application-specific permission levels including at least a first application-specific permission level and a second application-specific permission level,
the one or more expansion conditions are further met, at least in part, when i) the information indicative of a global permission level for the expandable display indicates the first global permission level, ii) the information indicative of a global permission level for the expandable display indicates the second global permission level and the information indicative of the application-specific permission level for the first software application indicates the first application-specific permission level, iii) the information indicative of a global permission level for the expandable display indicates the third global permission level, the information indicative of the application-specific permission level for the first software application indicates the first application-specific permission level, or iv) the information indicative of a global permission level for the expandable display indicates the third global permission level, the information indicative of the application-specific permission level for the first software application indicates the second application-specific permission level, and the controller receives a confirmation signal indicative of a user authorization to permit actuation of the expandable display from the non-expanded state to the expanded state.

Implementation 6: The apparatus of implementation 5, wherein the controller is further configured to, upon determining that the information indicative of a global permission level for the expandable display indicates the third global permission level and the information indicative of the application-specific permission level for the first software application indicates the second application-specific permission level:
cause a user prompt to be presented by the apparatus, and
receive the confirmation signal responsive to input received after presentation of the user prompt.

Implementation 7: The apparatus of any one of implementations 1 through 6, further comprising one or more accelerometers mounted in the apparatus, wherein the controller is further configured to:
obtain acceleration data from the one or more accelerometers,
determine when the acceleration data indicates an acceleration consistent with a free-fall state, and
cause the expandable display, when in the expanded state, to transition to the non-expanded state responsive to determining that the acceleration data indicates acceleration consistent with the free-fall state.

Implementation 8: An apparatus comprising:
a housing;
an expandable display;
an actuation mechanism; and
a controller, wherein:
the expandable display is transitionable at least between an expanded state and a non-expanded state,
the actuation mechanism is configured to cause the expandable display to transition between the expanded state and the non-expanded state responsive to receipt of one or more signals,
the controller is configured to cause the actuation mechanism to transition to a selected expansion state selected from a group including at least the expanded state and the non-expanded state responsive to receipt of an expansion state change signal, the controller is configured to obtain sensor data from one or more sensors of the apparatus, and the controller is configured to determine whether the sensor data indicates a potential fault condition in the expandable display.

Implementation 9: The apparatus of implementation 8, wherein the controller is further configured to:

determine an actual expansion state of the expandable display based on the sensor data, and cause graphical content presented by the expandable display to be formatted based on the actual expansion state of the expandable display.

Implementation 10: The apparatus of implementation 9, further comprising one or more ultrasonic fingerprint sensors that are part of the expandable display, wherein the controller is further configured to cause a first portion of the ultrasonic fingerprint sensor to enter an inactive state when the selected expansion state is the expanded state and responsive to determining that the actual expansion state is not the expanded state.

Implementation 11: The apparatus of any one of implementations 8 through 10, wherein the one or more sensors of the apparatus include one or more touch-sensing systems configured to receive touch-inputs to the expandable display and the sensor data used to determine whether the sensor data indicates a potential fault condition in the expandable display includes touch sensor data from the one or more touch-sensing systems.

Implementation 12: The apparatus of implementation 11, wherein the expandable display is a flexible rollable display and the controller is further configured to:

cause the apparatus to present a prompt with instructions for a user to provide a particular touch input to the expandable display, determine characteristics of a touch input detected by the one or more touch-sensing systems after causing the prompt to be presented and relative to a coordinate system of the one or more touch-sensing systems, and determine an actual expansion state of the expandable display by comparing the touch input characteristics against expected touch input characteristics associated with the particular touch input.

Implementation 13: The apparatus of implementation 12, wherein the instructions for the user to provide the particular touch input to the expandable display include instructions that, when followed, cause the user to touch an exposed portion of the flexible rollable display that is proximate an edge of the expandable display, wherein the edge is proximate to a roller onto which the flexible rollable display is mounted.

Implementation 14: The apparatus of implementation 11, wherein:

the expandable display includes a first display panel and a second display panel, the first display panel and the second display panel are configured to translate relative to one another along a first axis so as to transition between the expanded state and the non-expanded state, the first display panel at least partially overlays the second display panel when in the non-expanded state and viewed along a direction normal to the first display panel, the first display panel has a first touch-sensing system of the one or more touch-sensing systems, the first touch-sensing system is configured to receive touch-inputs to the first display panel, the second display panel has a second touch-sensing system of the one or more touch-sensing systems, the second touch-sensing system is configured to receive touch-inputs to the second display panel, and the controller is further configured to:

cause the apparatus to present a prompt with instructions for a user to provide a particular touch input to the expandable display, determine characteristics of a touch input detected by the one or more touch-sensing systems after causing the prompt to be presented and relative to a coordinate system of the one or more touch-sensing systems, and determine an actual expansion state of the expandable display by comparing the touch input characteristics against expected touch input characteristics associated with the particular touch input.

Implementation 15: The apparatus of implementation 14, wherein the instructions for the user to provide the particular touch input to the expandable display include instructions that, when followed, cause the user to touch an exposed portion of the expandable display that is proximate a first edge of an exposed portion of the expandable display and to move the touch input across at least part of the expandable display toward a second edge of the exposed portion of the expandable display opposite the first edge, wherein:

the first edge and second edge of the expandable display define, at least in part, a viewable area of the expandable display, and the first edge and second edge are transverse to the first axis.

Implementation 16: The apparatus of any one of implementations 8, 9, or 11 through 15, further comprising one or more ultrasonic fingerprint sensors, or implementation 10, wherein:

the sensor data includes ultrasonic scan data from the one or more ultrasonic fingerprint sensors, the controller is configured to determine whether the potential fault condition exists in the expandable display based on the ultrasonic scan data.

Implementation 17: The apparatus of implementation 16, wherein the determination of whether the potential fault condition exists is based on:

an identification of an artifact in the ultrasonic scan data indicative of an edge of the housing of the apparatus, a determination of a location of the artifact relative to a coordinate system, and a comparison of the location of the artifact to an expected location of the edge of the housing of the apparatus in the selected expansion state relative to the coordinate system.

Implementation 18: The apparatus of implementation 17, wherein the controller is further configured to:

determine an actual expansion state of the expandable display based on the comparison of the location of the artifact to the expected location of the edge of the housing of the apparatus in the selected expansion state relative to the coordinate system, and cause graphical content presented by the expandable display to be formatted based on the actual expansion state of the expandable display.

Implementation 19: The apparatus of any one of implementations 8 through 18, wherein:

the housing includes a first portion and a second portion that are configured to translate relative to one another when the expandable display transitions between the expanded and non-expanded states, the one or more sensors of the apparatus include one or more optical distance measurement sensors, the one or more optical distance measurement sensors are configured to measure a distance between a first point that is fixed with respect to the first portion and a second point that is fixed with respect to the second portion, and the controller is configured to determine whether the potential fault condition exists in the expandable display based on optical distance measurement data from the one or more optical distance measurement sensors.

Implementation 20: The apparatus of any one of implementations 8 through 19, wherein:

the one or more sensors of the apparatus include one or more rotational or linear encoders, the one or more rotational or linear encoders are configured to monitor an actuation state of the actuation mechanism, and the controller is configured to determine whether the potential fault condition exists in the expandable display includes rotational or linear encoder data from the one or more rotational or linear encoders.

Implementation 21: The apparatus of any one of implementations 8 through 20, wherein:

the one or more sensors of the apparatus include one or more sensors configured to monitor one or more of voltage, current, and power provided to the actuation mechanism, and the controller is configured to determine whether the potential fault condition exists in the expandable display based on data on one or more of voltage, current, and power provided to the actuation mechanism, wherein the data on one or more of voltage, current, and power is provided by the one or more sensors configured to monitor one or more of voltage, current, and power provided to the actuation mechanism.

Implementation 22: A method of managing operation of an expandable display in an apparatus, wherein the expandable display is transitionable at least between an expanded state and a non-expanded state using an actuation mechanism, the method comprising:

a) receiving a display expansion request signal;

b) determining, responsive to (a), that one or more expansion conditions are met; and c) causing the actuation mechanism, when the expandable display is in the non-expanded state, to transition the expandable display from the non-expanded state to the expanded state responsive to receipt of the display expansion request signal and to the determination that the one or more expansion conditions are met.

Implementation 23: The method of implementation 22, further comprising obtaining information indicative of a battery charge level of one or more batteries used to power the actuation mechanism, wherein the one or more expansion conditions are met, at least in part, by the battery charge level being above a first threshold amount.

Implementation 24: The method of either implementation 22 or implementation 23, wherein the one or more expansion conditions are met, at least in part, or further met, at least in part, when a first software application that is in the foreground is associated with information that indicates that the first software application is compatible with the expandable display.

Implementation 25: The method of implementation 24, further comprising:

obtaining information on a global permission level for the expandable display, the global permission level selected from a group of global permission levels including at least a first global permission level and a second global permission level; and obtaining information on an application-specific permission level for the first software application, the application-specific permission level selected from a group of application-specific permission levels including at least a first application-specific permission level and a second application-specific permission level, wherein the one or more expansion conditions are further met, at least in part, when either i) the information indicative of a global permission level for the expandable display indicates the first global permission level or ii) the information indicative of a global permission level for the expandable display indicates the second global permission level and the information indicative of the application-specific permission level for the first software application indicates the first application-specific permission level.

Implementation 26: The method of implementation 24, further comprising:

obtaining information on a global permission level for the expandable display, the global permission level selected from a group of global permission levels including at least a first global permission level, a second global permission level, and a third global permission level; and obtaining information on an application-specific permission level for the first software application, the application-specific permission level selected from a group of application-specific permission levels including at least a first application-specific permission level and a second application-specific permission level, wherein the one or more expansion conditions are further met, at least in part, when i) the information indicative of a global permission level for the expandable display indicates the first global permission level, ii) the information indicative of a global permission level for the expandable display indicates the second global permission level and the information indicative of the application-specific permission level for the first software application indicates the first application-specific permission level, iii) the information indicative of a global permission level for the expandable display indicates the third global permission level, the information indicative of the application-specific permission level for the first software application indicates the first application-specific permission level, or iv) the information indicative of a global permission level for the expandable display indicates the third global permission level, the information indicative of the application-specific permission level for the first software application indicates the second application-specific permission level, and the controller receives a confirmation signal indicative of a user authorization to permit actuation of the expandable display from the non-expanded state to the expanded state.

Implementation 27: The method of implementation 26, further comprising:

determining that the information indicative of the global permission level for the expandable display indicates the third global permission level and that the information indicative of the application-specific permission level for the first software application indicates the second application-specific permission level;

causing, responsive to determining that the information indicative of the global permission level for the expandable display indicates the third global permission level and that the information indicative of the application-specific permission level for the first software application indicates the second application-specific permission level, a user prompt to be presented by the apparatus; and receiving the confirmation signal responsive to input received after presentation of the user prompt.

Implementation 28: The method of any one of implementations 22 through 27, further comprising:

obtaining acceleration data from one or more accelerometers mounted within the apparatus, determining that the acceleration data indicates an acceleration consistent with a free-fall state, and causing the expandable display, when in the expanded state, to transition to the non-expanded state responsive to determining that the acceleration data indicates acceleration consistent with the free-fall state.

Implementation 29: A method comprising:

receiving an expansion state change signal indicative of a selected expansion state for an expandable display that is transitionable at least between an expanded state and a non-expanded state, causing an actuation mechanism of an apparatus having the expandable display to attempt to transition the expandable display to the selected expansion state, obtaining sensor data from one or more sensors of the apparatus, and determining whether the sensor data indicates a potential fault condition in the expandable display.

Implementation 30: The method of implementation 29, further comprising:

determining an actual expansion state of the expandable display based on the sensor data, and causing graphical content presented by the expandable display to be formatted based on the actual expansion state of the expandable display.

Implementation 31: The method of implementation 30, further comprising causing a first portion of an ultrasonic fingerprint sensor that is part of the expandable display to enter an inactive state when the selected expansion state is the expanded state and responsive to determining that the actual expansion state is not the expanded state.

Implementation 32: The method of any one of implementations 29 through 31, wherein the one or more sensors of the apparatus include one or more touch-sensing systems configured to receive touch-inputs to the expandable display and the sensor data used to determine whether the sensor data indicates a potential fault condition in the expandable display includes touch sensor data from the one or more touch-sensing systems.

Implementation 33: The method of implementation 32, wherein the expandable display is a flexible rollable display and the method further comprises:

causing the apparatus to present a prompt with instructions for a user to provide a particular touch input to the expandable display, determining characteristics of a touch input detected by the one or more touch-sensing systems after causing the prompt to be presented and relative to a coordinate system of the one or more touch-sensing systems, and determining an actual expansion state of the expandable display by comparing the touch input characteristics against expected touch input characteristics associated with the particular touch input.

Implementation 34: The method of implementation 33, wherein the instructions for the user to provide the particular touch input to the expandable display include instructions that, when followed, cause the user to touch an exposed portion of the flexible rollable display that is proximate an edge of the expandable display, wherein the edge is proximate to a roller onto which the flexible rollable display is mounted.

Implementation 35: The method of implementation 32, wherein:

the expandable display includes a first display panel and a second display panel, the first display panel and the second display panel are configured to translate relative to one another along a first axis so as to transition between the expanded state and the non-expanded state, the first display panel at least partially overlays the second display panel when in the non-expanded state and viewed along a direction normal to the first display panel, the first display panel has a first touch-sensing system of the one or more touch-sensing systems, the first touch-sensing system is configured to receive touch-inputs to the first display panel, the second display panel has a second touch-sensing system of the one or more touch-sensing systems, the second touch-sensing system is configured to receive touch-inputs to the second display panel, and the method further comprises:

causing the apparatus to present a prompt with instructions for a user to provide a particular touch input to the expandable display, determining characteristics of a touch input detected by the one or more touch-sensing systems after causing the prompt to be presented and relative to a coordinate system of the one or more touch-sensing systems, and determining an actual expansion state of the expandable display by comparing the touch input characteristics against expected touch input characteristics associated with the particular touch input.

Implementation 36: The method of implementation 35, wherein the instructions for the user to provide the particular touch input to the expandable display include instructions that, when followed, cause the user to touch an exposed portion of the expandable display that is proximate a first edge of an exposed portion of the expandable display and to move the touch input across at least part of the expandable display toward a second edge of the exposed portion of the expandable display opposite the first edge, wherein:

the first edge and second edge of the expandable display define, at least in part, a viewable area of the expandable display, and the first edge and second edge are transverse to the first axis.

Implementation 37: The method of any one of implementations 29 through 36, wherein the sensor data includes ultrasonic scan data from one or more ultrasonic fingerprint sensors associated with the expandable display, and the determination of whether the potential fault condition exists in the expandable display is based on the ultrasonic scan data.

Implementation 38: The method of implementation 37, wherein the determination of whether the potential fault condition exists is based on:

an identification of an artifact in the ultrasonic scan data indicative of an edge of a housing of the apparatus, a determination of a location of the artifact relative to a coordinate system, and a comparison of the location of the artifact to an expected location of the edge of the housing of the apparatus in the selected expansion state relative to the coordinate system.

Implementation 39: The method of implementation 38, further comprising:

determining an actual expansion state of the expandable display based on the comparison of the location of the artifact to the expected location of the edge of the housing of the apparatus in the selected expansion state relative to the coordinate system, and causing graphical content presented by the expandable display to be formatted based on the actual expansion state of the expandable display.

Implementation 40: The method of any one of implementations 29 through 39, further comprising:

obtaining optical distance measurement data from one or more optical measurement systems that are configured to measure a distance between a first point that is fixed with respect to a first portion of a housing of the apparatus and a second point that is fixed with respect to a second portion of the housing that is movable relative to the first portion, and determining whether the potential fault condition exists in the expandable display based on optical distance measurement data from the one or more optical measurement systems.

Implementation 41: The method of any one of implementations 29 through 40, wherein determining whether the potential fault condition exists in the expandable display is based, at least in part, on rotational or linear encoder data from one or more rotational or linear encoders that are configured to monitor the actuation state of the actuation mechanism.

Implementation 42: The method of any one of implementations 29 through 41, wherein determining whether the potential fault condition exists in the expandable display is based, at least in part, on data on one or more of voltage, current, and power provided to the actuation mechanism, wherein the data on one or more of voltage, current, and power is provided by one or more sensors configured to monitor one or more of voltage, current, and power provided to the actuation mechanism.

Implementation 43: A non-transitory computer-readable medium storing computer-executable instructions which, when executed by one or more processors of an apparatus having an expandable display that is transitionable at least between an expanded state and a non-expanded state using an actuation mechanism, cause the one or more processors to:

a) receive a display expansion request signal, b) determine, responsive to (a), whether one or more expansion conditions are met, c) cause the actuation mechanism, when the expandable display is in the non-expanded state, to transition the expandable display from the non-expanded state to the expanded state responsive to receipt of the display expansion request signal and a determination that the one or more expansion conditions are met, and d) cause the actuation mechanism, when the expandable display is in the non-expanded state, to cause the expandable display to remain in the non-expanded state responsive to receipt of the display expansion request signal and a determination that the one or more expansion conditions are not met.

Implementation 44: The non-transitory computer-readable medium of implementation 43, further storing computer-executable instructions which, when executed by the one or more processors, the cause the one or more processors to obtain information indicative of a battery charge level of one or more batteries used to power the actuation mechanism, wherein the one or more expansion conditions are met, at least in part, by the battery charge level being above a first threshold amount.

Implementation 45: The non-transitory computer-readable medium of either implementation 43 or implementation 44, wherein the one or more expansion conditions are met, at least in part, or further met, at least in part, when a first software application that is in the foreground is associated with information that indicates that the first software application is compatible with the expandable display.

Implementation 46: The non-transitory computer-readable medium of implementation 45, further storing computer-executable instructions which, when executed by the one or more processors, the cause the one or more processors to:

obtain information on a global permission level for the expandable display, the global permission level selected from a group of global permission levels including at least a first global permission level and a second global permission level; and obtain information on an application-specific permission level for the first software application, the application-specific permission level selected from a group of application-specific permission levels including at least a first application-specific permission level and a second application-specific permission level, wherein the one or more expansion conditions are further met, at least in part, when either i) the information indicative of a global permission level for the expandable display indicates the first global permission level or ii) the information indicative of a global permission level for the expandable display indicates the second global permission level and the information indicative of the application-specific permission level for the first software application indicates the first application-specific permission level.

Implementation 47: The non-transitory computer-readable medium of implementation 45, further storing computer-executable instructions which, when executed by the one or more processors, cause the one or more processors to:

obtain information on a global permission level for the expandable display, the global permission level selected from a group of global permission levels including at least a first global permission level, a second global permission level, and a third global permission level; and obtain information on an application-specific permission level for the first software application, the application-specific permission level selected from a group of application-specific permission levels including at least a first application-specific permission level and a second application-specific permission level, wherein the one or more expansion conditions are further met, at least in part, when i) the information indicative of a global permission level for the expandable display indicates the first global permission level, ii) the information indicative of a global permission level for the expandable display indicates the second global permission level and the information indicative of the application-specific permission level for the first software application indicates the first application-specific permission level, iii) the information indicative of a global permission level for the expandable display indicates the third global permission level, the information indicative of the application-specific permission level for the first software application indicates the first application-specific permission level, or iv) the information indicative of a global permission level for the expandable display indicates the third global permission level, the information indicative of the application-specific permission level for the first software application indicates the second application-specific permission level, and the controller receives a confirmation signal indicative of a user authorization to permit actuation of the expandable display from the non-expanded state to the expanded state.

Implementation 48: The non-transitory computer-readable medium of implementation 47, further storing computer-executable instructions which, when executed by the one or more processors, cause the one or more processors to:
determine that the information indicative of the global permission level for the expandable display indicates the third global permission level and that the information indicative of the application-specific permission level for the first software application indicates the second application-specific permission level;
cause, responsive to determining that the information indicative of the global permission level for the expandable display indicates the third global permission level and that the information indicative of the application-specific permission level for the first software application indicates the second application-specific permission level, a user prompt to be presented by the apparatus; and
receive the confirmation signal responsive to input received after presentation of the user prompt.

Implementation 49: The non-transitory computer-readable medium of any one of implementations 43 through 48, further storing computer-executable instructions which, when executed by the one or more processors, cause the one or more processors to:
obtain acceleration data from one or more accelerometers mounted within the apparatus,
determine that the acceleration data indicates an acceleration consistent with a free-fall state, and
cause the expandable display, when in the expanded state, to transition to the non-expanded state responsive to determining that the acceleration data indicates acceleration consistent with the free-fall state.

Implementation 50: A non-transitory computer-readable medium storing computer-executable instructions which, when executed by one or more processors, cause the one or more processors to:
receive an expansion state change signal indicative of a selected expansion state for an expandable display that is transitionable at least between an expanded state and a non-expanded state,
cause an actuation mechanism of an apparatus having the expandable display to attempt to transition the expandable display to the selected expansion state,
obtain sensor data from one or more sensors of the apparatus, and
determine whether the sensor data indicates a potential fault condition in the expandable display.

Implementation 51: The non-transitory computer-readable medium of implementation 50, further storing computer-executable instructions which, when executed by the one or more processors, cause the one or more processors to:
determine an actual expansion state of the expandable display based on the sensor data, and
cause graphical content presented by the expandable display to be formatted based on the actual expansion state of the expandable display.

Implementation 52: The non-transitory computer-readable medium of implementation 51, further storing computer-executable instructions which, when executed by the one or more processors, cause the one or more processors to cause a first portion of an ultrasonic fingerprint sensor that is part of the expandable display to enter an inactive state when the selected expansion state is the expanded state and responsive to determining that the actual expansion state is not the expanded state.

Implementation 53: The non-transitory computer-readable medium of any one of implementations 50 through 52, wherein the one or more sensors of the apparatus include one or more touch-sensing systems configured to receive touch-inputs to the expandable display and the sensor data used to determine whether the sensor data indicates a potential fault condition in the expandable display includes touch sensor data from the one or more touch-sensing systems.

Implementation 54: The non-transitory computer-readable medium of implementation 53, wherein the expandable display is a flexible rollable display and the non-transitory computer-readable medium further stores computer-executable instructions which, when executed by the one or more processors, cause the one or more processors to:
cause the apparatus to present a prompt with instructions for a user to provide a particular touch input to the expandable display,
determine characteristics of a touch input detected by the one or more touch-sensing systems after causing the prompt to be presented and relative to a coordinate system of the one or more touch-sensing systems, and
determine an actual expansion state of the expandable display by comparing the touch input characteristics against expected touch input characteristics associated with the particular touch input.

Implementation 55: The non-transitory computer-readable medium of implementation 54, wherein the instructions for the user to provide the particular touch input to the expandable display include instructions that, when followed, cause the user to touch an exposed portion of the flexible rollable display that is proximate an edge of the expandable display, wherein the edge is proximate to a roller onto which the flexible rollable display is mounted.

Implementation 56: The non-transitory computer-readable medium of implementation 53, wherein:
the expandable display includes a first display panel and a second display panel,
the first display panel and the second display panel are configured to translate relative to one another along a first axis so as to transition between the expanded state and the non-expanded state,
the first display panel at least partially overlays the second display panel when in the non-expanded state and viewed along a direction normal to the first display panel,
the first display panel has a first touch-sensing system of the one or more touch-sensing systems,
the first touch-sensing system is configured to receive touch-inputs to the first display panel,
the second display panel has a second touch-sensing system of the one or more touch-sensing systems,
the second touch-sensing system is configured to receive touch-inputs to the second display panel, and the non-transitory computer-readable medium further stores computer-executable instructions which, when executed by the one or more processors, cause the one or more processors to:
- cause the apparatus to present a prompt with instructions for a user to provide a particular touch input to the expandable display,
- determine characteristics of a touch input detected by the one or more touch-sensing systems after causing the prompt to be presented and relative to a coordinate system of the one or more touch-sensing systems, and
- determine an actual expansion state of the expandable display by comparing the touch input characteristics against expected touch input characteristics associated with the particular touch input.

Implementation 57: The non-transitory computer-readable medium of implementation 56, wherein the instructions for the user to provide the particular touch input to the expandable display include instructions that, when followed, cause the user to touch an exposed portion of the expandable display that is proximate a first edge of an exposed portion of the expandable display and to move the touch input across at least part of the expandable display toward a second edge of the exposed portion of the expandable display opposite the first edge, wherein:
- the first edge and second edge of the expandable display define, at least in part, a viewable area of the expandable display, and
- the first edge and second edge are transverse to the first axis.

Implementation 58: The non-transitory computer-readable medium of any one of implementations 50 through 57, wherein the sensor data includes ultrasonic scan data from one or more ultrasonic fingerprint sensors associated with the expandable display, and the determination of whether the potential fault condition exists in the expandable display is based on the ultrasonic scan data.

Implementation 59: The non-transitory computer-readable medium of implementation 58, wherein the determination of whether the potential fault condition exists is based on:
- an identification of an artifact in the ultrasonic scan data indicative of an edge of a housing of the apparatus,
- a determination of a location of the artifact relative to a coordinate system, and
- a comparison of the location of the artifact to an expected location of the edge of the housing of the apparatus in the selected expansion state relative to the coordinate system.

Implementation 60: The non-transitory computer-readable medium of implementation 59, further storing computer-executable instructions which, when executed by the one or more processors, cause the one or more processors to:
- determine an actual expansion state of the expandable display based on the comparison of the location of the artifact to the expected location of the edge of the housing of the apparatus in the selected expansion state relative to the coordinate system, and
- cause graphical content presented by the expandable display to be formatted based on the actual expansion state of the expandable display.

Implementation 61: The non-transitory computer-readable medium of any one of implementations 50 through 60, further storing computer-executable instructions which, when executed by the one or more processors, cause the one or more processors to:
- obtain optical distance measurement data from one or more optical measurement systems that are configured to measure a distance between a first point that is fixed with respect to a first portion of a housing of the apparatus and a second point that is fixed with respect to a second portion of the housing that is movable relative to the first portion, and
- determine whether the potential fault condition exists in the expandable display based on optical distance measurement data from the one or more optical measurement systems.

Implementation 62: The non-transitory computer-readable medium of any one of implementations 50 through 61, further storing computer-executable instructions which, when executed by the one or more processors, cause the one or more processors to determine whether the potential fault condition exists in the expandable display is based, at least in part, on rotational or linear encoder data from one or more rotational or linear encoders that are configured to monitor the actuation state of the actuation mechanism.

Implementation 63: The non-transitory computer-readable medium of any one of implementations 50 through 62, further storing computer-executable instructions which, when executed by the one or more processors, cause the one or more processors to determine whether the potential fault condition exists in the expandable display is based on data on one or more of voltage, current, and power provided to the actuation mechanism, wherein the data on one or more of voltage, current, and power is provided by one or more sensors configured to monitor one or more of voltage, current, and power provided to the actuation mechanism.

Implementation 64: An apparatus comprising:
expandable display means;
actuation means; and
control means, wherein:
- the expandable display means is transitionable at least between an expanded state and a non-expanded state,
- the actuation means is configured to cause the expandable display means to transition between the expanded state and the non-expanded state responsive to receipt of one or more signals, and
- the control means is configured to:
  a) receive a display expansion request signal,
  b) determine, responsive to (a), whether one or more expansion conditions are met,
  c) cause the actuation means, when the expandable display means is in the non-expanded state, to transition the expandable display means from the non-expanded state to the expanded state responsive to receipt of the display expansion request signal and a determination that the one or more expansion conditions are met, and
  d) cause the actuation means, when the expandable display means is in the non-expanded state, to cause the expandable display means to remain in the non-expanded state responsive to receipt of the display expansion request signal and a determination that the one or more expansion conditions are not met.

Implementation 65: The apparatus of implementation 64, wherein the control means is configured to obtain information indicative of a battery charge level of one or more batteries used to power the actuation means, and wherein the one or more expansion conditions are met, at least in part, by the battery charge level being above a first threshold amount.

Implementation 66: The apparatus of either implementation 64 or implementation 65, wherein the one or more expansion conditions are met, at least in part, or further met, at least in part, when a first software application that is in the foreground is associated with information that indicates that the first software application is compatible with the expandable display means.

Implementation 67: The apparatus of implementation 66, wherein:
- the apparatus further comprises one or more memory means that store a) information indicative of a global permission level for the expandable display means and b) information indicative of an application-specific permission level for each software application of a plurality of software applications executable by the apparatus,
- the plurality of software applications includes the first software application,
- the global permission level is selected from a group of global permission levels including at least a first global permission level and a second global permission level,
- each application-specific permission level is selected from a group of application-specific permission levels including at least a first application-specific permission level and a second application-specific permission level, and
- the one or more expansion conditions are further met, at least in part, when either i) the information indicative of a global permission level for the expandable display means indicates the first global permission level or ii) the information indicative of a global permission level for the expandable display means indicates the second global permission level and the information indicative of the application-specific permission level for the first software application indicates the first application-specific permission level.

Implementation 68: The apparatus of implementation 66, wherein:
- the apparatus further comprises one or more memory means that store a) information indicative of a global permission level for the expandable display means and b) information indicative of an application-specific permission level for each software application of a plurality of software applications executable by the apparatus,
- the plurality of software applications includes the first software application,
- the global permission level is selected from a group of global permission levels including at least a first global permission level, a second global permission level, and a third global permission level,
- each application-specific permission level is selected from a group of application-specific permission levels including at least a first application-specific permission level and a second application-specific permission level, and
- the one or more expansion conditions are further met, at least in part, when i) the information indicative of a global permission level for the expandable display means indicates the first global permission level, ii) the information indicative of a global permission level for the expandable display means indicates the second global permission level and the information indicative of the application-specific permission level for the first software application indicates the first application-specific permission level, iii) the information indicative of a global permission level for the expandable display means indicates the third global permission level, the information indicative of the application-specific permission level for the first software application indicates the first application-specific permission level, or iv) the information indicative of a global permission level for the expandable display means indicates the third global permission level, the information indicative of the application-specific permission level for the first software application indicates the second application-specific permission level, and the control means receives a confirmation signal indicative of a user authorization to permit actuation of the expandable display means from the non-expanded state to the expanded state.

Implementation 69: The apparatus of implementation 68, wherein the control means is further configured to, upon determining that the information indicative of a global permission level for the expandable display means indicates the third global permission level and the information indicative of the application-specific permission level for the first software application indicates the second application-specific permission level:
- cause a user prompt to be presented by the apparatus, and
- receive the confirmation signal responsive to input received after presentation of the user prompt.

Implementation 70: The apparatus of any one of implementations 64 through 69, further comprising one or more accelerometers mounted in the apparatus, wherein the control means is further configured to:
- obtain acceleration data from the one or more accelerometers,
- determine when the acceleration data indicates an acceleration consistent with a free-fall state, and
- cause the expandable display means, when in the expanded state, to transition to the non-expanded state responsive to determining that the acceleration data indicates acceleration consistent with the free-fall state.

Implementation 71: An apparatus comprising:
- a housing;
- expandable display means;
- actuation means; and
- a control means, wherein:
  - the expandable display means is transitionable at least between an expanded state and a non-expanded state,
  - the actuation means is configured to cause the expandable display means to transition between the expanded state and the non-expanded state responsive to receipt of one or more signals,
  - the control means is configured to cause the actuation means to transition to a selected expansion state selected from a group including at least the expanded state and the non-expanded state responsive to receipt of an expansion state change signal,
  - the control means is configured to obtain sensor data from one or more sensors of the apparatus, and
  - the control means is configured to determine whether the sensor data indicates a potential fault condition in the expandable display means.

Implementation 72: The apparatus of implementation 71, wherein the control means is further configured to:
- determine an actual expansion state of the expandable display means based on the sensor data, and
- cause graphical content presented by the expandable display means to be formatted based on the actual expansion state of the expandable display means.

Implementation 73: The apparatus of implementation 72, further comprising one or more ultrasonic fingerprint sensors that are part of the expandable display means, wherein the control means is further configured to cause a first portion of the ultrasonic fingerprint sensor to enter an inactive state when the selected expansion state is the expanded state and responsive to determining that the actual expansion state is not the expanded state.

Implementation 74: The apparatus of any one of implementations 71 through 73, wherein the one or more sensors of the apparatus include one or more touch-sensing systems configured to receive touch-inputs to the expandable display means and the sensor data used to determine whether the sensor data indicates a potential fault condition in the expandable display means includes touch sensor data from the one or more touch-sensing systems.

Implementation 75: The apparatus of implementation 74, wherein the expandable display means is a flexible rollable display and the control means is further configured to:
 cause the apparatus to present a prompt with instructions for a user to provide a particular touch input to the expandable display means,
 determine characteristics of a touch input detected by the one or more touch-sensing systems after causing the prompt to be presented and relative to a coordinate system of the one or more touch-sensing systems, and
 determine an actual expansion state of the expandable display means by comparing the touch input characteristics against expected touch input characteristics associated with the particular touch input.

Implementation 76: The apparatus of implementation 75, wherein the instructions for the user to provide the particular touch input to the expandable display means include instructions that, when followed, cause the user to touch an exposed portion of the flexible rollable display that is proximate an edge of the expandable display means, wherein the edge is proximate to a roller onto which the flexible rollable display is mounted.

Implementation 77: The apparatus of implementation 74, wherein:
 the expandable display means includes a first display panel and a second display panel,
 the first display panel and the second display panel are configured to translate relative to one another along a first axis so as to transition between the expanded state and the non-expanded state,
 the first display panel at least partially overlays the second display panel when in the non-expanded state and viewed along a direction normal to the first display panel,
 the first display panel has a first touch-sensing system of the one or more touch-sensing systems,
 the first touch-sensing system is configured to receive touch-inputs to the first display panel,
 the second display panel has a second touch-sensing system of the one or more touch-sensing systems,
 the second touch-sensing system is configured to receive touch-inputs to the second display panel, and
 the control means is further configured to:
  cause the apparatus to present a prompt with instructions for a user to provide a particular touch input to the expandable display means,
  determine characteristics of a touch input detected by the one or more touch-sensing systems after causing the prompt to be presented and relative to a coordinate system of the one or more touch-sensing systems, and
  determine an actual expansion state of the expandable display means by comparing the touch input characteristics against expected touch input characteristics associated with the particular touch input.

Implementation 78: The apparatus of implementation 77, wherein the instructions for the user to provide the particular touch input to the expandable display means include instructions that, when followed, cause the user to touch an exposed portion of the expandable display means that is proximate a first edge of an exposed portion of the expandable display means and to move the touch input across at least part of the expandable display means toward a second edge of the exposed portion of the expandable display means opposite the first edge, wherein:
 the first edge and second edge of the expandable display means define, at least in part, a viewable area of the expandable display means, and
 the first edge and second edge are transverse to the first axis.

Implementation 79: The apparatus of any one of implementations 71, 72, or 74 through 78, further comprising one or more ultrasonic fingerprint sensors, or implementation 73, wherein:
 the sensor data includes ultrasonic scan data from the one or more ultrasonic fingerprint sensors, and
 the control means is configured to determine whether the potential fault condition exists in the expandable display means based on the ultrasonic scan data.

Implementation 80: The apparatus of implementation 79, wherein the determination of whether the potential fault condition exists is based on:
 an identification of an artifact in the ultrasonic scan data indicative of an edge of the housing of the apparatus,
 a determination of a location of the artifact relative to a coordinate system, and
 a comparison of the location of the artifact to an expected location of the edge of the housing of the apparatus in the selected expansion state relative to the coordinate system.

Implementation 81: The apparatus of implementation 80, wherein the control means is further configured to:
 determine an actual expansion state of the expandable display means based on the comparison of the location of the artifact to the expected location of the edge of the housing of the apparatus in the selected expansion state relative to the coordinate system, and
 cause graphical content presented by the expandable display means to be formatted based on the actual expansion state of the expandable display means.

Implementation 82: The apparatus of any one of implementations 71 through 81, wherein:
 the housing includes a first portion and a second portion that are configured to translate relative to one another when the expandable display means transitions between the expanded and non-expanded states,
 the one or more sensors of the apparatus include one or more optical distance measurement sensors,
 the one or more optical distance measurement sensors are configured to measure a distance between a first point that is fixed with respect to the first portion and a second point that is fixed with respect to the second portion, and
 the control means is configured to determine whether the potential fault condition exists in the expandable display means based on optical distance measurement data from the one or more optical distance measurement sensors.

Implementation 83: The apparatus of any one of implementations 71 through 82, wherein:
 the one or more sensors of the apparatus include one or more rotational or linear encoders, the one or more rotational or linear encoders are configured to monitor an actuation state of the actuation means, and the control means is configured to determine whether the potential fault condition exists in the expandable display means includes rotational or linear encoder data from the one or more rotational or linear encoders.

Implementation 84: The apparatus of any one of implementations 71 through 83, wherein:

the one or more sensors of the apparatus include one or more sensors configured to monitor one or more of voltage, current, and power provided to the actuation means, and the control means is configured to determine whether the potential fault condition exists in the expandable display means based on data on one or more of voltage, current, and power provided to the actuation means, wherein the data on one or more of voltage, current, and power is provided by the one or more sensors configured to monitor one or more of voltage, current, and power provided to the actuation means.

What is claimed is:

1. An apparatus comprising:
an expandable display;
an actuation mechanism; and
a controller, wherein:
  the expandable display is transitionable at least between an expanded state and a non-expanded state,
  the actuation mechanism is configured to cause the expandable display to transition between the expanded state and the non-expanded state responsive to receipt of one or more signals, and
  the controller is configured to:
    a) receive a display expansion request signal,
    b) determine, responsive to (a), whether one or more expansion conditions are met, wherein the one or more expansion conditions are met, at least in part, when a first software application that is in the foreground is associated with information that indicates that the first software application is compatible with the expandable display,
    c) cause the actuation mechanism, when the expandable display is in the non-expanded state, to transition the expandable display from the non-expanded state to the expanded state responsive to receipt of the display expansion request signal and a determination that the one or more expansion conditions are met, and
    d) cause the actuation mechanism, when the expandable display is in the non-expanded state, to cause the expandable display to remain in the non-expanded state responsive to receipt of the display expansion request signal and a determination that the one or more expansion conditions are not met.

2. The apparatus of claim 1, wherein the controller is configured to obtain information indicative of a battery charge level of one or more batteries used to power the actuation mechanism, and wherein the one or more expansion conditions are met, at least in part, by the battery charge level being above a first threshold amount.

3. The apparatus of claim 1, wherein:
the apparatus further comprises one or more memory devices that store a) information indicative of a global permission level for the expandable display and b) information indicative of an application-specific permission level for each software application of a plurality of software applications executable by the apparatus,
the plurality of software applications includes the first software application,
the global permission level is selected from a group of global permission levels including at least a first global permission level and a second global permission level,
each application-specific permission level is selected from a group of application-specific permission levels including at least a first application-specific permission level and a second application-specific permission level,
the one or more expansion conditions are further met, at least in part, when either i) the information indicative of a global permission level for the expandable display indicates the first global permission level or ii) the information indicative of a global permission level for the expandable display indicates the second global permission level and the information indicative of the application-specific permission level for the first software application indicates the first application-specific permission level.

4. The apparatus of claim 1, wherein:
the apparatus further comprises one or more memory devices that store a) information indicative of a global permission level for the expandable display and b) information indicative of an application-specific permission level for each software application of a plurality of software applications executable by the apparatus,
the plurality of software applications includes the first software application,
the global permission level is selected from a group of global permission levels including at least a first global permission level, a second global permission level, and a third global permission level,
each application-specific permission level is selected from a group of application-specific permission levels including at least a first application-specific permission level and a second application-specific permission level,
the one or more expansion conditions are further met, at least in part, when i) the information indicative of a global permission level for the expandable display indicates the first global permission level, ii) the information indicative of a global permission level for the expandable display indicates the second global permission level and the information indicative of the application-specific permission level for the first software application indicates the first application-specific permission level, iii) the information indicative of a global permission level for the expandable display indicates the third global permission level, the information indicative of the application-specific permission level for the first software application indicates the first application-specific permission level, or iv) the information indicative of a global permission level for the expandable display indicates the third global permission level, the information indicative of the application-specific permission level for the first software application indicates the second application-specific permission level, and the controller receives a confirmation signal indicative of a user authorization to permit actuation of the expandable display from the non-expanded state to the expanded state.

5. The apparatus of claim 4, wherein the controller is further configured to, upon determining that the information indicative of a global permission level for the expandable display indicates the third global permission level and the information indicative of the application-specific permission level for the first software application indicates the second application-specific permission level:
cause a user prompt to be presented by the apparatus, and
receive the confirmation signal responsive to input received after presentation of the user prompt.

6. The apparatus of claim 1, further comprising one or more accelerometers mounted in the apparatus, wherein the controller is further configured to:
obtain acceleration data from the one or more accelerometers,
determine when the acceleration data indicates an acceleration consistent with a free-fall state, and
cause the expandable display, when in the expanded state, to transition to the non-expanded state responsive to determining that the acceleration data indicates acceleration consistent with the free-fall state.

7. A method of managing operation of an expandable display in an apparatus, wherein the expandable display is transitionable at least between an expanded state and a non-expanded state using an actuation mechanism, the method comprising:
a) receiving a display expansion request signal;
b) determining, responsive to (a), that one or more expansion conditions are met, wherein the one or more expansion conditions are met, at least in part, when a first software application that is in the foreground is associated with information that indicates that the first software application is compatible with the expandable display; and
c) causing the actuation mechanism, when the expandable display is in the non-expanded state, to transition the expandable display from the non-expanded state to the expanded state responsive to receipt of the display expansion request signal and to the determination that the one or more expansion conditions are met.

8. The method of claim 7, further comprising obtaining information indicative of a battery charge level of one or more batteries used to power the actuation mechanism, wherein the one or more expansion conditions are met, at least in part, by the battery charge level being above a first threshold amount.

9. The method of claim 7, further comprising:
obtaining information on a global permission level for the expandable display, the global permission level selected from a group of global permission levels including at least a first global permission level and a second global permission level; and
obtaining information on an application-specific permission level for the first software application, the application-specific permission level selected from a group of application-specific permission levels including at least a first application-specific permission level and a second application-specific permission level, wherein the one or more expansion conditions are further met, at least in part, when either i) the information indicative of a global permission level for the expandable display indicates the first global permission level or ii) the information indicative of a global permission level for the expandable display indicates the second global permission level and the information indicative of the application-specific permission level for the first software application indicates the first application-specific permission level.

10. The method of claim 7, further comprising:
obtaining information on a global permission level for the expandable display, the global permission level selected from a group of global permission levels including at least a first global permission level, a second global permission level, and a third global permission level; and
obtaining information on an application-specific permission level for the first software application, the application-specific permission level selected from a group of application-specific permission levels including at least a first application-specific permission level and a second application-specific permission level, wherein the one or more expansion conditions are further met, at least in part, when i) the information indicative of a global permission level for the expandable display indicates the first global permission level, ii) the information indicative of a global permission level for the expandable display indicates the second global permission level and the information indicative of the application-specific permission level for the first software application indicates the first application-specific permission level, iii) the information indicative of a global permission level for the expandable display indicates the third global permission level, the information indicative of the application-specific permission level for the first software application indicates the first application-specific permission level, or iv) the information indicative of a global permission level for the expandable display indicates the third global permission level, the information indicative of the application-specific permission level for the first software application indicates the second application-specific permission level, and the controller receives a confirmation signal indicative of a user authorization to permit actuation of the expandable display from the non-expanded state to the expanded state.

11. The method of claim 10, further comprising:
determining that the information indicative of the global permission level for the expandable display indicates the third global permission level and that the information indicative of the application-specific permission level for the first software application indicates the second application-specific permission level;
causing, responsive to determining that the information indicative of the global permission level for the expandable display indicates the third global permission level and that the information indicative of the application-specific permission level for the first software application indicates the second application-specific permission level, a user prompt to be presented by the apparatus; and
receiving the confirmation signal responsive to input received after presentation of the user prompt.

12. The method of claim 7, further comprising:
obtaining acceleration data from one or more accelerometers mounted within the apparatus,
determining that the acceleration data indicates an acceleration consistent with a free-fall state, and
causing the expandable display, when in the expanded state, to transition to the non-expanded state responsive to determining that the acceleration data indicates acceleration consistent with the free-fall state.

13. A non-transitory computer-readable medium storing computer-executable instructions which, when executed by one or more processors of an apparatus having an expandable display that is transitionable at least between an expanded state and a non-expanded state using an actuation mechanism, cause the one or more processors to:
  a) receive a display expansion request signal,
  b) determine, responsive to (a), whether one or more expansion conditions are met, wherein the one or more expansion conditions are met, at least in part, when a first software application that is in the foreground is associated with information that indicates that the first software application is compatible with the expandable display,
  c) cause the actuation mechanism, when the expandable display is in the non-expanded state, to transition the expandable display from the non-expanded state to the expanded state responsive to receipt of the display expansion request signal and a determination that the one or more expansion conditions are met, and
  d) cause the actuation mechanism, when the expandable display is in the non-expanded state, to cause the expandable display to remain in the non-expanded state responsive to receipt of the display expansion request signal and a determination that the one or more expansion conditions are not met.

14. The non-transitory computer-readable medium of claim 13, further storing computer-executable instructions which, when executed by the one or more processors, the cause the one or more processors to obtain information indicative of a battery charge level of one or more batteries used to power the actuation mechanism, wherein the one or more expansion conditions are met, at least in part, by the battery charge level being above a first threshold amount.

15. The non-transitory computer-readable medium of claim 13, further storing computer-executable instructions which, when executed by the one or more processors, the cause the one or more processors to:
  obtain information on a global permission level for the expandable display, the global permission level selected from a group of global permission levels including at least a first global permission level and a second global permission level; and
  obtain information on an application-specific permission level for the first software application, the application-specific permission level selected from a group of application-specific permission levels including at least a first application-specific permission level and a second application-specific permission level, wherein the one or more expansion conditions are further met, at least in part, when either i) the information indicative of a global permission level for the expandable display indicates the first global permission level or ii) the information indicative of a global permission level for the expandable display indicates the second global permission level and the information indicative of the application-specific permission level for the first software application indicates the first application-specific permission level.

16. The non-transitory computer-readable medium of claim 13, further storing computer-executable instructions which, when executed by the one or more processors, cause the one or more processors to:
  obtain information on a global permission level for the expandable display, the global permission level selected from a group of global permission levels including at least a first global permission level, a second global permission level, and a third global permission level; and
  obtain information on an application-specific permission level for the first software application, the application-specific permission level selected from a group of application-specific permission levels including at least a first application-specific permission level and a second application-specific permission level, wherein the one or more expansion conditions are further met, at least in part, when i) the information indicative of a global permission level for the expandable display indicates the first global permission level, ii) the information indicative of a global permission level for the expandable display indicates the second global permission level and the information indicative of the application-specific permission level for the first software application indicates the first application-specific permission level, iii) the information indicative of a global permission level for the expandable display indicates the third global permission level, the information indicative of the application-specific permission level for the first software application indicates the first application-specific permission level, or iv) the information indicative of a global permission level for the expandable display indicates the third global permission level, the information indicative of the application-specific permission level for the first software application indicates the second application-specific permission level, and the controller receives a confirmation signal indicative of a user authorization to permit actuation of the expandable display from the non-expanded state to the expanded state.

17. The non-transitory computer-readable medium of claim 16, further storing computer-executable instructions which, when executed by the one or more processors, cause the one or more processors to:
  determine that the information indicative of the global permission level for the expandable display indicates the third global permission level and that the information indicative of the application-specific permission level for the first software application indicates the second application-specific permission level;
  cause, responsive to determining that the information indicative of the global permission level for the expandable display indicates the third global permission level and that the information indicative of the application-specific permission level for the first software application indicates the second application-specific permission level, a user prompt to be presented by the apparatus; and
  receive the confirmation signal responsive to input received after presentation of the user prompt.

18. The non-transitory computer-readable medium of claim 13, further storing computer-executable instructions which, when executed by the one or more processors, cause the one or more processors to:
  obtain acceleration data from one or more accelerometers mounted within the apparatus,
  determine that the acceleration data indicates an acceleration consistent with a free-fall state, and
  cause the expandable display, when in the expanded state, to transition to the non-expanded state responsive to determining that the acceleration data indicates acceleration consistent with the free-fall state.

* * * * *